(12) United States Patent
Song et al.

(10) Patent No.: US 12,494,466 B2
(45) Date of Patent: Dec. 9, 2025

(54) DISPLAY DEVICE

(71) Applicant: Samsung Display Co., Ltd., Yongin-Si (KR)

(72) Inventors: Hyun-Gue Song, Yongin-si (KR); Youngtae Kim, Yongin-si (KR); Hyunho Jung, Yongin-si (KR); Heeseong Jeong, Yongin-si (KR); Sunjin Joo, Yongin-si (KR); Sang Min Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 338 days.

(21) Appl. No.: 18/191,337

(22) Filed: Mar. 28, 2023

(65) Prior Publication Data
US 2024/0016025 A1 Jan. 11, 2024

(30) Foreign Application Priority Data
Jul. 5, 2022 (KR) .................. 10-2022-0082690

(51) Int. Cl.
*H01L 25/16* (2023.01)
*H10H 20/84* (2025.01)
(Continued)

(52) U.S. Cl.
CPC .......... *H01L 25/167* (2013.01); *H10H 20/84* (2025.01); *H10K 39/34* (2023.02); *H10K 59/122* (2023.02);
(Continued)

(58) Field of Classification Search
CPC .......... H10H 20/852–854; H10H 29/852–854; H10H 29/37; H10H 20/84; H10H 29/142;
(Continued)

(56) References Cited

U.S. PATENT DOCUMENTS 9,871,082 B2     1/2018   Jeon
10,644,083 B2   5/2020   Lee et al.
(Continued)

FOREIGN PATENT DOCUMENTS

KR   10-2016-0045583     4/2016
KR   10-2019-0016635     2/2019
(Continued)

*Primary Examiner* — Scott B Geyer
(74) *Attorney, Agent, or Firm* — F. CHAU & ASSOCIATES, LLC

(57) ABSTRACT

A display device including: a first light-emitting opening, a second light-emitting opening, a third light-emitting opening, and a light-receiving opening; wherein a first color emission area corresponds to the first light-emitting opening; a second color emission area corresponds to the second light-emitting opening; a third color emission area corresponds to the third light-emitting opening; and a light detection area corresponds to the light-receiving opening; and when the first color emission area, the second color emission area, and the third color emission area are viewed at a first point having a first viewing angle with respect to a normal line of a base layer, a sensing electrode shields each of two emission areas among the first color emission area, the second color emission area, and the third color emission area or one of the first color emission area, the second color emission area, and the third color emission area.

32 Claims, 29 Drawing Sheets

(51) Int. Cl.
| | |
|---|---|
| *H10K 39/34* | (2023.01) |
| *H10K 59/122* | (2023.01) |
| *H10K 59/40* | (2023.01) |
| *H10K 59/80* | (2023.01) |
| *G06F 3/041* | (2006.01) |
| *G06F 3/044* | (2006.01) |
| *G06V 40/13* | (2022.01) |
| *G09G 3/3233* | (2016.01) |
| *H01L 25/18* | (2023.01) |

(52) U.S. Cl.
CPC ........... *H10K 59/40* (2023.02); *H10K 59/873* (2023.02); *H10K 59/8791* (2023.02); *G06F 3/0412* (2013.01); *G06F 3/0446* (2019.05); *G06F 2203/04111* (2013.01); *G06V 40/1318* (2022.01); *G09G 3/3233* (2013.01); *G09G 2300/0819* (2013.01); *G09G 2300/0842* (2013.01); *G09G 2300/0861* (2013.01); *G09G 2360/14* (2013.01); *H01L 25/18* (2013.01)

(58) Field of Classification Search
CPC .... H10K 59/87; H10K 59/871; H10K 59/873; H10K 59/8731; H10K 59/122; H10K 59/173; H10K 59/40; H10K 39/34; H10K 59/352; H10K 59/353; H10K 59/65; H10K 59/8791; H10K 59/60; H10K 59/35; H10K 50/805; H10K 50/844; H10K 50/865; H10K 59/131; H01L 25/18; H01L 25/167; G06F 3/0412; G06F 3/0446; G06F 2203/04111; G06F 2203/04112; G06V 40/1318; G09G 3/3233; G09G 2300/0819; G09G 2300/0842; G09G 2300/0861; G09G 2360/14; G09G 2300/0452; G09G 2360/144
See application file for complete search history.

(56) References Cited

U.S. PATENT DOCUMENTS

| | | | |
|---|---|---|---|
| 2018/0069054 A1* | 3/2018 | Zhai | H10D 86/481 |
| 2019/0369784 A1 | 12/2019 | Yao et al. | |
| 2020/0175244 A1* | 6/2020 | Liao | H10H 29/142 |
| 2020/0257402 A1 | 8/2020 | Miyake | |
| 2021/0013358 A1* | 1/2021 | Lai | H10H 20/812 |
| 2021/0202675 A1* | 7/2021 | Jang | H10K 59/131 |
| 2021/0318778 A1* | 10/2021 | Kim | G06F 3/0446 |
| 2021/0335963 A1* | 10/2021 | Ding | H10K 59/80521 |
| 2021/0384477 A1* | 12/2021 | Shin | H10K 50/865 |
| 2022/0013061 A1* | 1/2022 | Hsieh | G09G 3/32 |
| 2022/0059804 A1* | 2/2022 | Hong | G06F 3/044 |
| 2022/0149335 A1* | 5/2022 | Hai | G06V 10/145 |
| 2022/0165834 A1* | 5/2022 | Jo | G06V 40/1318 |
| 2022/0165891 A1* | 5/2022 | Ikeda | H04N 23/12 |
| 2022/0173362 A1 | 6/2022 | Kim et al. | |
| 2022/0181406 A1 | 6/2022 | Seo et al. | |
| 2022/0238757 A1* | 7/2022 | Park | H10H 20/8312 |
| 2022/0246089 A1* | 8/2022 | Song | H01L 25/0753 |
| 2023/0045827 A1* | 2/2023 | Yoo | G06F 3/03545 |
| 2023/0094848 A1* | 3/2023 | Lius | H10H 20/855 257/79 |
| 2023/0124340 A1* | 4/2023 | Lee | G06F 3/0412 345/173 |
| 2023/0186673 A1* | 6/2023 | Lius | G06V 40/1318 382/124 |
| 2023/0200139 A1* | 6/2023 | Chei | H10K 59/122 257/40 |
| 2023/0238369 A1* | 7/2023 | Kusunoki | H10D 86/60 257/79 |

FOREIGN PATENT DOCUMENTS

| | | |
|---|---|---|
| KR | 10-2061108 | 1/2020 |
| KR | 10-2021-0004006 | 1/2021 |

* cited by examiner

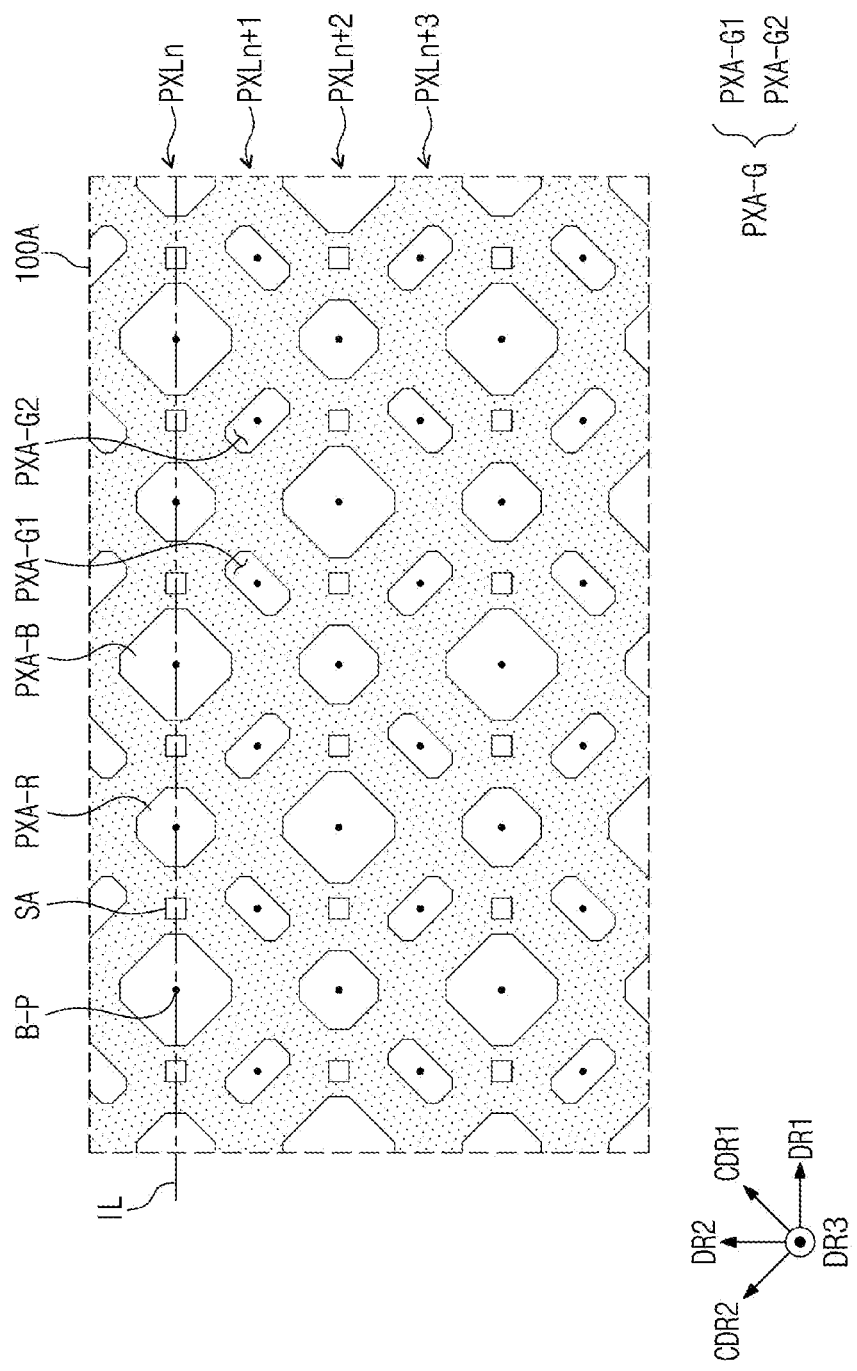

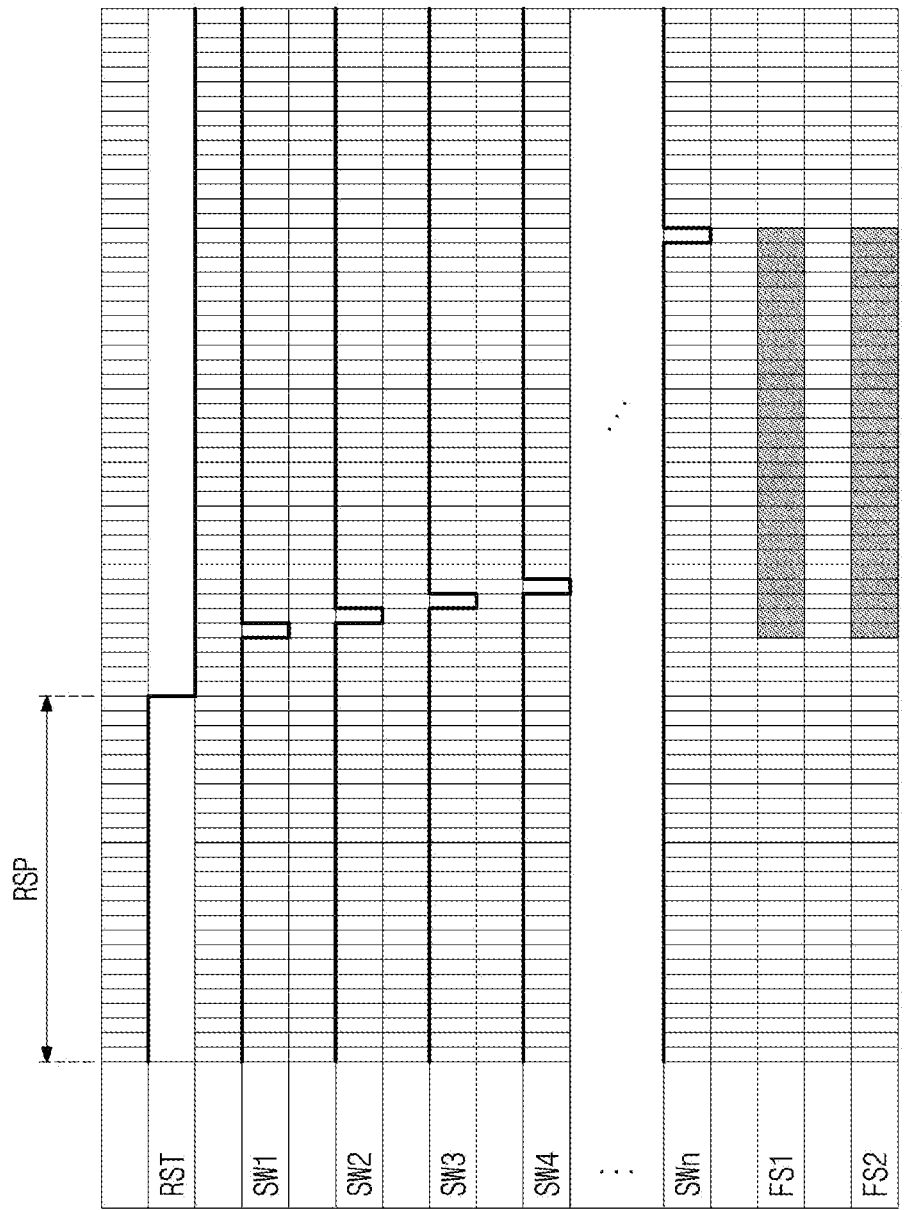

DISPLAY DEVICE

CROSS-REFERENCE TO RELATED APPLICATION

This U.S. non-provisional patent application claims priority under 35 U.S.C. § 119 to Korean Patent Application No. 10-2022-0082690, filed on Jul. 5, 2022, the disclosure of which is incorporated by reference herein in its entirety.

TECHNICAL FIELD

The present disclosure relates to a display device, and more particularly, to a display device including an input sensing electrode and a light detection element.

DISCUSSION OF RELATED ART

Electronic devices such as smart phones, tablets, notebook computers, navigation systems, and smart TVs are ubiquitous technologies. These electronic devices include a display device to provide information in visual form. Electronic devices further include various electronic modules in addition to the display panel.

The display device must satisfy a particular display quality condition for each purpose of use. When light generated by a light emitting element and is emitted to the outside of the electronic device or the display device, various optical phenomena such as a resonance phenomenon and an interference phenomenon may occur. These optical phenomena may affect the quality of a displayed image.

SUMMARY

The present disclosure provides a display device with increased display quality and secured sensing sensitivity of a light detection element.

An embodiment of the inventive concept provides a display device including: a base layer; a pixel defining layer disposed on the base layer, wherein a first light-emitting opening, a second light-emitting opening, a third light-emitting opening, and a light-receiving opening are provided in the pixel defining layer; a first light emitting element including a first electrode, wherein the first light emitting element is exposed by the first light-emitting opening and a first color emission area corresponds to the first light-emitting opening; a second light emitting element including a second electrode, wherein the second light emitting element is exposed by the second light-emitting opening and a second color emission area corresponds to the second light-emitting opening; a third light emitting element including a third electrode, wherein the third light emitting element is exposed by the third light-emitting opening and a third color emission area corresponds to the third light-emitting opening; a light detection element including a fourth electrode, wherein the light detection element is exposed by the light-receiving opening and a light detection area corresponds to the light-receiving opening; a thin film encapsulation layer covering the first light emitting element, the second light emitting element, the third light emitting element, and the light detection element; and a sensing electrode disposed on the thin film encapsulation layer and overlapping the pixel defining layer, wherein a first opening corresponding to the first light-emitting opening and having a larger area than the first light-emitting opening, a second opening corresponding to the second light-emitting opening and having a larger area than the second light-emitting opening, and a third opening corresponding to each of the third light-emitting opening and the light-receiving opening are provided in the sensing electrode, wherein, when the first color emission area, the second color emission area, and the third color emission area are viewed at a first point having a first viewing angle with respect to a normal line of the base layer, the sensing electrode partially shields each of two emission areas among the first color emission area, the second color emission area, and the third color emission area or partially shields one of the first color emission area, the second color emission area, and the third color emission area.

The sensing electrode partially shields the first color emission area and the second color emission area, and when the first viewing angle is 60°, about 5% to about 20% of a size of the first color emission area is shielded by the sensing electrode.

A distance between a plane formed by an upper surface of the first electrode and a plane formed by an upper surface of the sensing electrode is 6 micrometers to 25 micrometers.

A size of the first color emission area shielded by the sensing electrode when the first color emission area is viewed at a second point having the same viewing angle as the first point and having a different azimuth angle is different from a size of the first color emission area shielded by the sensing electrode when the first color emission area is viewed at the first point.

The sensing electrode partially shields the first color emission area and the second color emission area, and a size of the first color emission area and a size of the second color emission area shielded by the sensing electrode are different from each other.

The sensing electrode partially shields the first color emission area and the second color emission area, and the first color emission area and the second color emission area have different areas and shapes on a plane.

A size of the first color emission area and a size of the second color emission area shielded by the sensing electrode are equal to each other.

A distance on a plane between the first color emission area and the sensing electrode measured at an azimuth of the first point is different from a distance on a plane between the second color emission area and the sensing electrode.

The sensing electrode partially shields the first color emission area and the second color emission area, distances between each of the first color emission area and the third color emission area and the sensing electrode measured at azimuth angles of 0°, 45°, 90°, 135°, 180°, 225°, 270°, and 315° are a first distance, a second distance, a third distance, a fourth distance, a fifth distance, a sixth distance, a seventh distance, and an eighth distance, respectively, and each of the first distance to the eighth distance between the sensing electrode and the first color emission area is smaller than a corresponding distance among the first distance and the eighth distance between the sensing electrode and the third color emission area.

A deviation between the first distance and the eighth distance between the sensing electrode and the first color emission area is 1.5 micrometers or less.

When the first color emission area, the second color emission area, and the third color emission area are viewed at a second point having a second viewing angle smaller than the first viewing angle, the first color emission area, the second color emission area, and the third color emission area are not shielded by the sensing electrode.

The sensing electrode partially shields the first color emission area and the second color emission area, the first light-emitting opening has an N-gonal shape, the first opening has an M-gonal shape or a circular or oval shape, where N is a natural number greater than or equal to 4, and M is a natural number greater than N, and the second light-emitting opening has an I-gonal shape, and the second opening has a J-gonal shape or is a circle or oval, where I is a natural number greater than or equal to 4, and J is a natural number greater than I.

The sensing electrode partially shields the first color emission area and the second color emission area, and the third opening is larger than each of the first opening and the second opening.

The first light emitting element further includes a light emitting layer disposed on the first electrode and a first common electrode disposed on the light emitting layer, the light detection element further includes a photoelectric conversion layer disposed on the fourth electrode and a second common electrode disposed on the photoelectric conversion layer, and the first common electrode and the second common electrode have an integral shape.

The sensing electrode partially shields the first color emission area, and does not shield the second color emission area and the third color emission area, distances between each of the first color emission area and the second color emission area and the sensing electrode measured at azimuth angles of 0°, 45°, 90°, 135°, 180°, 225°, 270°, and 315° are a first distance, a second distance, a third distance, a fourth distance, a fifth distance, a sixth distance, a seventh distance, and an eighth distance, respectively, and each of the first distance to the eighth distance between the sensing electrode and the first color emission area is smaller than a corresponding one of the first distance to the eighth distance between the sensing electrode and the second color emission area.

Distances between the sensing electrode and the third color emission area measured at azimuth angles of 0°, 45°, 90°, 135°, 180°, 225°, 270°, and 315° are a first distance, a second distance, a third distance, a fourth distance, a fifth distance, a sixth distance, a seventh distance, and an eighth distance, respectively, and each of the first distance to the eighth distance between the sensing electrode and the first color emission area is smaller than a corresponding one of the first distance to the eighth distance between the sensing electrode and the third color emission area.

An embodiment of the inventive concept provides a display device including: a display panel; and an input sensor disposed on the display panel and including a sensing electrode, wherein the display panel includes: an n-th pixel row (where n is a natural number) including first color emission areas and third color emission areas alternately arranged in a first direction; an (n+1)-th pixel row including second color emission areas arranged in the first direction; an (n+2)-th pixel row including third color emission areas and first color emission areas alternately arranged in the first direction; an (n+3)-th pixel row including second color emission areas arranged in the first direction and aligned with the second color emission areas of the (n+1)-th pixel row in a second direction crossing the first direction; and light detection elements disposed in at least one pixel row among the n-th pixel row to the (n+3)-th pixel row, each of the light detection elements being disposed between adjacent emission areas of the at least one pixel row, wherein the first color emission areas of the n-th pixel row and the third color emission areas of the (n+2)-th pixel row are aligned in the second direction, and the first color emission areas and the third color emission areas of the n-th pixel row are not aligned with the second color emission areas of the (n+1)-th pixel row in the second direction, wherein the sensing electrode includes: first conductive closed line patterns corresponding to the first color emission areas of the n-th pixel row and the (n+2)-th pixel row; and second conductive closed line patterns corresponding to the second color emission areas of the (n+1)-th pixel row and the (n+3)-th pixel row, wherein the first conductive closed line patterns and the second conductive closed line patterns are alternately arranged in each of a first crossing direction and a second crossing direction crossing the first crossing direction, and the first crossing direction crosses the first direction and the second direction, wherein distances between each of the first color emission areas, the second color emission areas, and the third color emission areas and the sensing electrode measured at azimuth angles of 0°, 45°, 90°, 1350, 180°, 2250, 270°, and 315° are a first distance, a second distance, a third distance, a fourth distance, a fifth distance, a sixth distance, a seventh distance, and an eighth distance, respectively, wherein each of the first to eighth distances between the first color emission area and the sensing electrode is smaller than a corresponding one of the first to eighth distances between the third color emission area and the sensing electrode.

An adjacent first conductive closed line pattern and second conductive closed line pattern among the first conductive closed line patterns and the second conductive closed line patterns partially overlap each other.

An overlapping portion of the adjacent first conductive closed line pattern and second conductive closed line pattern is located in the first crossing direction or the second crossing direction.

A deviation between the first distance and the eighth distance between the sensing electrode and the first color emission area is 1.5 micrometers or less.

Each of the first color emission areas has an N-gonal shape, and each of the first conductive closed line patterns has an M-gonal shape or a circular shape or an oval shape, where N is a natural number equal to or greater than 4, and M is a natural number greater than N.

Each of the first to eighth distances between the second color emission area and the sensing electrode is smaller than a corresponding one of the first to eighth distances between the third color emission area and the sensing electrode, wherein each of the second color emission areas has an I-gonal shape, each of the second conductive closed line patterns has a J-gonal shape or is a circle or an ellipse, where I is a natural number equal to or greater than 4, and J is a natural number greater than I.

Each of the first to eighth distances between the second color emission area and the sensing electrode is smaller than a corresponding one of the first to eighth distances between the third color emission area and the sensing electrode.

The second color emission area includes a first type emission area and a second type emission area that are symmetric with respect to a virtual axis situated between an azimuth of 90° and an azimuth of 270°.

Line widths of the first conductive closed line patterns are 3 micrometers to 5 micrometers, and line widths of the second conductive closed line patterns are 3 micrometers to 5 micrometers.

The line widths of the first conductive closed line patterns and the line widths of the second conductive closed line patterns are substantially the same.

Each of the light detection elements includes a first electrode, a photoelectric conversion layer disposed on the first electrode, and a second electrode disposed on the photoelectric conversion layer, and the first conductive closed line patterns and the second conductive closed line patterns do not overlap the first electrode of the light detection elements on a plane.

The light detection elements are disposed between adjacent first and third color emission areas of each of the n-th pixel row and the n+2th pixel row.

An embodiment of the inventive concept provides a display device including: a display panel; and an input sensor disposed on the display panel and including a sensing electrode, wherein the display panel includes: an n-th pixel row (where n is a natural number) including first color emission areas and third color emission areas alternately arranged in a first direction; an (n+1)-th pixel row including second color emission areas arranged in the first direction; an (n+2)-th pixel row including third color emission areas and first color emission areas alternately arranged in the first direction; an (n+3)-th pixel row including second color emission areas arranged in the first direction and aligned with the second color emission areas of the (n+1)-th pixel row in a second direction crossing the first direction; and light detection elements disposed in at least one pixel row among the n-th pixel row to the (n+3)-th pixel row, each of the light detection elements being disposed between adjacent emission areas of the at least one pixel row, wherein the sensing electrode includes: first conductive closed line patterns corresponding to the first color emission areas of the n-th pixel row and the (n+2)-th pixel row; and second conductive closed line patterns corresponding to the second color emission areas of the (n+1)-th pixel row and the (n+3)-th pixel row, wherein the first conductive closed line patterns and the second conductive closed line patterns are alternately disposed in a first crossing direction crossing the first direction and the second direction and are alternately arranged in a second crossing direction crossing the first crossing direction, wherein distances between each of the first color emission areas, the second color emission areas, and the third color emission areas and the sensing electrode measured at azimuth angles of 0°, 45°, 90°, 135°, 180°, 225°, 270°, and 315° are a first distance, a second distance, a third distance, a fourth distance, a fifth distance, a sixth distance, a seventh distance, and an eighth distance, respectively, wherein each of the first to eighth distances between the third color emission area and the sensing electrode is smaller than a corresponding distance among the first to eighth distances between the first color emission area and the sensing electrode and a corresponding distance among the first to eighth distances between the second color emission area and the sensing electrode.

An adjacent third conductive closed line pattern and second conductive closed line pattern among the third conductive closed line patterns and the second conductive closed line patterns partially overlap each other.

An overlapping portion of the adjacent third conductive closed line pattern and second conductive closed line pattern is located in the first crossing direction or the second crossing direction.

A deviation between the first distance and the eighth distance between the sensing electrode and the third color emission area is 1.5 micrometers or less.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 4 is an enlarged plan view of a display area of a display panel according to an embodiment of the inventive concept;

FIG. 5C is a circuit diagram illustrating readout timings of sensors according to an embodiment of the inventive concept shown in FIG. 5B;

DETAILED DESCRIPTION OF THE EMBODIMENTS

Figure 1:
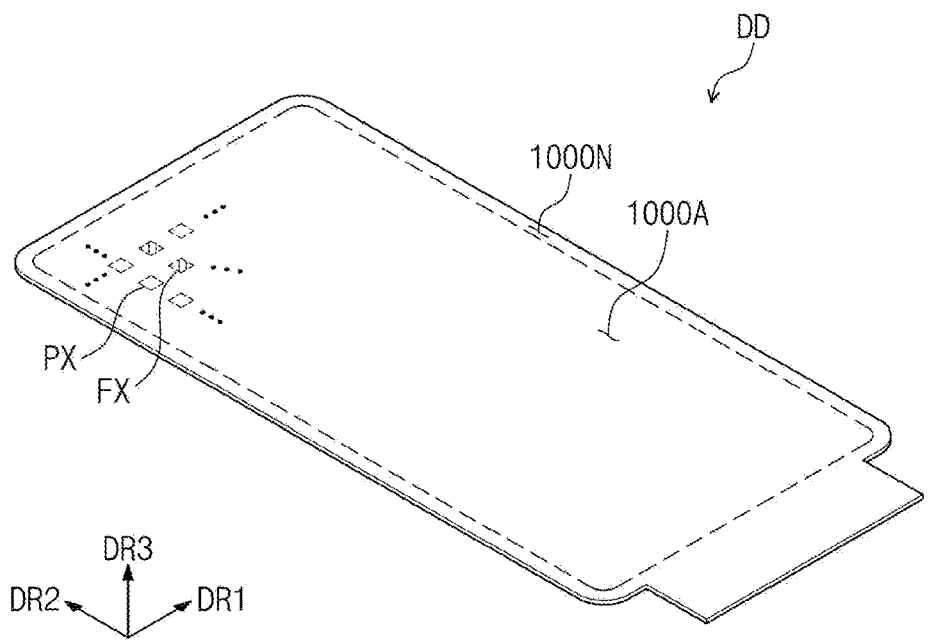
FIG. 1 is a perspective view of a display device according to an embodiment of the inventive concept.

In this specification, when an element (or region, layer, part, etc.) is referred to as being "on", "connected to", or "coupled to" another element, it means that it may be directly placed on/connected to/coupled to other components, or a third component may be arranged between them.

Like reference numerals may refer to like elements. Additionally, in the drawings, the thicknesses, proportions, and dimensions of components may be exaggerated for effective description. "And/or" includes all of one or more combinations defined by related components.

It will be understood that the terms "first" and "second" are used herein to describe various components but these components should not be limited by these terms. The above terms are used to distinguish one component from another. For example, a first component may be referred to as a second component and vice versa. The terms of a singular form may include plural forms unless otherwise specified.

In addition, terms such as "below", "the lower side", "on", and "the upper side" are used to describe a relationship of components shown in the drawings. The terms are described as a relative concept based on a direction shown in the drawings.

In various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which this inventive concept belongs. In addition, terms such as terms defined in commonly used dictionaries should be interpreted as having a meaning consistent with the meaning in the context of the related technology, and it should not be construed in an overly ideal or overly formal sense unless explicitly defined here.

Hereinafter, embodiments of the inventive concept will be described with reference to the drawings.

FIG. 1 is a perspective view of a display device DD according to an embodiment of the inventive concept.

The display device DD may generate an image and sense an external input. The display device DD may include a display area 1000A and a peripheral area 1000N. A plurality of pixels PX and a plurality of sensors FX are disposed in the display area 1000A. The pixel PX may include a first color pixel, a second color pixel, and a third color pixel for generating source light of different colors. The plurality of sensors FX may detect externally received light. The plurality of sensors FX may receive light reflected by a user after a source light is emitted from any one of the first color pixel, the second color pixel, and the third color pixel.

An image may be displayed in the display area 1000A. The display area 1000A may include a plane formed by the first direction DR1 and the second direction DR2. The first direction DR1 may be a direction connecting the azimuth angle of 0° and the azimuth angle of 180° described in FIG. 4B, and the second direction DR2 may be a direction connecting the azimuth angle of 90° and the azimuth angle of 270° described with reference to FIG. 4B.

The display area 1000A may further include curved surfaces each bent from at least two sides of the plane. However, the shape of the display area 1000A is not limited thereto. For example, the display area 1000A may include only the plane, or the display area 1000A may further include at least two or more, for example, four curved surfaces each bent from four sides of the plane. The display device DD may be a foldable display device or a rollable display device.

Figure 2:
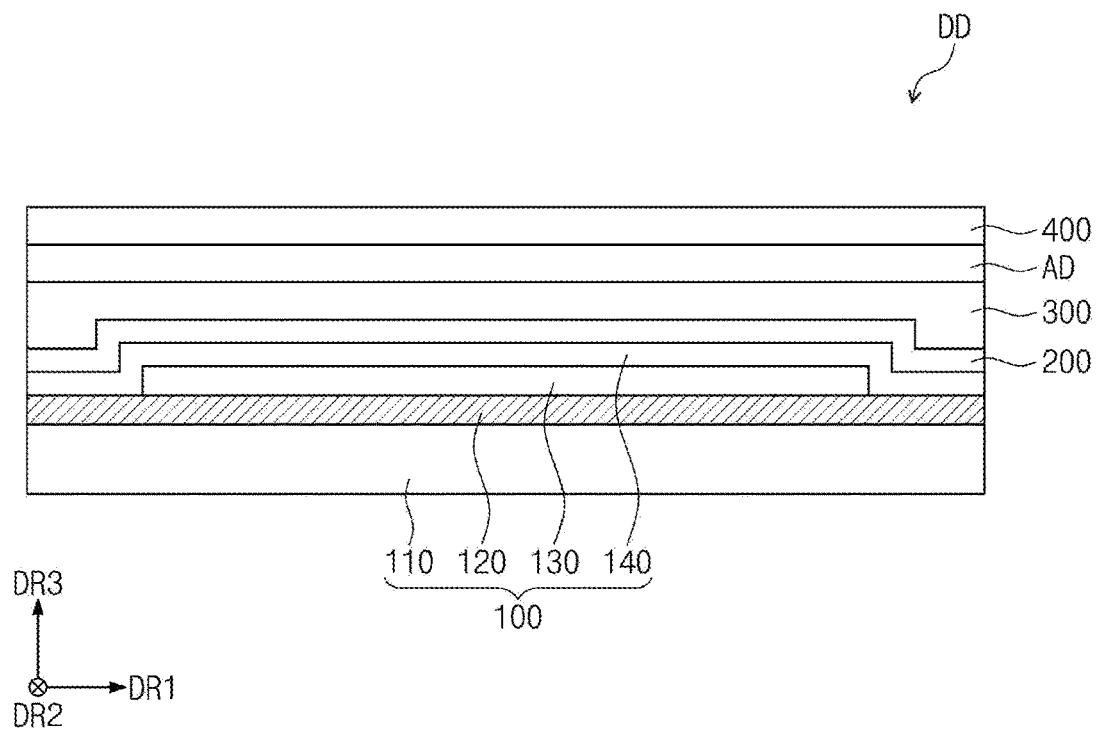
FIG. 2 is a cross-sectional view of a display device according to an embodiment of the inventive concept.

FIG. 2 is a cross-sectional view of a display device DD according to an embodiment of the inventive concept. Referring to FIG. 2, the display device DD may include a display panel 100, an input sensor 200, an anti-reflection layer 300, and a window 400.

The display panel 100 may be a light emitting display panel. The display panel 100 may include a base layer 110, a circuit layer 120, a light emitting element layer 130, and a thin film encapsulation layer 140.

The base layer 110 may provide a base surface on which the circuit layer 120 is disposed. The base layer 110 may be a rigid substrate or a flexible substrate capable of bending, folding, rolling, or the like. The base layer 110 may be a glass substrate, a metal substrate, or a polymer substrate. However, embodiments of the inventive concept are not limited thereto, and the base layer 110 may include an inorganic layer, an organic layer, or a composite material layer.

The base layer 110 may have a multilayer structure. For example, the base layer 110 may include a first synthetic resin layer, a multi- or single-layer inorganic layer, and a second synthetic resin layer disposed on the multi- or single-layer inorganic layer. Each of the first and second synthetic resin layers may include a polyimide-based resin, and is not particularly limited thereto.

The circuit layer 120 may be disposed on the base substrate 110. The circuit layer 120 may include an insulating layer, a semiconductor pattern, a conductive pattern, and a signal line. The circuit layer 120 includes the driving circuit of the pixel PX and the driving circuit of the sensor FX described with reference to FIG. 1.

The light emitting element layer 130 may be disposed on the circuit layer 120. The light emitting element layer 130 may include the light emitting element of the pixel PX described with reference to FIG. 1. For example, the light emitting element may include an organic light emitting material, an inorganic light emitting material, an organic-inorganic light emitting material, a quantum dot, a quantum rod, a micro light emitting diode (LED), or a nano LED. The light emitting element layer 130 may include a light detection element of the sensor FX described with reference to FIG. 1.

The thin film encapsulation layer 140 may be disposed on the light emitting element layer 130. The thin film encapsulation layer 140 may protect the light emitting element layer 130 from foreign substances such as moisture, oxygen, and dust particles. The thin film encapsulation layer 140 may include at least one inorganic layer. The thin film encapsulation layer 140 may include a stacked structure of inorganic layers/organic layers/inorganic layers.

The input sensor 200 may be disposed on the display panel 100. For example, the input sensor 200 may be directly disposed on the thin film encapsulation layer 140. The input sensor 200 may detect an external input applied from the outside. The external input may include various types of inputs such as a part of the user's body, light, heat, pen, or pressure.

The input sensor 200 may be formed on the display panel 100 through a continuous process. In this case, the input sensor 200 may be directly disposed on the display panel 100. In this specification, "the component B is directly disposed on the component A" may mean that a third component is not disposed between the component A and the component B. For example, an adhesive layer may not be disposed between the input sensor 200 and the display panel 100, or for example, an adhesive layer may not be disposed between the input sensor 200 and the thin film encapsulation layer 140.

The anti-reflection layer 300 may reduce the reflectance of external light. The anti-reflection layer 300 may be directly disposed on the input sensor 200. The anti-reflection layer 300 may include color filters. The anti-reflection layer 300 may include a first color filter, a second color filter, and a third color filter arranged to correspond to or overlap the first color pixel, the second color pixel, and the third color pixel, respectively. The anti-reflection layer 300 may further include a black matrix. The black matrix may be disposed between the first color filter, the second color filter, and the third color filter. The black matrix may set a boundary between the first color filter, the second color filter, and the third color filter.

However, the inventive concept is not limited thereto, and the anti-reflection layer 300 and the input sensor 200 may be coupled by an adhesive layer AD. The anti-reflection layer 300 may include an optical film. The optical film may include a polarizing film. The optical film may further include a retarder film. The retarder film may include at least one of a λ/2 retarder film and a λ/4 retarder film.

The window 400 is disposed on the anti-reflection layer 300. The window 400 and the anti-reflection layer 300 may be coupled by the adhesive layer AD. The adhesive layer AD may be a pressure sensitive adhesive film (PSA) or an optically clear adhesive (OCA).

The window 400 includes at least one base layer. The base layer may be a glass substrate or a synthetic resin film. The window 400 may have a multi-layered structure. The window 400 may include a thin glass substrate and a synthetic resin film disposed on the thin glass substrate. The thin glass substrate and the synthetic resin film may be bonded by an adhesive layer, and the adhesive layer and the synthetic resin film may be separated from the thin glass substrate in their replacement process.

In an embodiment of the inventive concept, the adhesive layer AD may be omitted, and the window 400 may be directly disposed on the anti-reflection layer 300. An organic material, an inorganic material, or a ceramic material may be coated on the anti-reflection layer 300.

Figure 3:
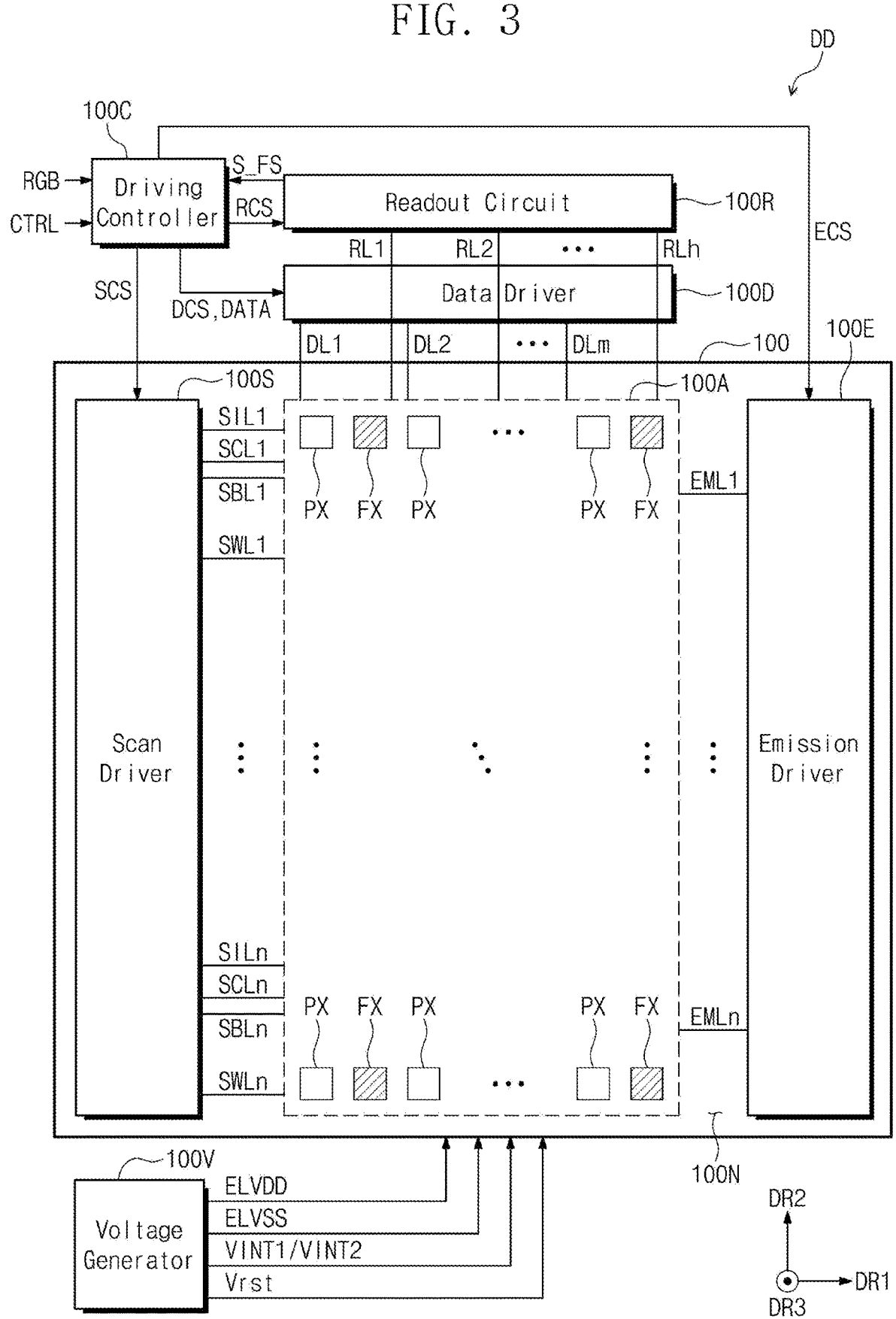
FIG. 3 is a block diagram of a display device according to an embodiment of the inventive concept.

FIG. 3 is a block diagram of a display device DD according to an embodiment of the inventive concept.

Referring to FIG. 3, the display device DD includes a display panel 100, a driving controller 100C, and a driving circuit. As an example of the inventive concept, the driving circuit includes a data driver 100D, a scan driver 100S, an emission driver 100E, a voltage generator 100V, and a readout circuit 100R. In an embodiment of the inventive concept, the voltage generator 100V and the readout circuit 100R may be implemented with the driving controller 100C and one driving chip.

The driving controller 100C receives an image signal RGB and a control signal CTRL. The driving controller 100C generates an image data signal DATA by converting the data format of the image signal RGB to match the interface specification of the data driver 100D. The driving controller 100C outputs a first control signal SCS, a second control signal ECS, a third control signal DCS, and a fourth control signal RCS.

The data driver 100D receives the third control signal DCS and the image data signal DATA from the driving controller 100C. The data driver 100D converts the image data signal DATA into data signals, and outputs the data signals to a plurality of data lines DL1 to DLm, which will be described later. The data signals are analog voltages corresponding to the grayscale value of the image data signal DATA.

The scan driver 100S receives the first control signal SCS from the driving controller 100C. The scan driver 100S may output scan signals to scan lines in response to the first control signal SCS.

The voltage generator 100V generates voltages necessary for the operation of the display panel 100. In this embodiment, the voltage generator 100V generates a first driving voltage ELVDD, a second driving voltage ELVSS, a first initialization voltage VINT1, and a second initialization voltage VINT2. The voltage generator 100V also generates a reset voltage Vrst.

Each of the plurality of sensors FX may be disposed between two pixels PX adjacent to each other. The plurality of pixels PX and the plurality of sensors FX may be alternately disposed in the first and second directions DR1 and DR2. However, the embodiment of the inventive concept is not limited thereto. In other words, two or more pixels PX are disposed between two sensors FX adjacent to each other in the first direction DR1, and two or more pixels PX may be disposed between two sensors FX adjacent to each other in the second direction DR2.

The display panel DP further includes initialization scan lines SIL1 to SILn, compensation scan lines SCL1 to SCLn, write scan lines SWL1 to SWLn, block scan lines SBL1 to SBLn, emission control lines EML1 to EMLn, data lines DL1 to DLm, and readout lines RL1 to RLh. The initialization scan lines SIL1 to SILn, the compensation scan lines SCL1 to SCLn, the write scan lines SWL1 to SWLn, the block scan lines SBL1 to SBLn, and the emission control lines EML1 to EMLn extend in the first direction DR1. The initialization scan lines SIL1 to SILn, the compensation scan lines SCL1 to SCLn, the write scan lines SWL1 to SWLn, the block scan lines SBL1 to SBLn, and the emission control lines EML1 to EMLn are spaced apart from each other in the second direction DR2. The data lines DL1 to DLm and the readout lines RL1 to RLh extend in the second direction DR2 and are spaced apart from each other in the first direction DR1.

The plurality of pixels PX are electrically connected to the initialization scan lines SIL1 to SILn, the compensation scan lines SCL1 to SCLn, the write scan lines SWL1 to SWLn, the block scan lines SBL1 to SBLn, the emission control lines EML1 to EMLn, and the data lines DL1 to DLm, respectively. For example, each of the plurality of pixels PX may be electrically connected to four scan lines. However, the number of scan lines connected to each pixel PX is not limited thereto and may be changed.

The plurality of sensors FX are electrically connected to the write scan lines SWL1 to SWLn and the readout lines RL1 to RLh, respectively. Each of the plurality of sensors FX may be electrically connected to one scan line. However, the embodiment of the inventive concept is not limited thereto. The number of scan lines connected to each sensor FX may vary. As an example of the inventive concept, the number of the readout lines RL1 to RLh may correspond to ½ of the number of the data lines DL1 to DLm. However, the embodiment of the inventive concept is not limited thereto. Alternatively, the number of readout lines RL1 to RLh may correspond to ¼ or ⅛ of the number of data lines DL1 to DLm. The number of readout lines RL1 to RLh may be the same as the number of data lines DL1 to DLm.

The scan driver 100S may be disposed in the peripheral area 100N of the display panel 100. The scan driver 100S receives the first control signal SCS from the driving controller 100C. The scan driver 100 outputs initialization scan signals to the initialization scan lines SIL1 to SILn in response to the first control signal SCS, and outputs compensation scan signals to the compensation scan lines SCL1 to SCLn. In addition, the scan driver 100 may output write scan signals to the write scan lines SWL1 to SWLn in response to the first control signal SCS, and output block scan signals to the block scan lines SBL1 to SBLn. Alternatively, the scan driver 100S may include first and second scan drivers. The first scan driver may output initialization scan signals and compensation scan signals, and the second scan driver may output write scan signals and block scan signals.

The emission driver 100E may be disposed in the peripheral area 100N of the display panel 100. The emission driver 100E receives the second control signal ECS from the driving controller 100C. The emission driver 100E may output emission control signals to the emission control lines EML1 to EMLn in response to the second control signal ECS. Alternatively, the scan driver 100S may be connected to the emission control lines EML1 to EMLn. In this case, the emission driver 100E may be omitted, and the scan driver 100S may output emission control signals to the emission control lines EML1 to EMLn.

The readout circuit 100R receives the fourth control signal RCS from the driving controller 100C. The readout circuit 100R may receive detection signals from the readout lines RL1 to RLh in response to the fourth control signal RCS. The readout circuit 100R may process detection signals received from the readout lines RL1 to RLh and provide the processed detection signals S_FS to the driving controller 100C. The driving controller 100C may recognize biometric information based on the detection signals S_FS.

FIG. 4 is an enlarged plan view of a display area 100A of the display panel 100 (refer to FIG. 3) according to an embodiment of the inventive concept.

Referring to FIG. 4, the display area 100A may include a plurality of emission areas PXA-R, PXA-G, and PXA-B and a non-emission area NPXA disposed around the plurality of emission areas PXA-R, PXA-G, and PXA-B. A plurality of light detection areas SA are disposed in the non-emission area NPXA.

The plurality of emission areas PXA-R, PXA-G, and PXA-B may be divided into three groups of emission areas PXA-B, PXA-R, and PXA-G. The three groups of emission areas PXA-B, PXA-R, and PXA-G may be classified according to the color of the source light generated by the light emitting element ED_R (refer to FIG. 7A).

In this embodiment, the first color emission area PXA-R provides red light, the second color emission area PXA-G provides green light, and the third color emission area PXA-B provides blue light. In this embodiment, the first color emission area PXA-R, the second color emission area PXA-G, and the third color emission area PXA-B may be referred to as a red emission area, a green emission area, and a blue emission area, respectively. In an embodiment of the inventive concept, the display panel 100 may include three groups of emission areas displaying three primary colors of yellow, magenta, and cyan.

Areas of the first color emission area PXA-R, the second color emission area PXA-G, and the third color emission area PXA-B may be different from each other. However, the embodiment of the inventive concept is not limited thereto, and the areas of the first color emission area PXA-R, the second color emission area PXA-G, and the third color emission area PXA-B may be the same.

Each of the first color emission area PXA-R, the second color emission area PXA-G, and the third color emission area PXA-B may have a "substantial polygonal shape". Herein, the "substantial polygonal shape" includes a polygon in a mathematical sense, a polygon in which curves are defined at vertices, or a polygon with unclear (e.g., not sharp) vertices. The shape of the emission area is the same as that of the light-emitting opening PDL-OP1 (see FIG. 7A) formed on the pixel defining layer PDL (see FIG. 7A), and the shape of the vertex may vary depending on the etching properties of the pixel defining layer PDL.

In the present embodiment, a first color emission area PXA-R and a third color emission area PXA-B having an octagonal shape symmetric with respect to each of the first direction DR1 and the second direction DR2 are illustrated. In addition, second color emission areas PXA-G having an octagonal shape that are non-symmetric with respect to each of the first and second directions DR1 and DR2 are illustrated. The second color emission area PXA-G may be symmetric with respect to a first diagonal direction CDR1 crossing with respect to the first direction DR1 and the second direction DR2, and may be symmetric with respect to a second diagonal direction CDR2 orthogonal to the first diagonal direction CDR1.

The second color emission area PXA-G may include a first type second color emission area PXA-G1 (hereinafter, referred to as a first type emission area) and a second type second color emission area PXA-G2 (hereinafter referred to as a second type emission area) symmetric with respect to the second direction DR2. In an embodiment of the inventive concept, the second color emission area PXA-G may include only the first type emission area PXA-G1 or the second type emission area PXA-G2. In an embodiment of the inventive concept, the second color emission area PXA-G may include an emission area symmetric with respect to each of the first direction DR1 and the second direction DR2.

In an embodiment of the inventive concept, the first color emission area PXA-R and the third color emission area PXA-B may have a substantially square shape symmetric with respect to each of the first direction DR1 and the second direction DR2. In an embodiment of the inventive concept, the second color emission areas PXA-G may have a substantially rectangular shape. The first type emission area PXA-G1 and the first type emission area PXA-G2 may have a substantially rectangular shape symmetric with respect to the second direction DR2.

Each of the plurality of light detection areas SA may have a "substantial polygonal shape". The shape of the light detection area SA is the same as the shape of the light-receiving opening PDL-OP2 (see FIG. 7A) formed in the pixel defining layer PDL (see FIG. 7A), and the shape of the vertex may vary depending on the etching properties of the pixel defining layer PDL. Although the square light detection areas SA are illustrated in the present embodiment, the inventive concept is not limited thereto.

Referring to FIG. 4, the plurality of emission areas PXA-B, PXA-R, and PXA-G may form a plurality of pixel rows arranged along the second direction DR2. In pixels arranged in the same pixel row, emission areas are aligned along the row direction.

The pixel rows may include an n-th pixel row PXLn (n is a natural number), an (n+1)-th pixel row PXLn+1, an (n+2)-th pixel row PXLn+2, and an (n+3)-th pixel row PXLn)+3. The four pixel rows PXLn, PXLn+1, PXLn+2, and PXLn+3 form a group and may be repeatedly arranged along the second direction DR2. Each of the four pixel rows PXLn, PXLn+1, PXLn+2, and PXLn+3 may extend along the first direction DR1.

The n-th pixel row PXLn may include first color emission areas PXA-R and third color emission areas PXA-B alternately arranged along the first direction DR1. The (n+2)-th pixel row PXLn+2 may include third color emission areas PXA-B and first color emission areas PXA-R alternately arranged along the first direction DR1.

The arrangement order of the emission areas of the n-th pixel row PXLn and the arrangement order of the emission areas of the (n+2)-th pixel row PXLn+2 are different from each other. The third color emission areas PXA-B and the first color emission areas PXA-R of the n-th pixel row PXLn are staggered from the third color emission areas PXA-B and the first color emission areas PXA-R of the (n+2)-th pixel row PXLn+2. In other words, the first color emission areas PXA-R of the n-th pixel row PXLn do not overlap the first color emission areas PXA-R of the (n+2)-th pixel row PXLn+2. The emission areas of the n-th pixel row PXLn are shifted along the second direction DR2 by one emission area compared to the emission areas of the (n+2)-th pixel row PXLn+2.

The second color emission areas PXA-G are disposed in each of the (n+1)-th pixel row PXLn+1 and the (n+3)-th pixel row PXLn+3. The (n+1)-th pixel row PXLn+1 may include second type emission areas PXA-G2 and first type emission areas PXA-G1 alternately arranged along the first direction DR1 and the (n+3)-th pixel row PXLn+3 may include first type emission areas PXA-G1 and second type emission areas PXA-G2 alternately arranged along the first direction DR1.

The emission areas of the n-th pixel row PXLn and the emission areas of the (n+1)-th pixel row PXLn+1 may be staggered from each other and may be non-aligned in the second direction DR2. For example, centers of the emission areas of the n-th pixel row PXLn and centers of the emission areas of the (n+1)-th pixel row PXLn+1 may not overlap in the second direction DR2. The emission areas of the (n+2)-th pixel row PXLn+2 and the emission areas of the (n+3)-th pixel row PXLn+3 are staggered from each other. Center points B-P of emission areas disposed in each of the four pixel rows PXLn, PXLn+1, PXLn+2, and PXLn+3 may be disposed on the same virtual line IL.

The plurality of emission areas PXA-R, PXA-G, and PXA-B form the above-described arrangement, so that four second color emission areas PXA-G are arranged around one first color emission area PXA-R. Two second color emission areas PXA-G face each other in the first diagonal direction CDR1 with the first color emission area PXA-R therebetween, and two other second color emission areas PXA-G face each other in the second diagonal direction CDR2 with the first color emission area PXA-R therebetween. In addition, four second color emission areas PXA-G are arranged around one third color emission area PXA-B. Two second color emission areas PXA-G face each other in the first diagonal direction CDR1 with the third color emission area PXA-B therebetween, and two other second color emission areas PXA-G face each other in the second diagonal direction CDR2 with the third color emission area PXA-B therebetween.

The plurality of light detection areas SA may be disposed in at least one of the n-th pixel row to the (n+3)-th pixel row PXLn, PXLn+1, PXLn+2, and PXLn+3. As in the present embodiment, the plurality of light detection areas SA may be disposed in the n-th pixel row PXLn and the (n+2)-th pixel row PXLn+2. However, the embodiment of the inventive concept is not limited thereto, and the plurality of light detection areas SA may be disposed in each of the n-th pixel row to the (n+3)-th pixel row PXLn, PXLn+1, PXLn+2, and PXLn+3.

Each of the plurality of light detection areas SA is disposed between adjacent emission areas of the at least one pixel row. The plurality of light detection areas SA may be disposed between the first color emission area PXA-R and the third color emission area PXA-B of the n-th pixel row PXLn, and the plurality of light detection areas SA may be disposed between the first color emission area PXA-R and the third color emission area PXA-B of the (n+2)-th pixel row PXLn+2.

Thus, each of the plurality of light detection areas SA may be surrounded by the first color emission area PXA-R, the third color emission area PXA-B, and two second color emission areas PXA-G. The light detection area SA disposed in the n-th pixel row PXLn is disposed between the first color emission area PXA-R and the third color emission area PXA-B in the first direction DR1, and is disposed between the two second color emission areas PXA-G in the second direction DR2.

Figure 5A:
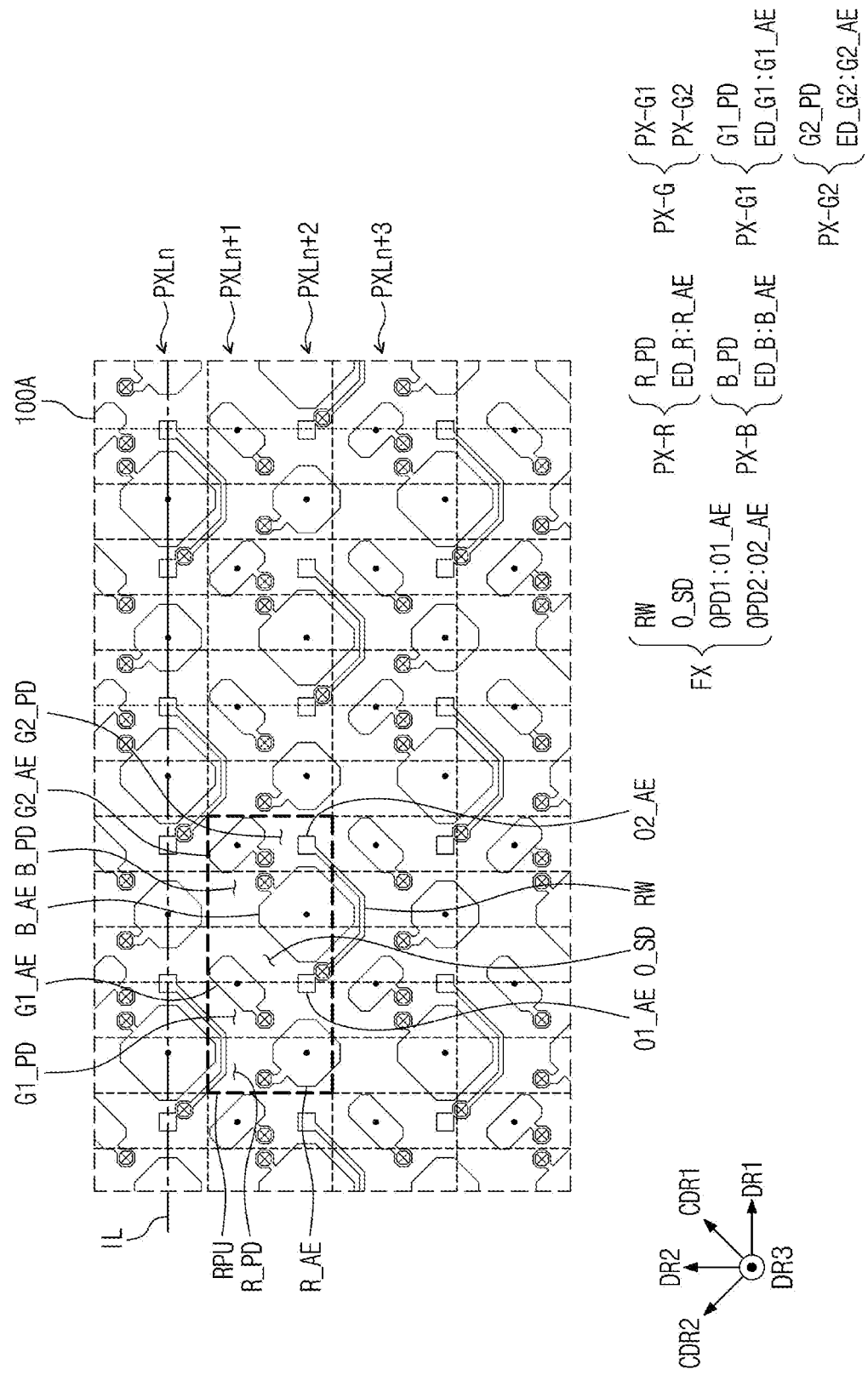
FIG. 5A is a plan view illustrating a connection relationship between a light detection element and a sensor driving circuit according to an embodiment of the inventive concept.
Figure 5B:
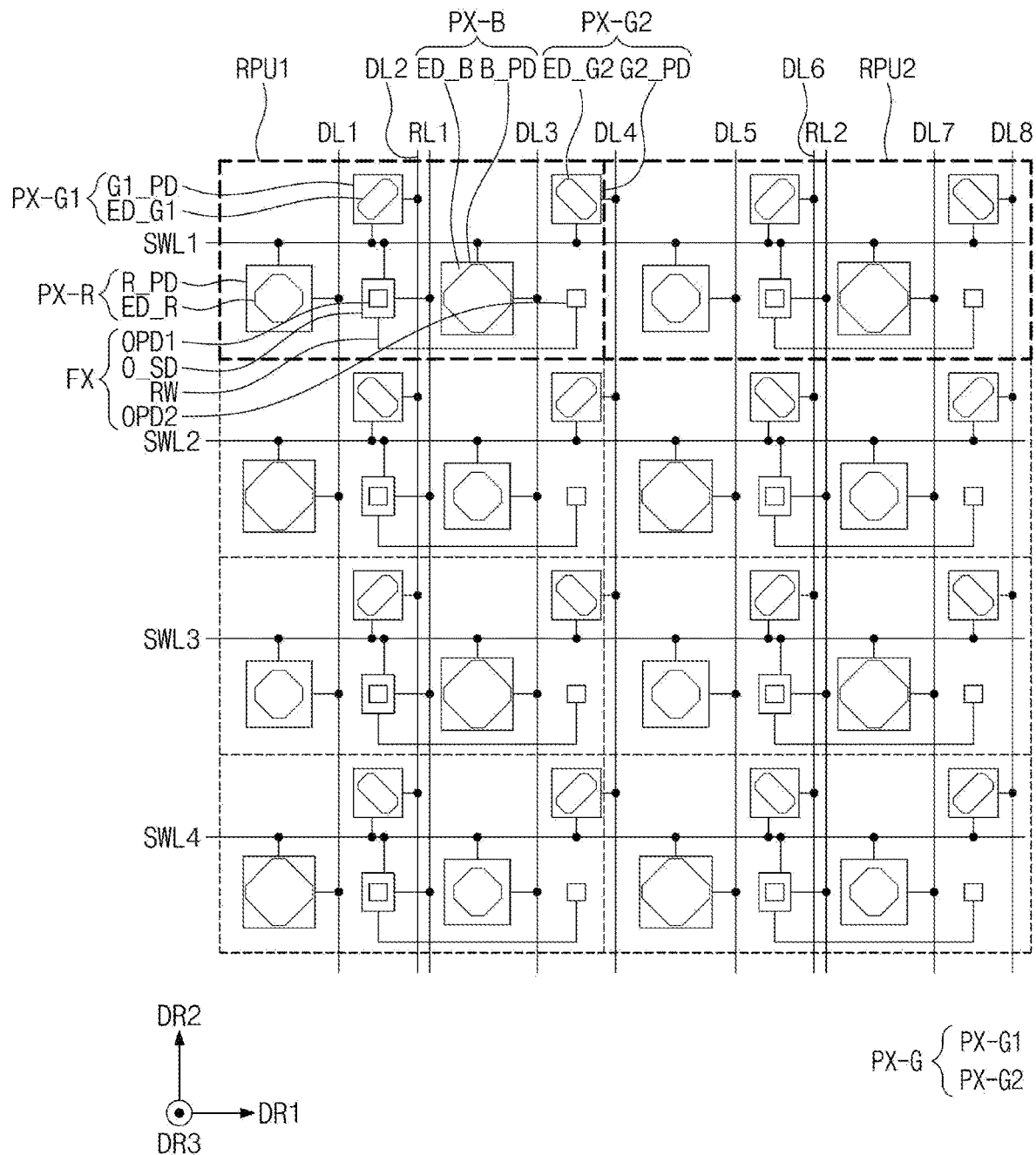
FIG. 5B is a circuit diagram illustrating a connection relationship between the light detection element shown in FIG. 5A and a sensor driving circuit.

FIG. 5A is a plan view illustrating a connection relationship between a light detection element and a sensor driving circuit according to an embodiment of the inventive concept. FIG. 5B is a circuit diagram illustrating a connection relationship between the light detection element shown in FIG. 5A and a sensor driving circuit. FIG. 5C is a circuit diagram illustrating readout timing of sensors according to an embodiment of the inventive concept shown in FIG. 5B.

Hereinafter, the first color pixel PX-R is referred to as a red pixel, the second color pixel PX-G is referred to as a green pixel, and the third color pixel PX-B is referred to as a blue pixel. The second color pixel PX-G may include a first type pixel PX-G1 and a second type pixel PX-G2. In addition, the first light emitting element ED_R is referred to as a red light emitting element, the second light emitting element ED_G is referred to as a green light emitting element, and the third light emitting element ED_B is referred to as a blue light emitting element. The second light emitting element ED_G may include a first type light emitting element ED_G2 and a second type light emitting element ED_G2.

Referring to FIG. 5A, the first electrode R_AE of the first light emitting element ED_R is illustrated to correspond to the first color emission area PXA-R illustrated in FIG. 4. The first electrode G1_AE of the second light emitting element ED_G1 of the first type is shown to correspond to the second color emission area PXA-G1 of the first type. The first electrode G2_AE of the second light emitting element ED_G2 of the second type is shown to correspond to the second color emission area PXA-G2 of the second type. The first electrode B_AE of the third light emitting element ED_B is illustrated to correspond to the third color emission area PXA-B. The first electrode O1_AE of the first light detection element OPD1 is shown to correspond to one of the two light detection areas SA in the unit area RPU, and the first electrode O2_AE of the second light detection element OPD2 is shown to correspond to the other one of the two light detection areas SA in the unit area RPU.

The pixel driving circuit R_PD of the first color pixel PX-R, the pixel driving circuit G1_PD of the first type second color pixel PX-G1, the pixel driving circuit G2_PD of the second type second pixel PX-G2, the pixel driving circuit B_PD of the third color pixel PX-B, and the sensor driving circuit O_SD are disposed in the unit area RPU.

The first electrodes R_AE, G1_AE, G2_AE, and B_AE of the respective light emitting elements ED_R, ED_G1, ED_G2, and ED_B are electrically connected to the corresponding pixel driving circuits R_PD, G1_PD, G2_PD, and B_PD. For example, the first light emitting element ED_R is electrically connected to its pixel driving circuit R_PD. Specifically, the first electrode R_AE of the first light emitting element ED_R is connected to the corresponding pixel driving circuit R_PD through a contact hole.

The sensor FX includes a first light detection element OPD1, a second light detection element OPD2, and a sensor driving circuit O_SD. In this embodiment, both the first light detection element OPD1 and the second light detection element OPD2 may be electrically connected to one sensor driving circuit O_SD. The sensor FX may further include a routing wire RW that electrically connects the first and second light detection elements OPD1 and OPD2. The first electrode O1_AE of the first light detection element OPD1 and the first electrode O2_AE of the second light detection element OPD2 may be connected through the routing wire RW, and the first electrode O1_AE of the first light detection element OPD1 may be connected to the sensor driving circuit O_SD through a contact hole.

In an embodiment of the inventive concept, the first light detection element OPD1 and the second light detection element OPD2 may be connected to different sensor driving circuits O_SD. In this case, it is as if two sensors FX are arranged in one unit area RPU.

FIG. 5B briefly illustrates a connection relationship between the pixels PX-R, PX-G, and PX-B and the sensor FX for the write scan lines SWL1 to SWL4, the readout lines RL1 and RL2, and the data lines DL1 to DL8. The first unit area RPU1 and the second unit area RPU2 arranged in the second direction DR2 will be mainly described.

Four scan lines (e.g., a write scan line, a compensation scan line, an initialization scan line, and a block scan line) are connected to each of the first to third pixels PX-R, PX-G, and PX-B. In FIG. 5B, only one (e.g., a write scan line) of the four scan lines is illustrated for convenience of description.

In FIG. 5B, four write scan lines SWL1 to SWL4 among the plurality of write scan lines SWL1 to SWLn (see FIG. 3) are shown, and only eight data lines DL1 to DL8 among the plurality of data lines DL1 to DLm (see FIG. 3) and only two readout lines RL1 and RL2 among the plurality of readout lines RL1 to RLh (see FIG. 3) are shown.

The first write scan line SWL1 and the first to fourth data lines DL1 to DL4 may be connected to the first to third pixels PX-R, PX-G, and PX-B disposed in the first unit area RPU1. The first write scan line SWL1 and the fifth to eighth data lines DL5 to DL8 may be connected to the first to third pixels PX-R, PX-G, and PX-B disposed in the second unit area RPU2. A first write scan line SWL1 and a first readout line RL1 are connected to the sensor FX disposed in the first unit area RPU1, and the first write scan line SWL1 and the second readout line RL2 are connected to the sensor FX disposed in the second unit area RPU2.

Referring to FIGS. 5B and 5C, the sensor driving circuit O_SD may output the first and second detection signals FS1 and FS2 to the first and second readout lines RL1 and RL2, respectively, during the activation section of the write scan signals SW1 to SW4 applied to the corresponding write scan lines SWL1 to SWL4.

Figure 6A:
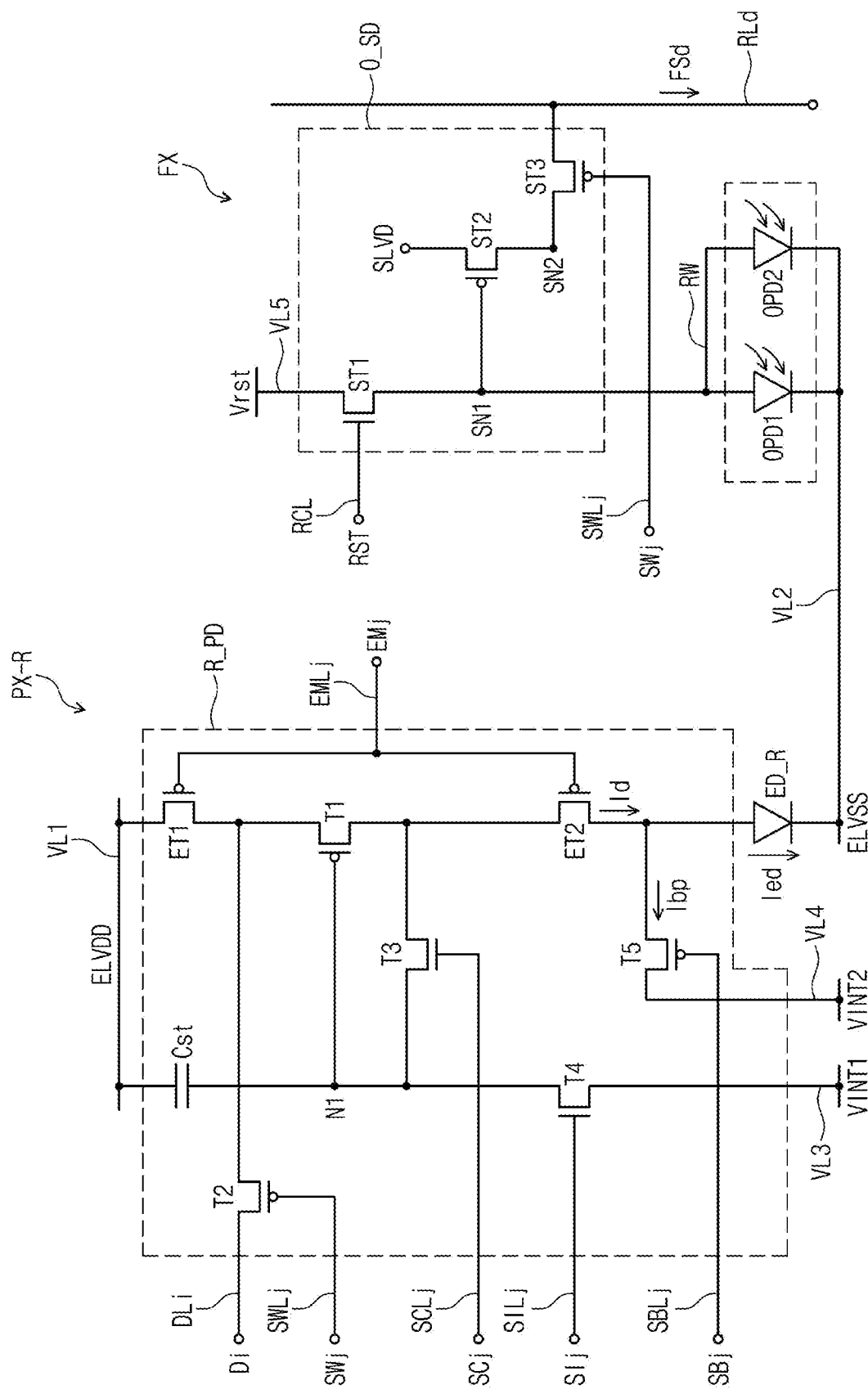
FIG. 6A is a circuit diagram illustrating a pixel and a sensor according to an embodiment of the inventive concept.
Figure 6B:
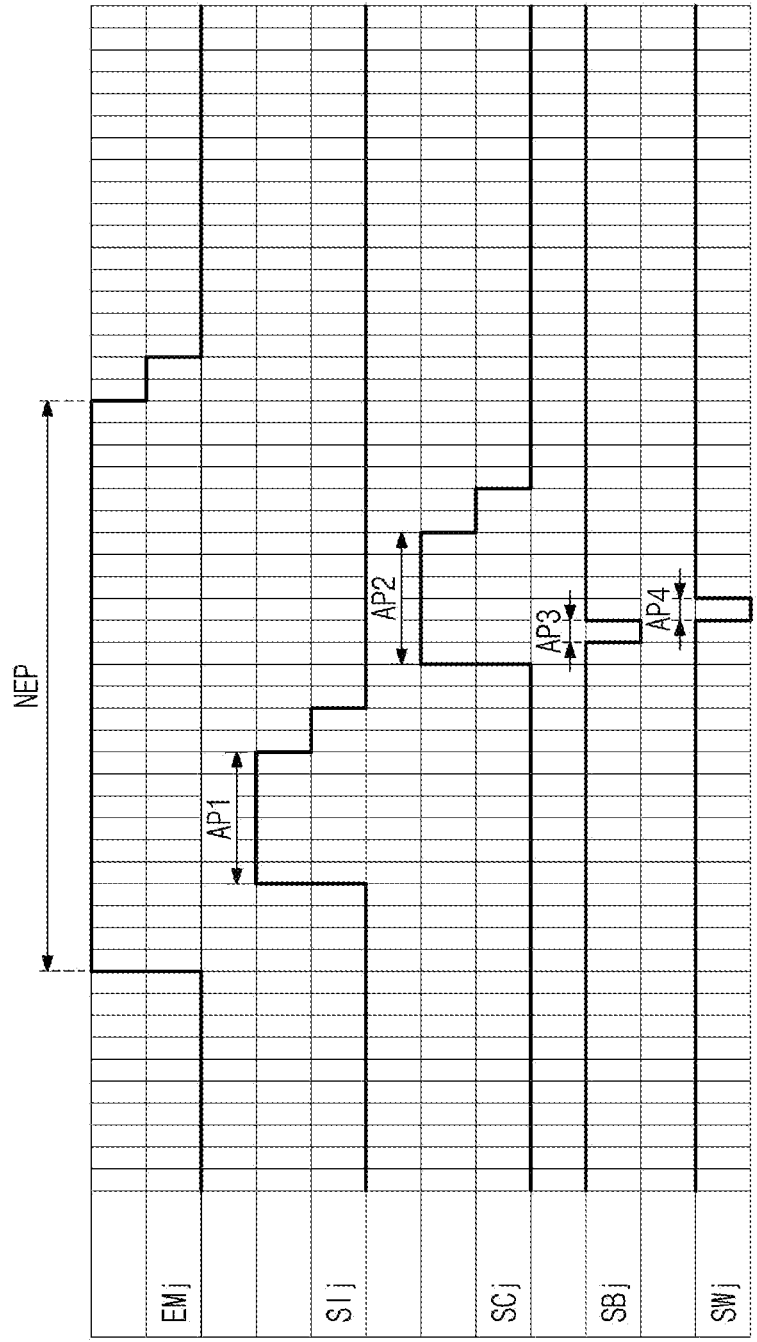
FIG. 6B is a waveform diagram for explaining the operation of the pixel and the sensor illustrated in FIG. 6A.

FIG. 6A is a circuit diagram illustrating a pixel PX-R and a sensor FX according to an embodiment of the inventive concept, and FIG. 6B is a waveform diagram for explaining operations of the pixel PX-R and the sensor FX illustrated in FIG. 6A.

FIG. 6A is an equivalent circuit diagram of a first color pixel PX-R among the plurality of pixels PX-R, PX-G, and PX-B illustrated in FIGS. 5A and 5B. Since each of the plurality of pixels PX-R, PX-G, and PX-B has the same circuit structure, a detailed description of the remaining pixels will be omitted. In addition, FIG. 6A shows an equivalent circuit diagram of one sensor FX among the plurality of sensors FX shown in FIGS. 5A and 5B. Since each of the plurality of sensors FX has the same circuit structure, a detailed description of the remaining sensors will be omitted.

Referring to FIG. 6A, the first color pixel PX-R is connected to the i-th data line DLi, the j-th initialization scan line SILj, the j-th compensation scan line SCLj, the j-th write scan line SWLj, the j-th block scan line SBLj, and the j-th emission control line EMLj.

The pixel driving circuit R_PD includes first to fifth transistors T1, T2, T3, T4, and T5, first and second emission control transistors ET1 and ET2, and one capacitor Cst. At least one of the first to fifth transistors T1, T2, T3, T4, and T5 and the first and second emission control transistors ET1 and ET2 may be a transistor having a low-temperature polycrystalline silicon (LTPS) semiconductor layer. Some of the first to fifth transistors T1, T2, T3, T4, and T5 and the first and second emission control transistors ET1 and ET2 may be P-type transistors, and the remaining of the first to fifth transistors T1, T2, T3, T4, and T5 and the first and second emission control transistors ET1 and ET2 may be N-type transistors. For example, the first, second, and fifth transistors T1, T2, and T5, and the first and second emission control transistors ET1 and ET2 may be PMOS transistors, and the third and fourth transistors T3 and T4 may be NMOS transistors. Hereinafter, the sources, drains, and gates of the first, second, and fifth transistors T1, T2, and T5 and the first and second emission control transistors ET1 and ET2 will be described based on the PMOS transistor, and sources, drains, and gates of the third and fourth transistors T3 and T4 are described with reference to the NMOS transistor.

At least one of the first to fifth transistors T1, T2, T3, T4, and T5 and the first and second emission control transistors ET1 and ET2 may be a transistor having a low-temperature polycrystalline silicon (LTPS) semiconductor layer. For example, the third and fourth transistors T3 and T4 are oxide semiconductor transistors, and the first, second, and fifth transistors T1, T2, and T5, and the first and second emission control transistors ET1 and ET2 may be silicon transistors.

The configuration of the pixel driving circuit R_PD according to the inventive concept is not limited to the embodiment shown in FIG. 6A. The pixel driving circuit R_PD illustrated in FIG. 6A is just an example, and the configuration of the pixel driving circuit R_PD may be modified. For example, all of the first to fifth transistors T1, T2, T3, T4, and T5 and the first and second emission control transistors ET1 and ET2 may be P-type transistors or N-type transistors.

The j-th initialization scan line SILj, the j-th compensation scan line SCLj, the j-th write scan line SWLj, the j-th block scan line SBLj, and the j-th emission control line EMLj may transmit the j-th initialization scan signal SIj, the j-th compensation scan signal SCj, the j-th write scan signal SWj, the j-th block scan signal SBj, and the j-th emission control signal EMj to the first color pixel PXR, respectively. The i-th data line DLi transmits the i-th data signal Di to the first color pixel PX-R. The i-th data signal Di may have a voltage level corresponding to the image signal RGB (refer to FIG. 3) input to the display device DD (refer to FIG. 3).

Each of the first and second driving voltage lines VL1 and VL2 may transmit the first driving voltage ELVDD and the second driving voltage ELVSS to the first color pixel PX-R. In addition, the first and second initialization voltage lines VL3 and VL4 may transmit the first initialization voltage VINT1 and the second initialization voltage VINT2 to the first color pixel PX-R, respectively.

The first transistor T1 is connected between the first driving voltage line VL1 for receiving the first driving voltage ELVDD and the first light emitting element ED_R. The first transistor T1 may include a source connected to the first driving voltage line VL1 via the first emission control transistor ET1, a drain connected to the first electrode R_AE (see FIG. 5A) of the first light emitting element ED_R via the second emission control transistor ET2, and a gate connected to a first end of the capacitor Cst (e.g., the first node N1). The first transistor T1 may receive the i-th data signal Di transmitted from the i-th data line DLi according to the switching operation of the second transistor T2, and supply a driving current Id to the first light emitting element ED_R.

The second transistor T2 is connected between the i-th data line DLi and the source of the first transistor T1. The second transistor T2 includes a source connected to the i-th data line DLi, a drain connected to the source of the first transistor T1, and a gate connected to the j-th write scan line SWLj. The second transistor T2 is turned on according to the write scan signal SWj received through the j-th write scan line SWLj to transmit the i-th data signal Di transmitted from the i-th data line DLi to the source of the first transistor T1.

The third transistor T3 is connected between the drain of the first transistor T1 and the first node N1. The third transistor T3 includes a source connected to the gate of the first transistor T1, a drain connected to the drain of the first transistor T1, and a gate connected to the j-th compensation scan line SCLj. The third transistor T3 is turned on according to the j-th compensation scan signal SCj received through the j-th compensation scan line SCLj to diode-connect the first transistor T1 by connecting the drain and the gate of the first transistor T1 to each other.

The fourth transistor T4 is connected between the first initialization voltage line VL3 to which the first initialization voltage VINT1 is applied and the first node N1. The fourth transistor T4 includes a source connected to the first initialization voltage line VL3 to which the first initialization voltage VINT1 is transmitted, a drain connected to the first node N1, and a gate connected to a j-th initialization scan line SILj. The fourth transistor T4 is turned on according to the j-th initialization scan signal SIj received through the j-th initialization scan line SILj. The turned-on fourth transistor T4 transmits the first initialization voltage VINT1 to the first node N1 to initialize the potential (e.g., the potential of the first node N1) of the gate of the first transistor T1.

The first emission control transistor ET1 includes a source connected to the first driving voltage line VL1, a drain connected to the source of the first transistor T1, and a gate connected to the j-th emission control line EMLj. The second emission control transistor ET2 includes a source connected to the drain of the first transistor T1, a drain connected to the first electrode R_AE (refer to FIG. 5A) of the first light emitting element ED_R, and a gate connected to the j-th emission control line EMLj. The first and second emission control transistors ET1 and ET2 are simultaneously turned on according to the j-th emission control signal EMj received through the j-th emission control line EMLj. The first driving voltage ELVDD applied through the turned-on first emission control transistor ET1 may be compensated through the diode-connected first transistor T1 and then transmitted to the first light emitting element ED_R.

The fifth transistor T5 includes a drain connected to the second initialization voltage line VL4 to which the second initialization voltage VINT2 is transmitted, a source connected to the drain of the second emission control transistor ET2, and a gate connected to the block scan line SBLj. The second initialization voltage VINT2 may have a voltage level equal to or lower than the first initialization voltage VINT1.

As described above, the first end of the capacitor Cst is connected to the gate of the first transistor T1 and a second end of the capacitor Cst is connected to the first driving voltage line VLL. The second electrode (or cathode) of the first light emitting element ED_R may be connected to the second driving voltage line VL2 that transmits the second driving voltage ELVSS. The second driving voltage ELVSS may have a lower voltage level than the first driving voltage ELVDD. As an example of the inventive concept, the second driving voltage ELVSS may have a lower voltage level than the first and second initialization voltages VINT1 and VINT2.

Referring to FIGS. 6A and 6B, the j-th emission control signal EMj has a high level during the non-emission section NEP. In the non-emission section NEP, the j-th initialization scan signal SIj is activated. During the activation section AP1 (hereinafter, the first activation section) of the j-th initialization scan signal SIj, when the j-th initialization scan signal SIj of a high level is provided through the j-th initialization scan line SILj, the fourth transistor T4 is turned on in response to the j-th initialization scan signal SIj having a high level. The first initialization voltage VINT1 is transferred to the gate of the first transistor T1 through the turned-on fourth transistor T4, and the first node N1 is initialized with the first initialization voltage VINT1. Accordingly, the first activation section AP1 may be referred to as an initialization section of the first color pixel PX-R.

Next, the j-th compensation scan signal SCj is activated, and during the activation section AP2 (hereinafter, the second activation section) of the j-th compensation scan signal SCj, when the j-th compensation scan signal SCj of a high level is supplied through the j-th compensation scan line SCLj, the third transistor T3 is turned on. The first transistor T1 is diode-connected by the turned-on third transistor T3 and is biased in the forward direction. The first activation section AP1 may not overlap the second activation section AP2.

The j-th write scan signal SWj is activated in the second activation section AP2. The j-th write scan signal SWj has a low level during the activation section AP4 (hereinafter, referred to as a fourth activation section). During the fourth activation section AP4, the second transistor T2 is turned on by the j-th write scan signal SWj having a low level. Then, the compensation voltage "Di-Vth" reduced by the threshold voltage Vth of the first transistor T1 in the i-th data signal Di supplied from the i-th data line DLi is applied to the gate of the first transistor T1. In other words, the potential of the gate of the first transistor T1 may be the compensation voltage "Di-Vth". The fourth activation section AP4 may overlap the second activation section AP2. The duration of the second activation section AP2 may be greater than the duration of the fourth activation section AP4.

A first driving voltage ELVDD and a compensation voltage "Di-Vth" are applied to both ends of the capacitor Cst, and a charge corresponding to a voltage difference between the both ends may be stored in the capacitor Cst. Here, the high-level section of the j-th compensation scan signal SCj may be referred to as a compensation section of the first color pixel PX-R.

The j-th block scan signal SBj is activated in the second activation section AP2 of the j-th compensation scan signal SCj. The j-th block scan signal SBj has a low level during an activation section AP3 (hereinafter, a third activation section). During the third activation section AP3, the fifth transistor T5 is turned on by receiving the j-th block scan signal SBj of a low level through the j-th block scan line SBLj. A portion of the driving current Id by the fifth transistor T5 may escape through the fifth transistor T5 as the bypass current Ibp. The third activation section AP3 may overlap the second activation section AP2. The duration of the second activation section AP2 may be greater than the duration of the third activation section AP3. The third activation section AP3 may precede the fourth activation section AP4, and may not overlap the fourth activation section AP4.

When the first color pixel PX-R displays a black image, if the first light emitting element ED_R emits light even though the minimum driving current of the first transistor T1 flows as the driving current Id, the first color pixel PX-R cannot normally display a black image. Accordingly, the fifth transistor T5 in the first color pixel PX-R according to an embodiment of the inventive concept may distribute a portion of the minimum driving current of the first transistor T1 as a bypass current Ibp to a current path other than the current path toward the first light emitting element ED_R. Here, the minimum driving current of the first transistor T1 is a current flowing through the first transistor T1 when the gate-source voltage Vgs of the first transistor T1 is less than the threshold voltage Vth, so that the first transistor T1 is turned off. When the first transistor T1 is turned off in this way, a minimum driving current (e.g., a current of 10 pA or less) flowing through the first transistor T1 is transmitted to the first light emitting element ED_R to display a black grayscale image. When the first color pixel PX-R displays a black image, while the effect of the bypass current Ibp on the minimum drive current is relatively large, in the case of displaying an image such as a normal image or a white image, it is understood that the bypass current Ibp has little effect on the driving current Id. Therefore, when displaying a black image, the current (e.g., the light emission current Ied) reduced by the amount of the bypass current Ibp escaping from the driving current Id through the fifth transistor T5 is provided to the first light emitting element ED_R, so that black images may be clearly expressed. Accordingly, the first color pixel PX-R may implement an accurate black grayscale image by using the fifth transistor T5, and as a result, the contrast ratio may be improved.

Next, the j-th emission control signal EMj supplied from the j-th emission control line EMLj is changed from a high level to a low level. The first and second emission control transistors ET1 and ET2 are turned on by the low level emission control signal EMj. Then, a driving current Id is generated according to a voltage difference between the voltage of the gate of the first transistor T1 and the first driving voltage ELVDD, and the driving current Id is supplied to the first light emitting element ED_R through the second emission control transistor ET2 so that the current Ied flows through the first light emitting element ED_R.

Referring back to FIG. 6A, the sensor FX is connected to a d-th readout line RLd among the readout lines RL1 to RLh, a j-th write scan line SWLj, and a reset control line RCL.

The sensor FX includes at least one of the light detection elements OPD1 and OPD2 and a sensor driving circuit O_SD. Two light detection elements OPD1 and OPD2 connected in parallel are illustrated as an example. The first and second light detection elements OPD1 and OPD2 may be connected to the first sensing node SN1, and the second electrodes of the first and second light detection elements OPD1 and OPD2 may be connected to the second driving voltage line VL2 that transmits the second driving voltage ELVSS.

The sensor driving circuit O_SD includes three transistors ST1 to ST3. The three transistors ST1 to ST3 may be a reset transistor ST1, an amplification transistor ST2, and an output transistor ST3, respectively. At least one of the reset transistor ST1, the amplification transistor ST2, and the output transistor ST3 may be an oxide semiconductor transistor. As an example of the inventive concept, the reset transistor ST1 may be an oxide semiconductor transistor, and the amplification transistor ST2 and the output transistor ST3 may be a silicon transistor. However, the inventive concept is not limited thereto, and at least the reset transistor ST1 and the output transistor ST3 may be oxide semiconductor transistors, and the amplification transistor ST2 may be a silicon transistor.

In addition, some of the reset transistor ST1, the amplification transistor ST2, and the output transistor ST3 may be P-type transistors, and some may be N-type transistors. As an example of the inventive concept, the amplification transistor ST2 and the output transistor ST3 may be PMOS transistors, and the reset transistor ST1 may be an NMOS transistor. However, the embodiment of the inventive concept is not limited thereto, and all of the reset transistor ST1, the amplification transistor ST2, and the output transistor ST3 may be N-type transistors or P-type transistors. Hereinafter, the source, drain, and gate of the amplification transistor ST2 and the output transistor ST3 are described based on the PMOS transistor, and the source, drain, and gate of the reset transistor ST1 are described based on the NMOS transistor.

Some (e.g., the reset transistor ST1) of the reset transistor ST1, the amplification transistor ST2, and the output transistor ST3 may be the same type transistor as the third and fourth transistors T3 and T4 of the first color pixel PX-R. The amplification transistor ST2 and the output transistor ST3 may be the same type transistors as the first, second, and fifth transistors T1, T2, and T5 and the first and second emission control transistors ET1 and ET2 of the first color pixel PX-R.

The circuit configuration of the sensor driving circuit O_SD according to the inventive concept is not limited to FIG. 6A. The sensor driving circuit O_SD illustrated in FIG. 6A is only an example, and the configuration of the sensor driving circuit O_SD may be modified.

The reset transistor ST1 includes a source for receiving the reset voltage Vrst, a drain connected to the first sensing node SN1, and a gate for receiving the reset control signal RST. The reset transistor ST1 may reset the potential of the first sensing node SN1 to the reset control signal RST in response to the reset control signal RST. The reset control signal RST may be a signal provided through the reset control line RCL. However, the inventive concept is not limited thereto. For example, in the alternative, the reset control signal RST may be the j-th compensation scan signal SCj supplied through the j-th compensation scan line SCLj. In other words, the reset transistor ST1 may receive the j-th compensation scan signal SCj supplied from the j-th compensation scan line SCLj as the reset control signal RST. As an example of the inventive concept, the reset voltage Vrst may have a lower voltage level than the second driving voltage ELVSS at least during the activation section of the reset control signal RST. The reset voltage Vrst may be a direct current (DC) voltage maintained at a voltage level lower than the second driving voltage ELVSS.

The amplification transistor ST2 includes a source for receiving the sensing driving voltage SLVD, a drain connected to the second sensing node SN2, and a gate connected to the first sensing node SN1. The amplification transistor ST2 may be turned on according to the potential of the first sensing node SN1 to apply the sensing driving voltage SLVD to the second sensing node SN2. As an example of the inventive concept, the sensing driving voltage SLVD may be one of the first driving voltage ELVDD and the first and second initialization voltages VINT1 and VINT2. When the sensing driving voltage SLVD is the first driving voltage ELVDD, the source of the amplification transistor ST2 may be electrically connected to the first driving voltage line VLL. When the sensing driving voltage SLVD is the first initialization voltage VINT1, the source of the amplification transistor ST2 may be electrically connected to the first initialization voltage line VL3, and when the sensing driving voltage SLVD is the second initialization voltage VINT2, the source of the amplification transistor ST2 may be electrically connected to the second initialization voltage line VL4.

The output transistor ST3 includes a source connected to the second sensing node SN2, a drain connected to the d-th readout line RLd, and a gate for receiving the output control signal. The output transistor ST3 may transmit the detection signal FSd to the d-th readout line RLd in response to the output control signal. The output control signal may be the j-th write scan signal SWj supplied through the j-th write scan line SWLj. In other words, the output transistor ST3 may receive the j-th write scan signal SWj supplied from the write scan line SWLj as an output control signal.

The first and second light detection elements OPD1 and OPD2 of the sensor FX may be exposed to light during an emission section of the light emitting elements ED_R, ED_G1, ED_G2, and ED_B (see FIG. 5A). The light may be light output from any one of the light emitting elements ED_R, ED_G1, ED_G2, and ED_B.

If the user's hand touches the display surface, the first and second light detection elements OPD1 and OPD2 may generate photocharges corresponding to light reflected by ridges or valleys between the ridges of the fingerprint, and the generated photocharges may be accumulated in the first sensing node SN1. The amplification transistor ST2 may be a source follower amplifier that generates a source-drain current in proportion to the amount of charge of the first sensing node SN1 input to the gate.

During the fourth activation section AP4 (see FIG. 6B), the low-level j-th write scan signal SWj is supplied to the output transistor ST3 through the j-th write scan line SWLj. When the output transistor ST3 is turned on in response to the low-level j-th write scan signal SWj, a detection signal FSd corresponding to the current flowing through the amplification transistor ST2 may be output to the d-th readout line RLd.

Next, when a high level reset control signal RST is supplied through the reset control line RCL during the reset section RSP (refer to FIG. 5C), the reset transistor ST1 is turned on. The reset section RSP may be referred to as an activation section (e.g., a high level section) of the reset control line RCL. Alternatively, when the reset transistor ST1 is formed of a PMOS transistor, a low-level reset control signal RST may be supplied to the reset control line RCL during the reset section RSP. During the reset section RSP, the first sensing node SN1 may be reset to a potential corresponding to the reset voltage Vrst. As an example of the inventive concept, the reset voltage Vrst may have a lower voltage level than the second driving voltage ELVSS.

Next, when the reset section RSP ends, the first and second light detection elements OPD1 and OPD2 generate photocharges corresponding to the received light, and the generated photocharges may be accumulated in the first sensing node SN1.

Figure 7A:
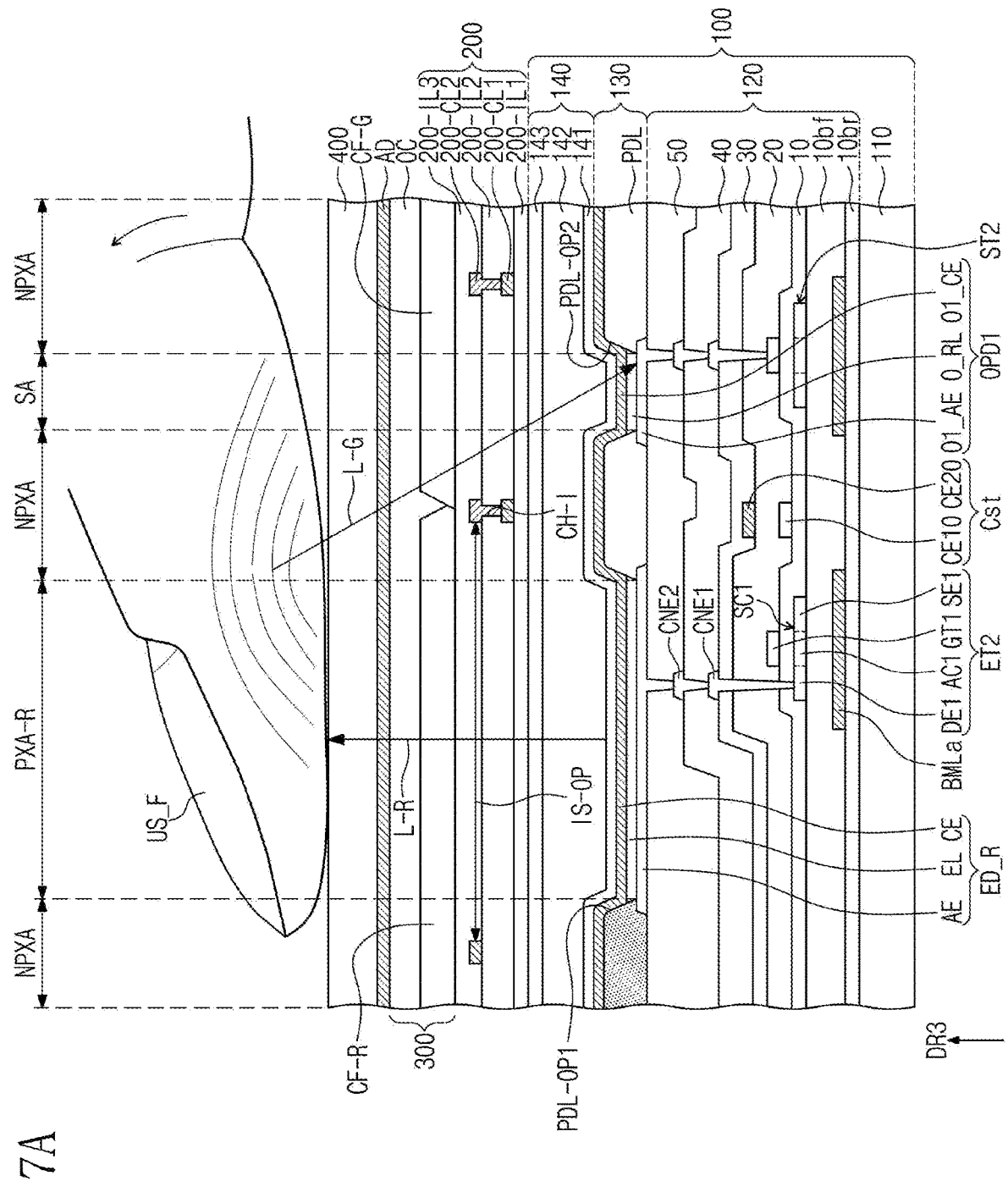
FIG. 7A is a cross-sectional view of a display device according to an embodiment of the inventive concept.
Figure 7B:
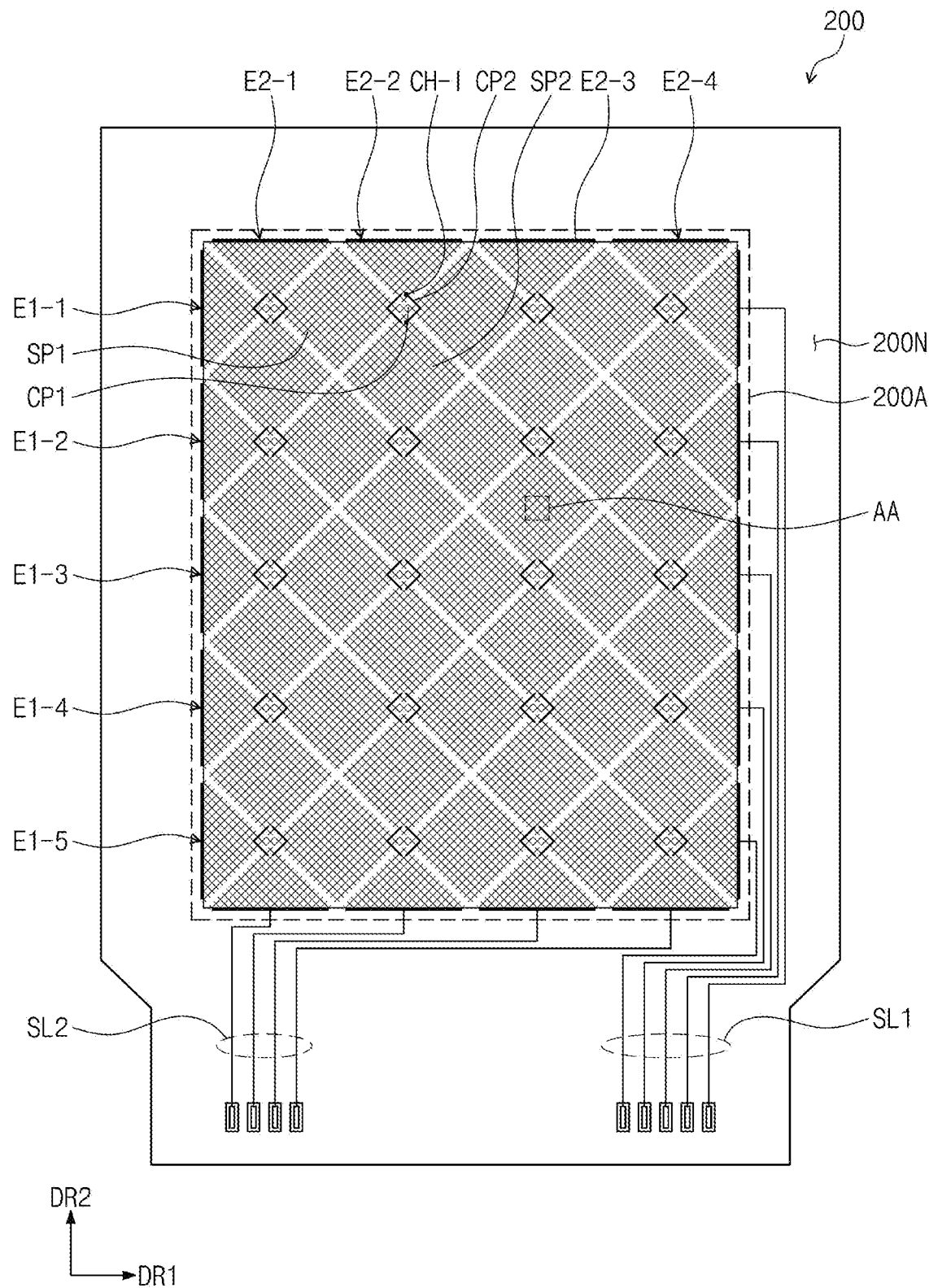
FIG. 7B is a plan view of an input sensor according to an embodiment of the inventive concept.

FIG. 7A is a cross-sectional view of a display device DD according to an embodiment of the inventive concept. FIG. 7B is a plan view of the input sensor 200 according to an embodiment of the inventive concept.

FIG. 7A is a cross-section of the display device DD corresponding to the first color emission area PXA-R, one light detection area SA, and the non-emission area NPXA. A cross section of the display device DD corresponding to the second color emission area PXA-G and the third color emission area PXA-B may also be substantially the same as that illustrated in FIG. 7A. Accordingly, the display panel 100 will be described based on the first color emission area PXA-R.

The display panel 100 is illustrated based on the first light emitting element ED_R and the transistor ET2 connected thereto. In addition, the first light detection element OPD1 and the transistor ST2 connected thereto are mainly illustrated.

The transistor ET2 connected to the first light emitting element ED_R may be the second emission control transistor ET2 shown in FIG. 6A, and the transistor ST2 connected to the first light detection element OPD1 may be an amplification transistor ST2 illustrated in FIG. 6A. In the present embodiment, the transistors ET2 and ST2 are described as silicon transistors, but may also be metal oxide transistors. In this embodiment, the amplification transistor ST2 is illustrated as having the same stacked structure as the second emission control transistor ET2, but the embodiment of the inventive concept may not be limited thereto.

A barrier layer 10*br* may be disposed on the base layer 110. The barrier layer 10*br* prevents foreign substances from being introduced from the outside. The barrier layer 10*br* may include at least one inorganic layer. The barrier layer 10*br* may include a silicon oxide layer and a silicon nitride layer. Each of these may be provided in plural, and silicon oxide layers and silicon nitride layers may be alternately stacked.

A shielding electrode BMLa may be disposed on the barrier layer 10*br*. The shielding electrode BMLa may include a metal. The shielding electrode BMLa may include molybdenum (Mo) having good heat resistance, an alloy containing molybdenum, titanium (Ti), or an alloy containing titanium. The shielding electrode BMLa may receive a bias voltage.

The shielding electrode BMLa may block an electrical potential due to polarization from affecting the silicon transistor. The shielding electrode BMLa may block external light from reaching the silicon transistor. In an embodiment of the inventive concept, the shielding electrode BMLa may be a floating electrode isolated from other electrodes or wires.

A buffer layer 10*bf* may be disposed on the barrier layer 10*br*. The buffer layer 10*bf* may prevent diffusion of metal atoms or impurities from the base layer 110 into the upper semiconductor pattern SC1. The buffer layer 10*bf* may include at least one inorganic layer. The buffer layer 10*bf* may include a silicon oxide layer and a silicon nitride layer.

A semiconductor pattern SC1 may be disposed on the buffer layer 10*bf*. The semiconductor pattern SC1 may include a silicon semiconductor. For example, the silicon semiconductor may include amorphous silicon, polycrystalline silicon, or the like. For example, the semiconductor pattern SC1 may include low-temperature polysilicon.

The semiconductor pattern SC1 may include a first area having high conductivity and a second area having low conductivity. The first area may be doped with an N-type dopant or a P-type dopant. The P-type transistor may include a doped area doped with a P-type dopant, and the N-type transistor may include a doped area doped with an N-type dopant. The second area may be a non-doped area or an area doped with a lower concentration than the first area.

The conductivity of the first area may be greater than that of the second area, and the first area may serve as an electrode or a signal line. The second area may correspond to an active area (or channel) of the transistor. In other words, a part of the semiconductor pattern SC1 may be an active area of the transistor, another part of the semiconductor pattern SC1 may be a source or drain of the transistor, and another part of the semiconductor pattern SC1 may be a connection electrode or a connection signal line.

A source area SE1 (or a source), an active area AC1 (or a channel), and a drain area DE1 (or a drain) of the second emission control transistor ET2 may be formed from a semiconductor pattern, e.g., SC1. The source area SE1 and the drain area DE1 may extend in opposite directions from the active area AC1 on a cross-section.

The first insulating layer 10 may be disposed on the buffer layer 10*bf*. The first insulating layer 10 may overlap the display area 1000A (refer to FIG. 1) in common and cover the semiconductor pattern SC1. The first insulating layer 10 may include an inorganic layer and/or an organic layer, and may have a single-layer or multi-layer structure. The inorganic layer may include at least one of aluminum oxide, titanium oxide, silicon oxide, silicon nitride, silicon oxynitride, zirconium oxide, and hafnium oxide. In this embodiment, the first insulating layer 10 may be a single-layer silicon oxide layer. In addition to the first insulating layer 10, the insulating layer of the circuit layer 120 to be described later may be an inorganic layer and/or an organic layer, and may have a single layer or multilayer structure. The inorganic layer may include at least one of the above-mentioned materials, but is not limited thereto.

The gate GT1 of the second emission control transistor ET2 is disposed on the first insulating layer 10. The gate GT1 may be a part of the metal pattern. The gate GT1 overlaps the active area AC1. In the process of doping the semiconductor pattern SC1, the gate GT1 may function as a mask. The gate GT1 may include titanium (Ti), silver (Ag), an alloy containing Ag, molybdenum (Mo), an alloy containing Mo, aluminum (Al), an alloy containing Al, aluminum nitride (AlN), tungsten (W), tungsten nitride (WN), copper (Cu), indium tin oxide (ITO), indium zinc oxide (IZO), and the like, but is not particularly limited thereto.

The second insulating layer 20 is disposed on the first insulating layer 10 and may cover the gate GT1. The third insulating layer 30 may be disposed on the second insulating layer 20. A second electrode CE20 of a storage capacitor Cst may be disposed between the second insulating layer 20 and the third insulating layer 30. In addition, a first electrode CE10 of the storage capacitor Cst may be disposed between the first insulating layer 10 and the second insulating layer 20.

A first connection electrode CNE1 may be disposed on the third insulating layer 30. The first connection electrode CNE1 may be connected to the drain area DE1 of the second emission control transistor ET2 through a contact hole passing through the first to third insulating layers 10, 20, and 30.

A fourth insulating layer 40 may be disposed on the third insulating layer 30. A second connection electrode CNE2 may be disposed on the fourth insulating layer 40. The second connection electrode CNE2 may be connected to the first connection electrode CNE1 through a contact hole penetrating the fourth insulating layer 40. A fifth insulating layer 50 is disposed on the fourth insulating layer 40 and may cover the second connection electrode CNE2. The stacked structure of the first insulating layer 10 to the fifth insulating layer 50 is merely an example, and in addition to the first insulating layer 10 to the fifth insulating layer 50, an additional conductive layer and an insulating layer may be further disposed.

Each of the fourth insulating layer 40 and the fifth insulating layer 50 may be an organic layer. For example, the organic layer may include Benzocyclobutene (BCB), polyimide, Hexamethyldisiloxane (HMDSO), Polymethylmethacrylate (PMMA), or general purpose polymers such as polystyrene (PS), polymer derivatives having phenolic groups, acrylic polymers, imide-based polymers, arylether-based polymers, amide-based polymers, fluorine-based polymers, p-xylene-based polymers, vinyl alcohol-based polymers, blends thereof, and the like.

The first light emitting element ED_R may include a first electrode AE (or an anode or a pixel electrode), a light emitting layer EL, and a second electrode CE (or a cathode or a common electrode). The first electrode AE may be disposed on the fifth insulating layer 50. The first electrode AE may be connected to the second connection electrode CNE2 through a contact hole passing through the fifth insulating layer 50. However, the embodiment of the inventive concept is not limited thereto, and the second connection electrode CNE2 may be connected to the second electrode CE. In this case, the first electrode AE (or anode) corresponds to the common electrode, and the second electrode CE (or cathode) may be separated for each of the emission areas PXA-B, PXA-R, and PXA-G of FIG. 4. In addition, although the first light emitting element ED_R has the structure shown in FIG. 7A, the first electrode AE may be a cathode and the second electrode CE may be an anode (e.g., an inverted structure).

The first electrode AE may be a semi-transmissive or translucent electrode or a reflective electrode. The first electrode AE may include a reflective layer formed of Ag, Mg, Al, Pt, Pd, Au, Ni, Nd, Ir, Cr, or a compound thereof, and a transparent or semi-transparent electrode layer formed on the reflective layer. The transparent or translucent electrode layer may include at least one or more selected from the group consisting of indium tin oxide (ITO), indium zinc oxide (IZO), indium gallium zinc oxide (IGZO), zinc oxide (ZnO) or indium oxide (In2O3), and aluminum doped zinc oxide (AZO). For example, the first electrode AE may include a stacked structure of ITO/Ag/ITO.

The first light detection element OPD1 may include a first electrode O_AE (or an anode, or a pixel electrode), a photoelectric conversion layer O_RL, and a second electrode O2_CE (or a cathode or a common electrode). The first electrode O1_AE of the first light detection element OPD1 may be formed through the same process as the first electrode AE of the first light emitting element ED_R, and the second electrode O1_CE of the first light detection element OPD1 may be formed through the same process as the second electrode CE of the first light emitting element ED_R. Electrodes formed through the same process may have the same material and the same stacked structure. The second electrode O1_CE of the first light detection element OPD1 and the second electrode CE of the first light emitting element ED_R may be a common electrode having an integral shape.

The photoelectric conversion layer O_RL may include an organic photo-sensing material, for example, a light-sensitive semiconductor material. A predetermined electric field may be formed between the first electrode O1_AE and the second electrode O1_CE of the first light detection element OPD1. The photoelectric conversion layer O_RL generates an electrical signal corresponding to incident light. The photoelectric conversion layer O_RL may absorb energy of incident light to generate an electric charge.

The electric charge generated in the photoelectric conversion layer O_RL changes the electric field between the first electrode O1_AE and the second electrode O1_CE. Depending on whether light is incident on the first light detection element OPD1 and the amount and intensity of light incident on the first light detection element OPD1, the amount of charge generated in the photoelectric conversion layer O_RL may vary. Accordingly, an electric field formed between the first electrode O1_AE and the second electrode O1_CE may vary. The first light detection element OPD1 according to an embodiment of the inventive concept may acquire user's fingerprint information through a change in an electric field between the first electrode O1_AE and the second electrode O1_CE.

However, this is illustrated by way of example, and the first light detection element OPD1 may include a phototransistor having a photoelectric conversion layer O_RL as an active layer. In this case, the first light detection element OPD1 may acquire fingerprint information by detecting an amount of current flowing through the phototransistor. The first light detection element OPD1 according to an embodiment of the inventive concept may include various photoelectric conversion elements capable of generating an electrical signal in response to a change in the amount of light, but is not limited to any one embodiment.

A pixel defining layer PDL may be disposed on the fifth insulating layer 50. The pixel defining layer PDL may be an organic layer. In an embodiment of the inventive concept, the pixel defining layer PDL may have a property of absorbing light, and for example, the pixel defining layer PDL may have a black color. The pixel defining layer PDL may include a black coloring agent. The black coloring agent may include a black dye and a black pigment. The black component may include a metal such as carbon black or chromium, or an oxide thereof. The pixel defining layer PDL may correspond to a light blocking pattern having light blocking characteristics.

The pixel defining layer PDL may cover a portion of the first electrode AE of the first light emitting element ED_R. The portion of the first electrode AE of the first light emitting element ED_R may be located in the non-emission area NPXA. For example, a light-emitting opening PDL-OP1 exposing a portion of the first electrode AE of the first light emitting element ED_R may be located in the pixel defining layer PDL. The pixel defining layer PDL may cover a portion of the first electrode O1_AE of the first light detection element OPD1. The portion of the first electrode O1_AE of the first light detection element OPD1 may also be located in the non-emission area NPXA. For example, a light-receiving opening PDL-OP2 exposing a portion of the first electrode O1_AE of the first light detection element OPD1 may be located in the pixel defining layer PDL.

The light-emitting opening PDL-OP1 may form a first color emission area PXA-R. In addition, the light-emitting opening PDL-OP1 may form an emission area of the first electrode AE of the first light emitting element ED_R. The emission area of the first electrode AE of the first light emitting element ED_R corresponds to a portion of the first electrode AE exposed by the pixel defining layer PDL.

Light-emitting openings PDL-OP1 corresponding to the second color emission area PXA-G and the third color emission area PXA-B are further provided in the pixel defining layer PDL. A first light-emitting opening may correspond to a first color emission area PXA-R, a second light-emitting opening may correspond to a second color emission area PXA-G, and a third light-emitting opening may correspond to the third color emission area PXA-B.

The light-receiving opening PDL-OP2 may form a light detection area SA. Although it has been described that the light-receiving opening PDL-OP2 exposes a portion of the first electrode O1_AE of the first light detection element OPD1, the embodiment of the inventive concept is not limited thereto. The light-receiving opening PDL-OP2 may expose all of the first electrode O1_AE of the light detection element OPD1. A light-receiving opening PDL-OP2 corresponding to the first electrode O2_AE (see FIG. 5A) of the second light detection element OPD2 may be further provided in the pixel defining layer PDL.

A hole control layer may be disposed between the first electrode AE of the first light emitting element ED_R and the light emitting layer EL of the first light emitting element ED_R. The hole control layer may include a hole transport layer and may further include a hole injection layer. An electron control layer may be disposed between the light emitting layer EL of the first light emitting element ED_R and the second electrode CE of the first light emitting element ED_R. The electron control layer includes an electron transport layer, and may further include an electron injection layer. The hole control layer and the electron control layer may overlap the first color emission area PXA-R, the second color emission area PXA-G, the third color emission area PXA-B, and the non-emission area NPXA in common, which are described with reference to FIG. 4.

The thin film encapsulation layer 140 may be disposed on the light emitting element layer 130 and may cover the first light emitting element ED_R and the first light detection element OPD1. The thin film encapsulation layer 140 may include an inorganic layer 141, an organic layer 142, and an inorganic layer 143 sequentially stacked, but the layers constituting the thin film encapsulation layer 140 are limited thereto.

The inorganic layers 141 and 143 may protect the light emitting element layer 130 from moisture and oxygen, and the organic layer 142 may protect the light emitting element layer 130 from foreign substances such as dust particles. The inorganic layers 141 and 143 may include a silicon nitride layer, a silicon oxynitride layer, a silicon oxide layer, a titanium oxide layer, or an aluminum oxide layer. The organic layer 142 may include an acrylic organic layer, but is not limited thereto.

The input sensor 200 may include a first insulating layer 200-IL1 (or a base insulating layer), a first conductive pattern layer 200-CL1, a second insulating layer 200-IL2 (or an intermediate insulating layer), a second conductive pattern layer 200-CL2, and a third insulating layer 200-IL3 (or a cover insulating layer). The first insulating layer 200-IL1 may be directly disposed on the thin film encapsulation layer 140. In particular, the first insulating layer 200-IL1 may be in direct contact with the inorganic layer 143.

In an embodiment of the inventive concept, the first insulating layer 200-IL1 and/or the third insulating layer 200-IL3 may be omitted. When the first insulating layer 200-IL1 is omitted, the first conductive pattern layer 200-CL1 may be directly disposed on the uppermost insulating layer of the thin film encapsulation layer 140. The third insulating layer 200-IL3 may be replaced with an adhesive layer or an insulating layer of the anti-reflection layer 300 disposed on the input sensor 200. In an embodiment of the inventive concept, the input sensor 200 may include only one of the first conductive pattern layer 200-CL1 and the second conductive pattern layer 200-CL2.

The first conductive pattern layer 200-CL1 may include a first conductive pattern, and the second conductive pattern layer 200-CL2 may include a second conductive pattern. Each of the first conductive pattern and the second conductive pattern may include regularly arranged patterns. Hereinafter, the first conductive pattern layer 200-CL1 and the first conductive pattern refer to the same reference numeral, and the second conductive pattern layer 200-CL2 and the second conductive pattern refer to the same reference numeral.

Each of the first conductive pattern 200-CL1 and the second conductive pattern 200-CL2 may have a single-layer structure or a multi-layer structure stacked along the third direction axis DR3. The multi-layered conductive pattern may include at least two or more of transparent conductive layers and metal layers. The multi-layered conductive pattern may include metal layers including different metals. The transparent conductive layer may include indium tin oxide (ITO), indium zinc oxide (IZO), zinc oxide (ZnO), indium tin zinc oxide (ITZO), PEDOT, metal nanowires, or graphene. The metal layer may include molybdenum, silver, titanium, copper, aluminum, or an alloy thereof.

The first conductive pattern 200-CL1 may be sandwiched between portions of the second insulating layer 200-IL2. The second conductive pattern 200-CL2 may be sandwiched between portions of the third insulating layer 200-IL3. A part of the second conductive pattern 200-CL2 may extend through the second insulating layer 200-IL2 to contact the first conductive pattern 200-CL1.

The first conductive pattern 200-CL1 and the second conductive pattern 200-CL2 overlap the non-emission area NPXA. An opening IS-OP corresponding to the emission area PXA-R may be provided in the first conductive pattern 200-CL1. The opening IS-OP may have a larger area than the emission area PXA-R. For example, the opening IS-OP may extend beyond the borders of the emission area PXA-R.

In this embodiment, each of the first insulating layers 200-IL1 to the third insulating layers 200-IL3 may include an inorganic layer or an organic layer. In this embodiment, the first insulating layer 200-IL1 to the third insulating layer 200-IL3 may include an inorganic layer. The inorganic layer may include silicon oxide, silicon nitride, or silicon oxy nitride.

In an embodiment of the inventive concept, at least one of the first insulating layer 200-IL1 to the third insulating layer 200-IL3 may be an organic layer. For example, the third insulating layer 200-IL3 may include an organic layer. The organic layer may include at least one of acrylic resin, methacrylic resin, polyisoprene, vinyl resin, epoxy resin, urethane resin, cellulose resin, siloxane resin, polyimide resin, polyamide resin, and perylene resin.

The anti-reflection layer 300 may be directly disposed on the third insulating layer 200-IL3. The anti-reflection layer 300 may include a first color filter CF-R, a second color filter CF-G, and a third color filter corresponding to the first color emission area PXA-R, the second color emission area PXA-G, and the third color emission area PXA-B shown in FIG. 4, respectively. One of the first color filter CF-R, the second color filter CF-G, and the third color filter may overlap the light detection area SA. In this embodiment, the second color filter CF-G overlapping the light detection area SA is illustrated. A portion of each of the first color filter CF-R, the second color filter CF-G, and the third color filter may also overlap the non-emission area NPXA.

The anti-reflection layer 300 may further include an overcoat layer OC. The overcoat layer OC may include an organic insulating material. The overcoat layer OC may be provided with a thickness sufficient to remove a step difference between the first color filter CF-R, the second color filter CF-G, and the third color filter. The overcoat layer OC may planarize the upper surface of the anti-reflection layer 300.

The first light detection element OPD1 may receive only light of a specific wavelength among source lights generated by the first light emitting element ED_R, the second light emitting element ED_G, and the third light emitting element ED_B shown in FIG. 5A by a color filter disposed on the first light detection element OPD1. In the present embodiment, the first light detection element OPD1 may receive the second color light L-G reflected from the user's finger US_F, and the green light L-G in the present embodiment. The first color light L-R generated by the first light emitting element ED_R, and the red light L-R in the present embodiment, may be shielded by the second color filter CF-G.

Referring to FIG. 7B, the input sensor 200 includes a detection area 200A and a non-detection area 200N adjacent to the detection area 200A. The detection area 200A and the non-detection area 200N respectively correspond to the display area 1000A and the peripheral area 1000N shown in FIG. 1.

The input sensor 200 is disposed in the detection area 200A, and includes first sensing electrodes E1-1, E1-2, E1-3, E1-4 and E1-5 and second sensing electrodes E2-1, E2-2, E2-3 and E2-4 that insulate and cross each other. An external input may be detected by calculating an amount of change in the mutual capacitance formed between the first sensing electrodes E1-1 to E1-5 and the second sensing electrodes E2-1 to E2-4.

The self-capacitance type input sensor 200 may include sensing electrodes that do not cross each other. In this embodiment, the input sensor 200 including the sensing electrodes is sufficient, and the driving method of the input sensor 200 is not particularly limited.

The input sensor 200 is disposed in the non-detection area 200N, and includes first signal lines SL1 electrically connected to the first sensing electrodes E1-1 to E1-5 and second signal lines SL2 electrically connected to the second sensing electrodes E2-1 to E2-4. Like each of the first conductive patterns 200-CL1 and the second conductive patterns 200-CL2 described with reference to FIG. 7A, or a combination of the first conductive patterns 200-CL1 and the second conductive patterns 200-CL2, first sensing electrodes E1-1 to E1-5, second sensing electrodes E2-1 to E2-4, first signal lines SL1, and second signal lines SL2 are defined.

Each of the first sensing electrodes E1-1 to E1-5 and the second sensing electrodes E2-1 to E2-4 may include a plurality of conductive lines crossing each other. A plurality of conductive lines may form a plurality of openings, and each of the first sensing electrodes E1-1 to E1-5 and the second sensing electrodes E2-1 to E2-4 may have a mesh shape. Each of the plurality of openings may be referred to as the opening IS-OP shown in FIG. 7A.

Any one of the first sensing electrodes E1-1 to E1-5 and the second sensing electrodes E2-1 to E2-4 may have an integral shape. In this embodiment, the first electrodes E1-1 to E1-5 having an integral shape are illustrated. The first sensing electrodes E1-1 to E1-5 may include detection portions SP1 and middle portions CP1. A portion of the above-described second conductive pattern 200-CL2 may correspond to the first sensing electrodes E1-1 to E1-5.

Each of the second sensing electrodes E2-1 to E2-4 may include detection patterns SP2 and bridge patterns CP2 (or connection patterns). The two adjacent detection patterns SP2 may be connected to the two bridge patterns CP2 through the contact hole CH-I penetrating the second insulating layer 200-IL2 (refer to FIG. 7A) but the number of bridge patterns is not limited. A portion of the second conductive pattern 200-CL2 described above may correspond to the detection patterns SP2. A portion of the above-described first conductive pattern 200-CL1 may correspond to the bridge patterns CP2.

In this embodiment, although it has been described that the bridge patterns CP2 are formed from the first conductive pattern 200-CL1 shown in FIG. 7A and the first sensing electrodes E1-1 to E1-5 and the detection patterns SP2 are formed from the second conductive pattern 200-CL2 shown in FIG. 7A, the embodiment of the inventive concept is not limited thereto. First sensing electrodes E1-1 to E1-5 and detection patterns SP2 may be formed from the first conductive pattern 200-CL1 shown in FIG. 7A, and bridge patterns CP2 may be formed from the second conductive pattern 200-CL2 shown in FIG. 7A.

Any one of the first signal lines SL1 and the second signal lines SL2 transmits a transmission signal for sensing an external input from an external circuit, and the other one of the first signal lines SL1 and the second signal lines SL2 transmits a change in capacitance between the first sensing electrodes E1-1 to E1-5 and the second sensing electrodes E2-1 to E2-4 as a reception signal to an external circuit.

A portion of the above-described second conductive pattern 200-CL2 may correspond to the first signal lines SL1 and the second signal lines SL2. The first signal lines SL1 and the second signal lines SL2 may have a multilayer structure, and may include a first layer line formed from the above-described first conductive pattern 200-CL1 and a second layer line formed from the above-described second conductive pattern 200-CL2. The first layer line and the second layer line may be connected through a contact hole penetrating the second insulating layer 200-IL2 (refer to FIG. 7A).

Figure 8A:
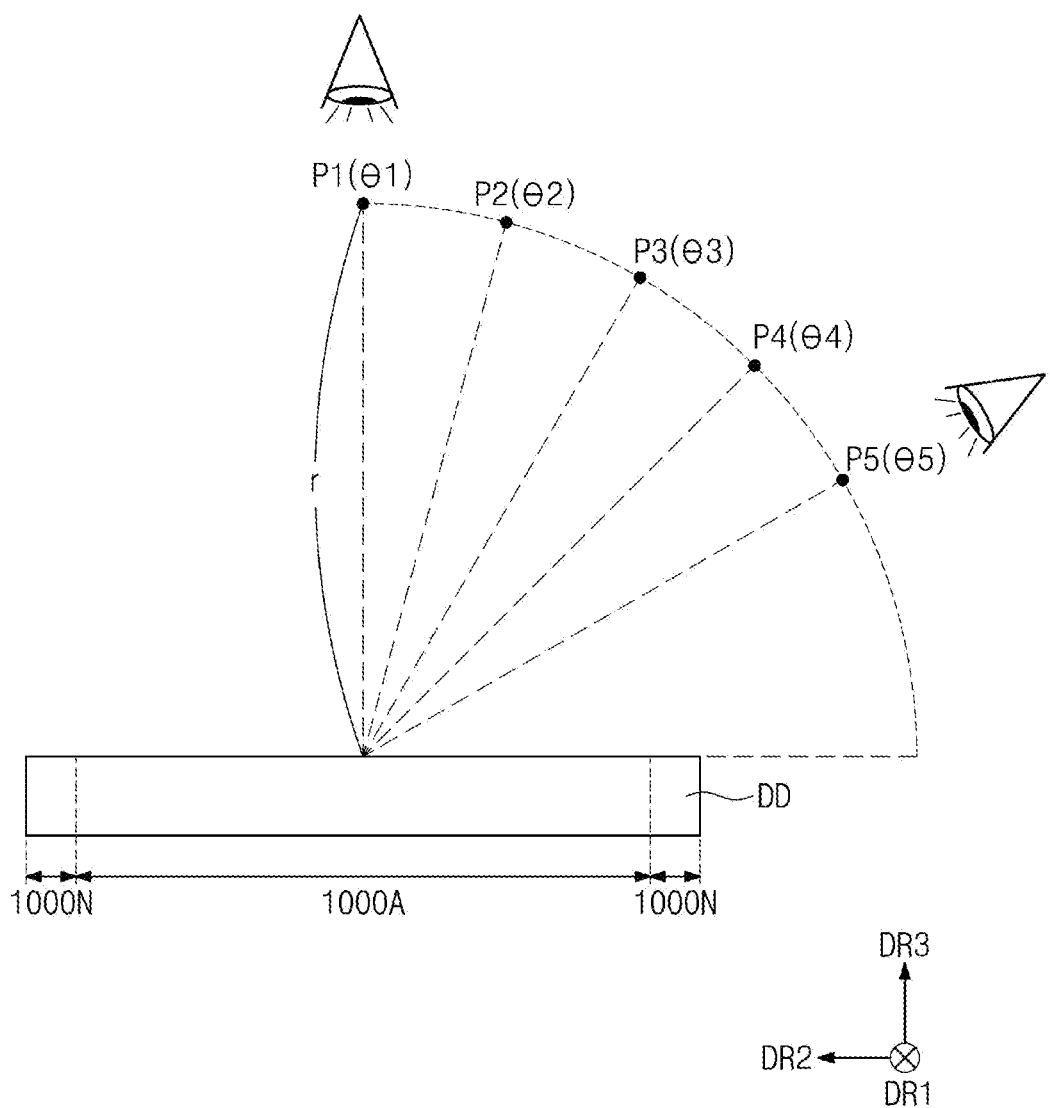
FIGS. 8A and 8B are diagrams for explaining a spherical coordinate system in a display device.
Figure 8B:
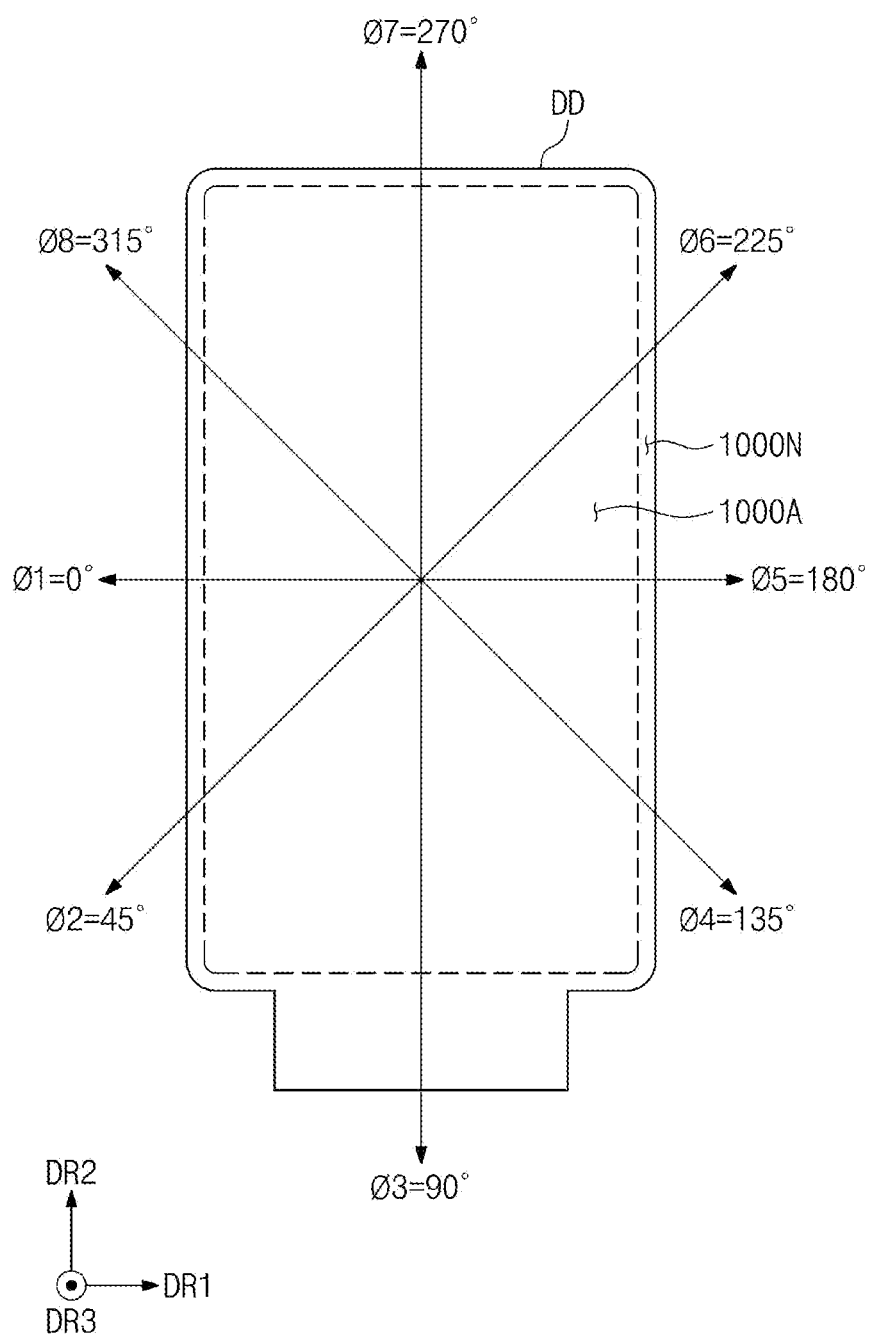
Figure 9A:
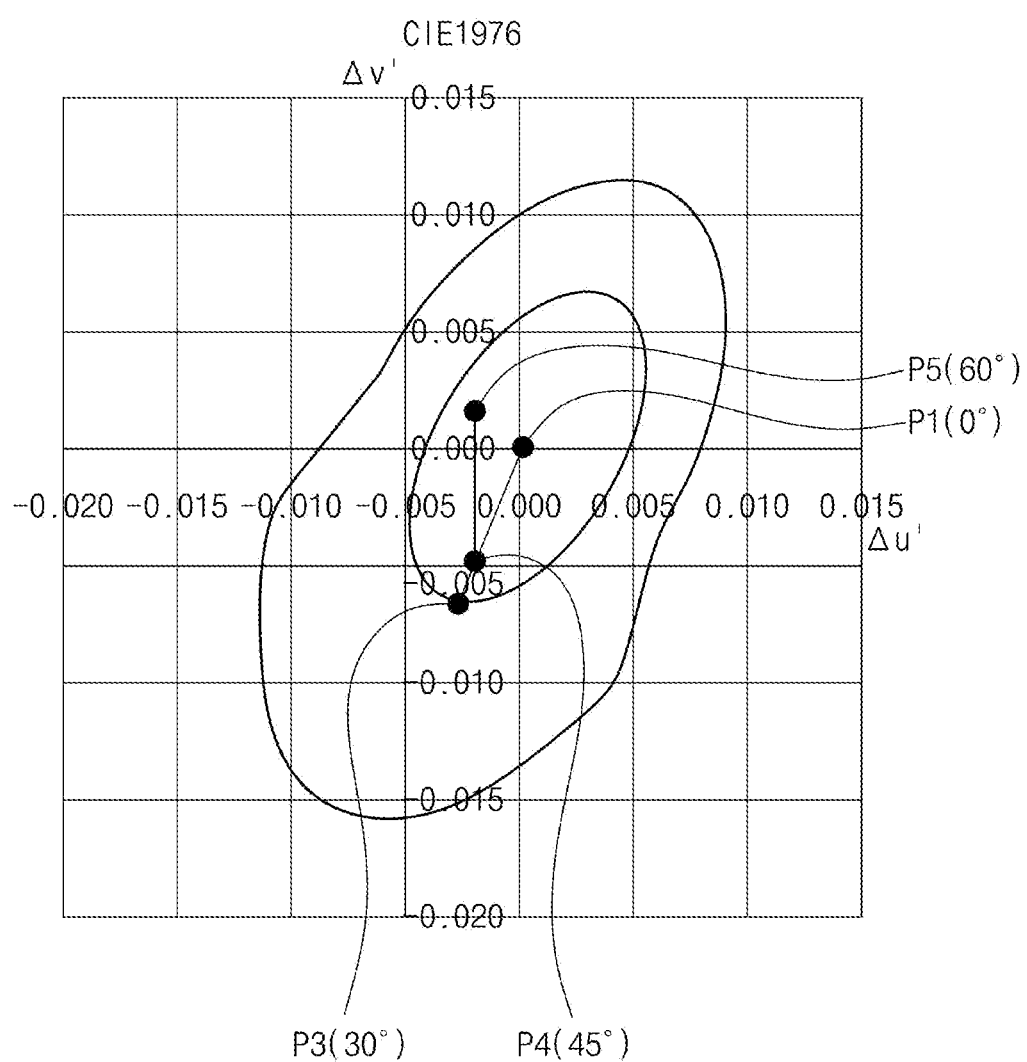
FIGS. 9A and 9B are graphs illustrating a color coordinate change amount of a white image displayed on a display device according to a comparative example.
Figure 9B:
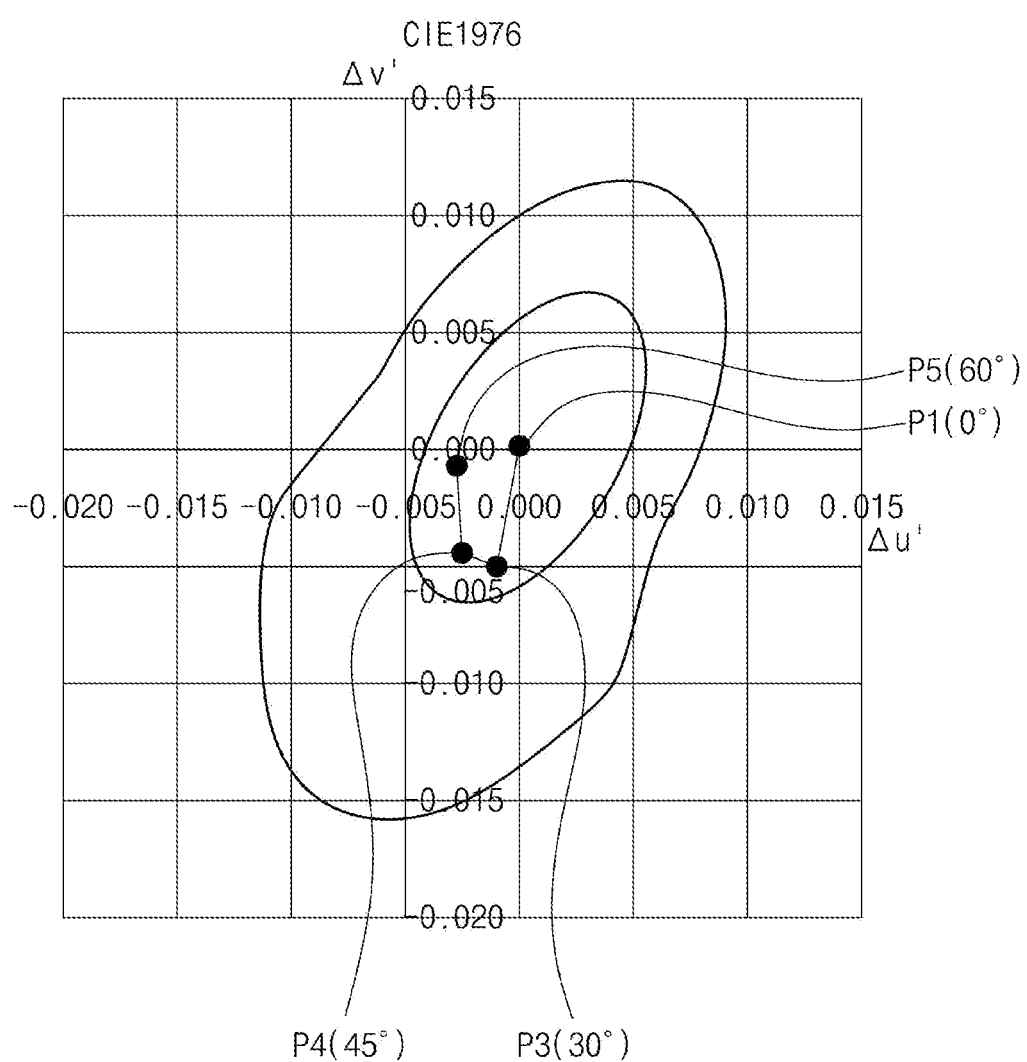

FIGS. 8A and 8B are diagrams for explaining a spherical coordinate system defined in the display device DD. FIGS. 9A and 9B are diagrams illustrating a color coordinate change amount of a white image displayed on a display device according to a comparative example.

As shown in FIGS. 8A and 8B, a spherical coordinate system may be defined in the display device DD. The origin of the spherical coordinate system may be aligned with the center of the display area 1000A of the display device DD. The spherical coordinate system is used to distinguish measurement points for measuring the display quality of the display device DD.

The coordinates of the spherical coordinate system may be expressed as (r, θ, Φ), and r represents the distance from the origin to the measurement point, θ represents the angle formed by a straight line defined between the z-axis (or the normal axis of the display device DD) and the origin and the measurement point, and Φ represents the angle formed by the straight line projected between the origin and the measurement point on the xy plane (or the front surface of the display device DD) with respect to the x-axis (or the horizontal axis passing through the center of the display device DD). For convenience of explanation, θ is defined as a viewing angle, and Φ is defined as an azimuth.

FIG. 8A shows five measurement points P1, P2, P3, P4 and P5. The first viewing angle θ1 of the first measurement point P1 is defined as 0°. The second to fifth viewing angles θ2, θ3, θ4, and θ5 have a constant angle from the z-axis (or the normal axis of the display device DD). The second to fifth viewing angles θ2, θ3, θ4, and θ5 of the second to fifth measurement points P2 to P5 may be 15°, 30°, 450, and 60°. Alternatively, the second to fifth viewing angles θ2, θ3, θ4, and θ5 of the second to fifth measurement points P2 to P5 may be 200, 40°, 60°, and 80°. Alternatively, the second to fifth viewing angles θ2, θ3, θ4, and θ5 of the second to fifth measurement points P2 to P5 may be 10°, 20°, 30°, and 40°.

FIG. 8B shows eight azimuth angles Φ1, Φ2, Φ3, Φ4, Φ5, Φ6, Φ7 and Φ8. The first to eighth azimuth angles Φ1 to Φ8 may be 0°, 45°, 90°, 135°, 1800, 225°, 270°, and 315°.

FIGS. 9A and 9B show color coordinate changes Δu' and Δv' according to viewing angles. Color coordinate change amounts Δu' and Δv' of FIGS. 9A and 9B were measured at measurement points having an azimuth angle of 90°. A white image was measured at four measurement points with different viewing angles, and the color coordinates measured at the first measurement point where the viewing angle is 0° become the standard of the color coordinate change amounts Δu' and Δv'. The color coordinate change amounts Δu' and Δv' were expressed based on the color coordinates u' and v' of the CIE1976 color coordinate system.

The four measurement points correspond to the first measurement point P1, the third measurement point P3, the fourth measurement point P4, and the fifth measurement point P5 of FIG. 8A. All four measurement points have the same distance r (see FIG. 8A) from the origin to the measurement point.

The raw white image is a result of mixing lights generated from the first to third pixels PX-R, PX-G, and PX-B shown in FIGS. 5A and 5B. Specifically, the white image is generated by mixing the first color light generated from the first color pixels PX-R, the second color light generated from the second color pixels PX-G, and the third color light generated from the third color pixels PX-B.

Referring to the graphs of FIGS. 9A and 9B, although there is a slight difference for each display device, it cab be seen that the color coordinate change amounts Δu' and Δv' of the third measurement point P3 having a viewing angle of 30° and the fourth measurement point P4 having a viewing angle of 45° are similar. Referring to the graphs of FIGS. 9A and 9B, it can be seen that the color coordinate change amounts Δu' and Δv' at the fifth measurement point P5 with a viewing angle of 60° show that the Δv' value significantly increased compared to the third measurement point P3 and the fourth measurement point P4. This means that the white image measured at the fifth measurement point P5 has a yellow shift compared to the white image measured at the third measurement point P3 and the fourth measurement point P4.

The user recognizes a white image at the fifth measurement point P5 of a different color from the white image recognized at the third measurement point P3 and the fourth measurement point P4. The user recognizes a yellowish white image at the fifth measurement point P5. If the user perceives that the color of the white image is different according to the viewing angle, this means that the display quality is deteriorated. When the white image measured at a point other than the first measurement point P1 has a similar color, the user perceives the color coordinate change amounts Δu' and Δv' according to the viewing angle insensitively (or less sensitively).

It is assumed that the interference of the sensing electrodes E1-1 to E1-5, and E2-1 to E2-4 of the input sensor 200 (see FIGS. 7B and 7C) for the path of the raw white image radiating up to four measurement points is negligible. The meaning of "a level at which the interference of the sensing electrode of the input sensor with respect to the radiation path of the raw white image is negligible" will be described later.

A phenomenon in which color the coordinate change amounts Δu' and Δv' occur compared to a raw white image according to a measurement point is referred to as a white wavelength shift or White Angular Dependency (WAD). It is assumed that a raw white image is substantially measured at the first measurement point P1. The cause for the color coordinate change amounts Δu' and Δv' occurring at the third measurement point P3 to the fifth measurement point P5 compared to the first measurement point P1 and the cause for the value of Δv' of the color coordinate change amounts Δu' and Δv' at the fifth measurement point P5 increasing significantly compared to the color coordinate change amounts Δu' and Δv' at the third measurement point P3 and the fourth measurement point P4 may vary.

One of the causes may be the light emitting material of the light emitting layer EL (see FIG. 7A). The light emitting profile of each of the first light emitting element, the second light emitting element, and the third light emitting element may be determined by the light emitting material. The display panel shown in the graph of FIG. 9A and the display panel shown in the graph of FIG. 9B include different light emitting materials for corresponding light emitting elements.

For example, even when the first light emitting elements generate red light, the profile of the luminance of light in the wavelength range of the red light may be different depending on the light emitting materials of the light emitting elements. The radiation path may vary according to the wavelength within the wavelength range of the red light. For example, a radiation path of a wavelength of 650 nm and a radiation path of a wavelength of 670 nm may be slightly different, and Δv' may be relatively increased at a viewing angle at which a wavelength having a large emission peak is transmitted more.

It is assumed that the cause of the significant increase in the Δv' value of the color coordinate change amounts Δu' and Δv' at the fifth measurement point P5 in the graph of FIG. 9A and the graph of FIG. 9B compared to the color coordinate change amounts Δu' and Δv' at the third measurement point P3 and the fourth measurement point P4 is that the first light emitting element and the second light emitting element have a light emitting profile that provides a greater amount of light at a viewing angle of 60° compared to the third light emitting element.

According to an embodiment of the inventive concept, while passing through the input sensor 200, the sensing electrodes E1-1 to E1-5, and E2-1 to E2-4 (see FIG. 7B) interfere with the white image so that the difference between the color coordinate change amounts Δu' and Δv' measured at the viewing angle of the high angle and the amount of color coordinate changes Δu' and Δv' measured at the viewing angle of the low angle may be reduced. The input sensor 200 may be designed such that the sensing electrodes E1-1 to E1-5 and E2-1 to E2-4 interfere only with the radiation path of the high viewing angle. In addition, the input sensor 200 may be designed such that the sensing electrodes E1-1 to E1-5 and E2-4 to E2-4 interfere only with the radiation path of a specific light among the first color light, the second color light, and the third color light. Below, a principle in which the sensing electrodes E1-1 to E1-5 and E2-1 to E2-4 of the input sensor 200 control the amount of interference with respect to the first color light, the second color light, and the third color light depending on the viewing angle will be described.

In the present embodiment, it has been described that a yellowish white image is recognized by the user at the fifth measurement point P5, but the inventive concept is not limited thereto. The white image measured at the fifth measurement point P5 may be a blue-shifted white image. According to an embodiment of the inventive concept, the white image measured at the fifth measurement point P5 may be a magenta-ish white image or a greenish white image. According to an embodiment of the inventive concept, the white image measured at the fifth measurement point P5 may be a cyanish white image or a redish white image.

Figure 10:
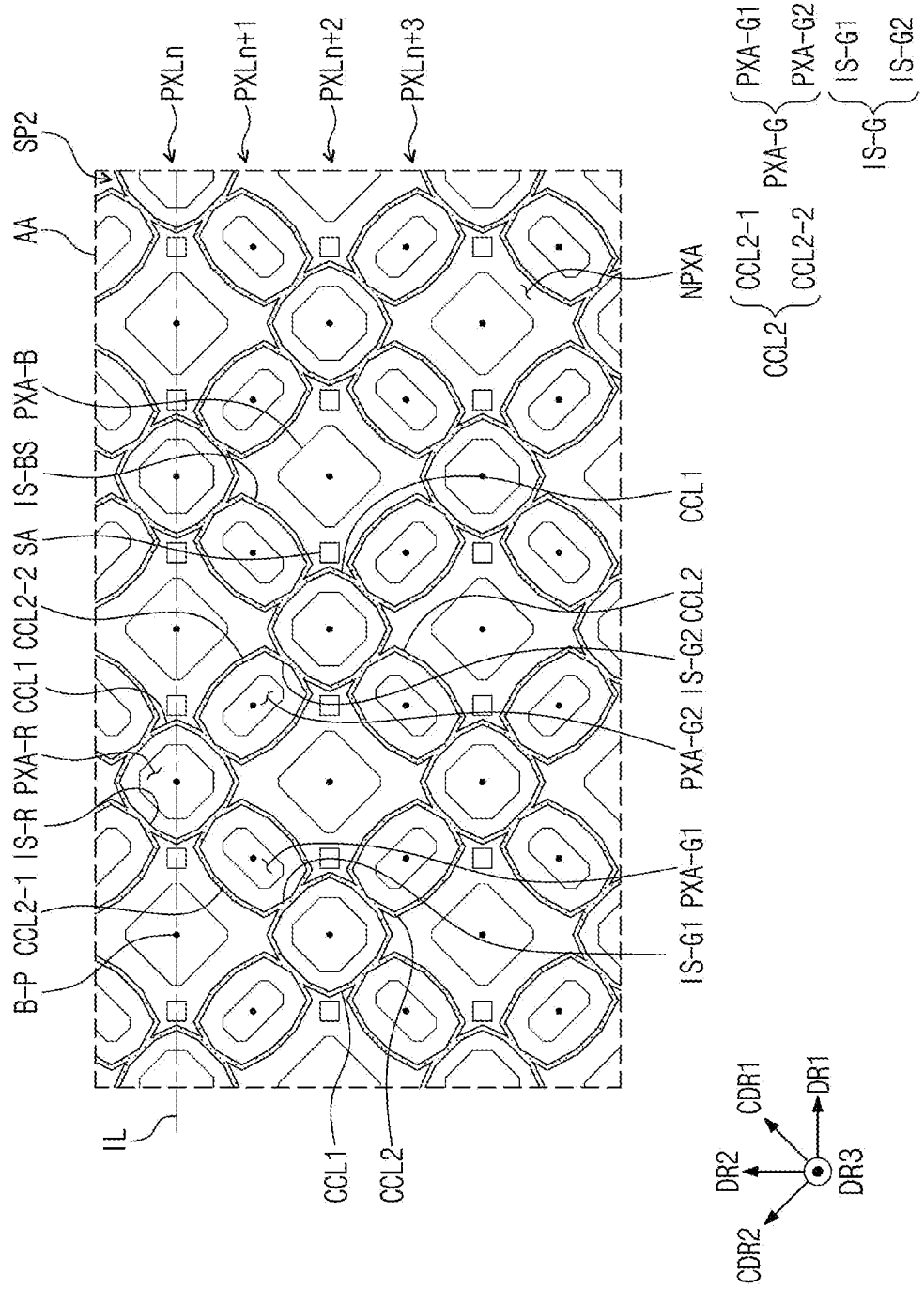
FIG. 10 is an enlarged plan view of a partial area of FIG. 7B.
Figure 11A:
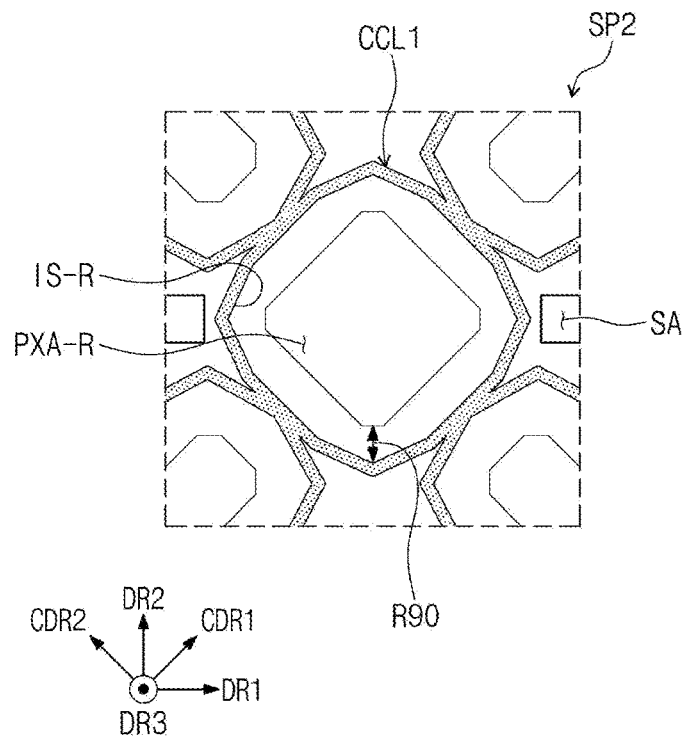
FIG. 11A is a plan view illustrating a first color emission area and a sensing electrode.
Figure 11B:
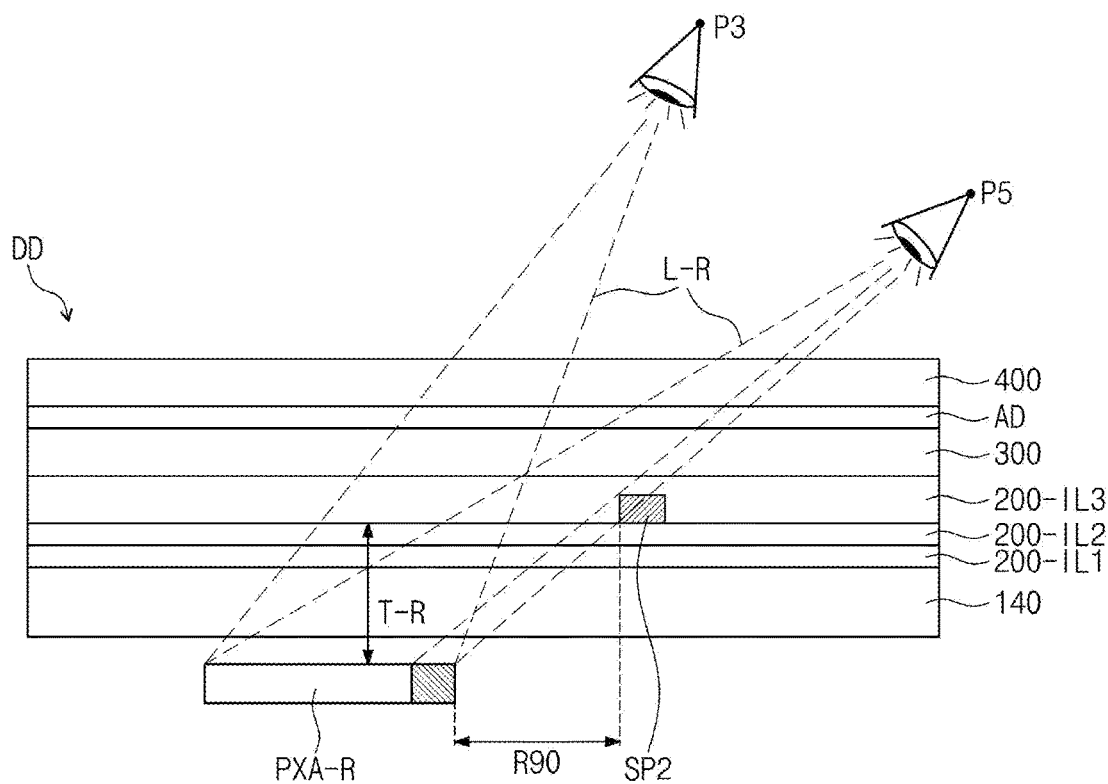
FIG. 11B is a cross-sectional view illustrating a radiation path of a first color light.
Figure 11C:
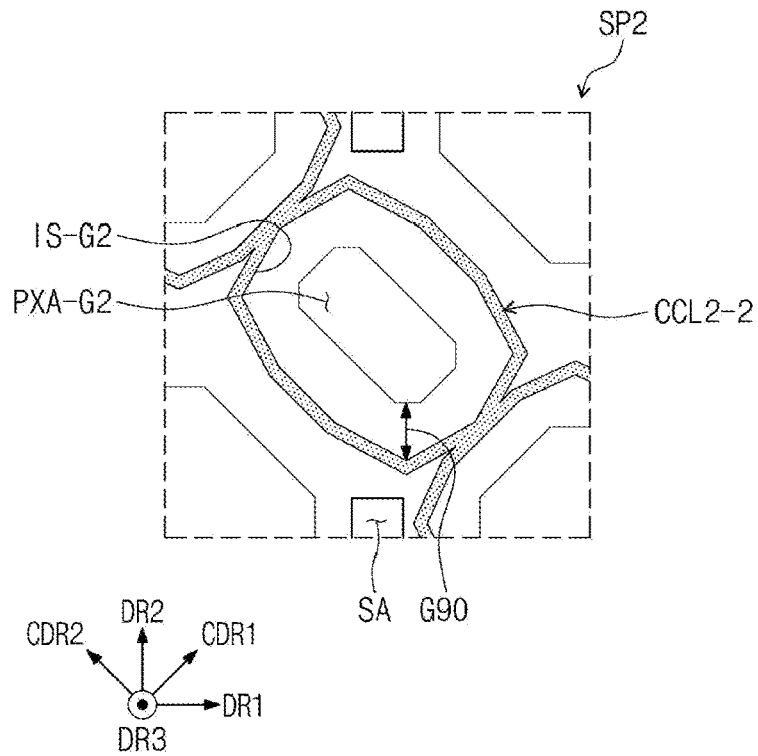
FIG. 11C is a plan view illustrating a second color emission area and a sensing electrode.
Figure 11D:
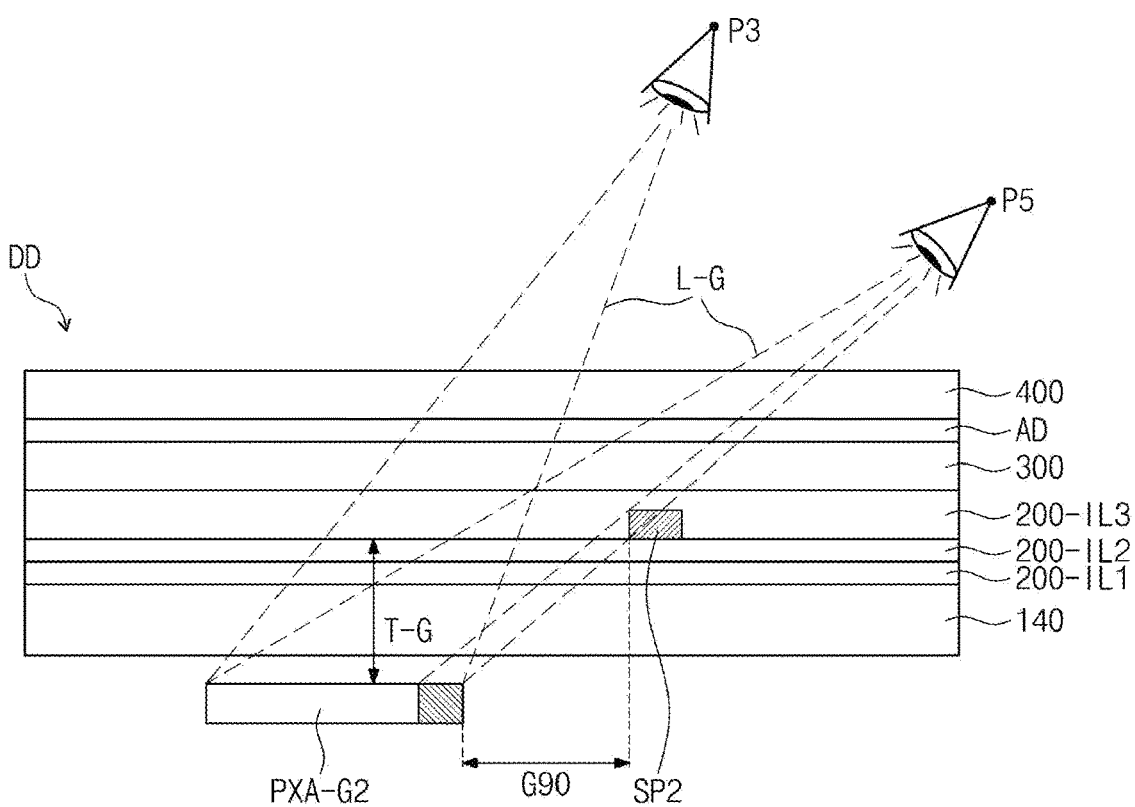
FIG. 11D is a cross-sectional view illustrating a radiation path of a second color light.
Figure 11E:
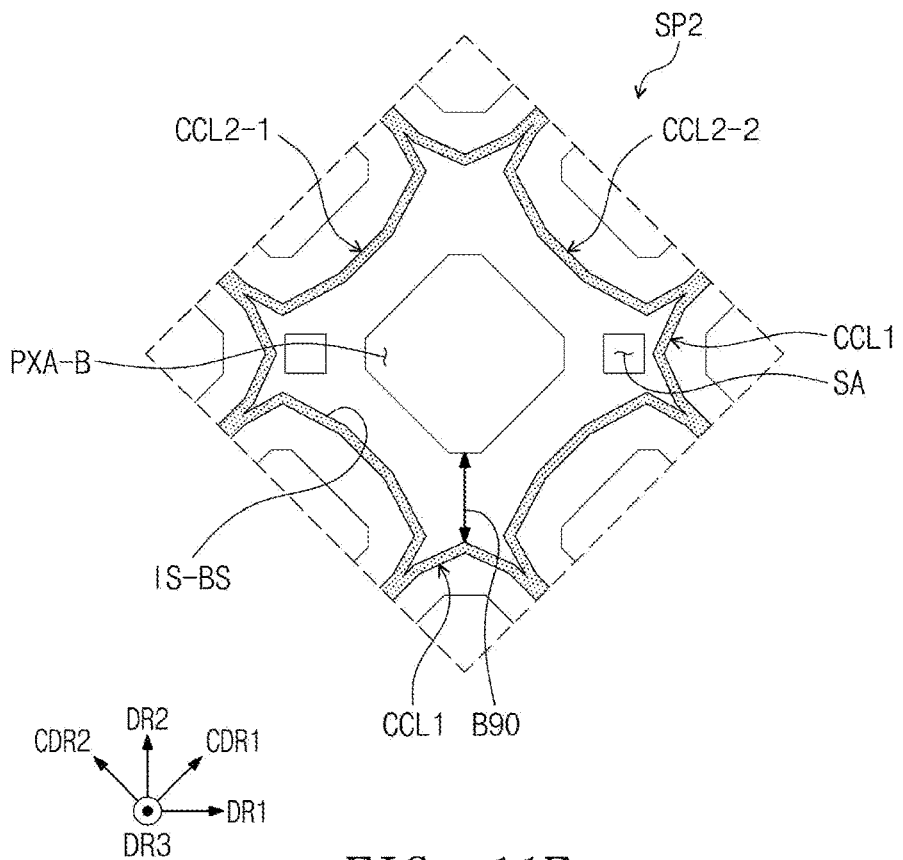
FIG. 11E is a plan view illustrating a third color emission area and a sensing electrode.
Figure 11F:
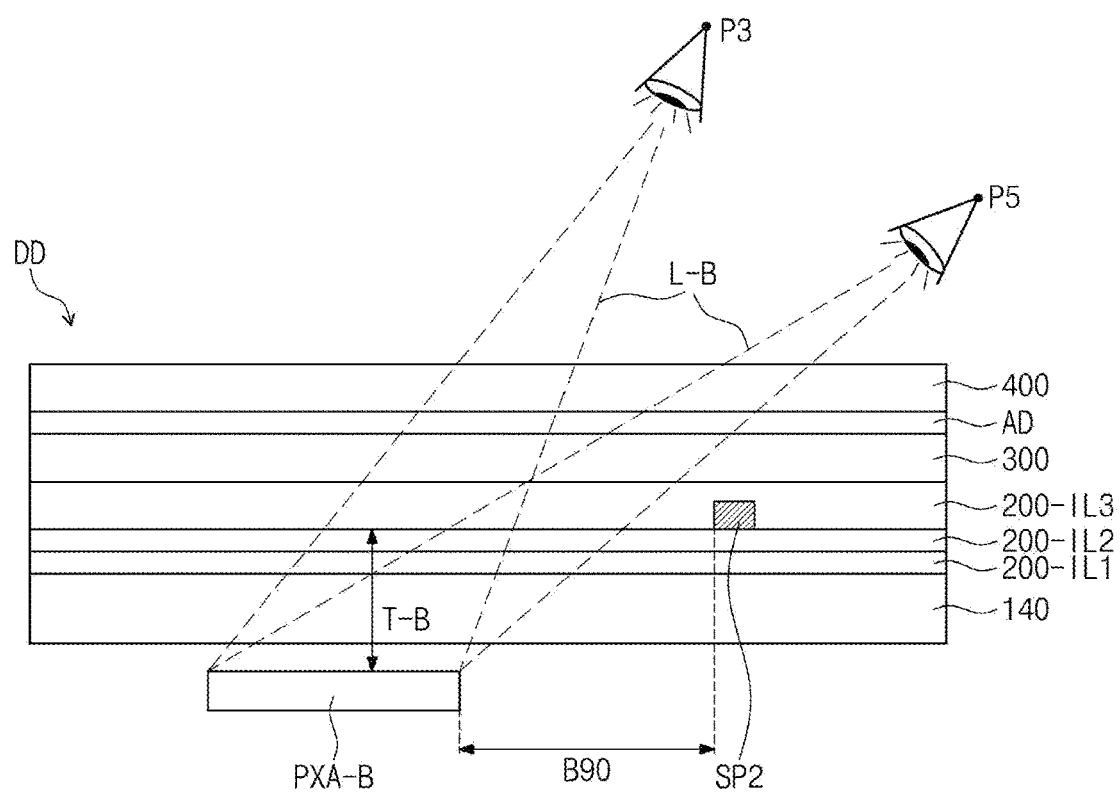
FIG. 11F is a cross-sectional view illustrating a radiation path of a third color light.

FIG. 10 is an enlarged plan view of a partial area AA of FIG. 7B. FIG. 11A is a plan view illustrating a first color emission area PXA-R and a sensing electrode SP2. FIG. 11B is a cross-sectional view illustrating a radiation path of the first color light L-R. FIG. 11C is a plan view illustrating the second color emission area PXA-G and the sensing electrode SP2. FIG. 11D is a cross-sectional view illustrating a radiation path of the second color light L-G. FIG. 11E is a plan view illustrating a third color emission area PXA-B and a sensing electrode SP2. FIG. 11F is a cross-sectional view illustrating a radiation path of the third color light L-B. FIG.

12 is a graph illustrating a color coordinate change amount of a white image according to an embodiment of the inventive concept.

FIG. 10 is an enlarged view of the detection pattern SP2 to describe the first sensing electrodes E1-1 to E1-5 and the second sensing electrodes E2-1 to E2-4 having a mesh shape shown in FIG. 7B. Other portions of the non-illustrated first sensing electrodes E1-1 to E1-5 and second sensing electrodes E2-1 to E2-4 may also have the same shape as the detection patterns SP2 illustrated in FIG. 10. Hereinafter, the detection pattern SP2 will be described as a sensing electrode SP2.

In the boundary area between the first sensing electrodes E1-1 to E1-5 and the second sensing electrodes E2-1 to E2-4 shown in FIG. 7B, emission areas PXA-R, PXA-G, and PXA-B having a shape similar to that of FIG. 10 are disposed, and conductive lines having a shape similar to that of FIG. 10 are disposed. However, cut patterns may be defined in the conductive lines to electrically separate the first sensing electrodes E1-1 to E1-5 and the second sensing electrodes E2-1 to E2-4. Each of the cut patterns may be an area in which a conductive line is etched and removed.

The sensing electrode SP2 may include conductive lines overlapping the non-emission area NPXA. Accordingly, the sensing electrode SP2 has a grid shape or a mesh shape. The line width of the conductive lines constituting the sensing electrode SP2 may be 2 micrometers to 5 micrometers. In some cases, the line width of the conductive lines constituting the sensing electrode SP2 may be about 2 micrometers to about 5 micrometers.

The conductive lines may include first conductive closed line patterns CCL1 corresponding to the first color emission areas PXA-R of the n-th pixel row PXLn and the (n+2)-th pixel row PXLn+2 and second conductive closed line patterns CCL2 corresponding to the second color emission areas PXA-G of the (n+1)-th pixel row PXLn+1 and the (n+3)-th pixel row PXLn+3. The first conductive closed line patterns CCL1 and the second conductive closed line patterns CCL2 do not overlap the first to third emission areas PXA-B, PXA-R, and PXA-G and the light detection area SA. For example, the first conductive closed line patterns CCL1 and the second conductive closed line patterns CCL2 may surround portions of the first to third emission areas PXA-B, PXA-R, and PXA-G and the light detection area SA.

In the sensing electrode SP2, first openings IS-R corresponding to the first color emission areas PXA-R (or a first light-emitting opening) are provided, and second openings IS-G corresponding to the second color emission areas PXA-G (or a second light-emitting opening) are provided. The first opening IS-R may form an area larger than the first color emission area PXA-R, and the second opening IS-G may form a larger area than the second color emission area PXA-G.

In addition, in the sensing electrode SP2, a third opening IS-BS that commonly corresponds to the third color emission area PXA-B (or the third light-emitting opening) and the light detection area SA (or the light-receiving opening PDL-OP2 (see FIG. 7A)) is provided. One third color emission area PXA-B and at least one light detection area SA may be disposed in each of the third openings IS-BS.

A plurality of first conductive closed line patterns CCL1 and a plurality of second conductive closed line patterns CCL2 surrounding one third color emission area PXA-B and two light detection areas SA define the third opening IS-BS. In this embodiment, four first conductive closed line patterns CCL1 and four second conductive closed line patterns CCL2 define one third opening IS-BS. Four first conductive closed line patterns CCL1 and four second conductive closed line patterns CCL2 are alternately disposed in a clockwise or counterclockwise direction. In an embodiment of the inventive concept, two light detection areas SA facing in the second direction may be further disposed inside the third opening IS-BS.

In this embodiment, the second opening IS-G may include first type openings IS-G1 and second type openings IS-G2 corresponding to the first type emission areas PXA-G1 and second type emission areas PXA-G2. The second conductive closed line patterns CCL2 may also include the first type closed line patterns CCL2-1 and the second type closed line patterns CCL2-2 corresponding to the first type openings IS-G1 and the second type openings IS-G2, respectively.

According to this embodiment, the distance between the sensing electrode SP2 and each of the first color, the second color, and the third color emission areas PXA-R, PXA-G, and PXA-B at a specific azimuth angle may not be the same. This is done to generate a shielding effect by the sensing electrode SP2 only in a specific emission area when looking at each of the first color, second color, and third color emission areas PXA-R, PXA-G, and PXA-B from a measurement point having a specific azimuth angle and a specific viewing angle.

Referring to FIG. 11A, the white image measured at the fifth measurement point P5 was described as having a yellow shift compared to the white image measured at the fourth measurement point P4, and in the present embodiment, a display device including first color, second color, and third color emission areas PXA-R, PXA-G, and PXA-B capable of reducing yellow shift and a sensing electrode SP2 is described.

FIGS. 11A, 11C, and 11E are enlarged views of each of the first color, second color, and third color emission areas PXA-R, PXA-G, and PXA-B shown in FIG. 10. In FIGS. 11C and 11D, the second type emission area PXA-G2 and the second type closed line pattern CCL2-2 shown in FIG. 10 are illustrated.

Referring to FIGS. 11A to 11F, a distance R90 between the first color emission area PXA-R and the sensing electrode SP2 and a distance G90 between the second color emission area PXA-G and the sensing electrode SP2 may be smaller than a distance B90 between the third color emission area PXA-B and the sensing electrode SP2. The distances R90, G90, and B90 were obtained by measuring a separation distance on the plane between vertices of the first, second, and third openings IS-R, IS-G, and IS-BS and sides of the first, second, and third color emission areas PXA-R, PXA-G, and PXA-B at an azimuth of 90°.

In other words, the distance R90 between the first color emission area PXA-R and the sensing electrode SP2 is a distance between the first color emission area PXA-R and the first conductive closed line pattern CCL1 at an azimuth of 90°, and the distance G90 between the second type emission area PXA-G2 and the sensing electrode SP2 is a distance between the second type emission area PXA-G2 and the second type closed line pattern CCL2-2 at an azimuth angle of 90°. The distance B90 between the third color emission area PXA-B and the sensing electrode SP2 is a distance between the third color emission area PXA-B and the first conductive closed line pattern CCL1 at an azimuth of 90°

Referring to FIGS. 11A and 11B, the distance R90 between the first color emission area PXA-R and the sensing electrode SP2 may be set to a distance at which when looking at the first color emission area PXA-R at the third measurement point P3, the shielding effect by the sensing electrode SP2 may not occur, and when looking at the first color emission area PXA-R at the fifth measurement point P5, the shielding effect by the sensing electrode SP2 may occur.

As shown in FIG. 11B, when looking at the first color emission area PXA-R at the fifth measurement point P5, the first color emission area PXA-R may be partially shielded by the sensing electrode SP2. The distance R90 may be set such that about 5% to about 20% of the area of the first color emission area PXA-R is shielded by the sensing electrode SP2. As the shielding rate increases, the amount of light of the first color light L-R provided to the fifth measurement point P5 is reduced. This may reduce the $\Delta v'$ value measured at the fifth measurement point P5.

According to a distance T-R between the plane defined by the first color emission area PXA-R and the plane defined by the upper surface of the sensing electrode SP2, in other words, a distance in the thickness direction of the display device DD, the distance R90 at which the first color emission area PXA-R may be partially shielded may be determined by the sensing electrode SP2. A plane defined by the first color emission area PXA-R may be a plane defined by an upper surface of the first electrode AE illustrated in FIG. 7A. A distance T-R between the first color emission area PXA-R and the sensing electrode SP2 may be 6 micrometers to 25 micrometers. In some cases, a distance T-R between the first color emission area PXA-R and the sensing electrode SP2 may be about 6 micrometers to about 25 micrometers. It is possible to change according to the distance T-R in the thickness direction, but the distance R90 between the first color emission area PXA-R and the sensing electrode SP2 may be 20 micrometers or less.

In this example, when a distance T-R between the first color emission area PXA-R in the thickness direction and the sensing electrode SP2 is about 13 micrometers, and a distance R90 between the first color emission area PXA-R and the sensing electrode SP2 is about 5 micrometers on a plane; thus, about 10% of the area of the first color emission area PXA-R may be shielded by the sensing electrode SP2.

On the other hand, the shielding area of the first color emission area PXA-R by the sensing electrode SP2 measured at the fifth measurement point P5 is not determined only by the distance R90 between the first color emission area PXA-R and the sensing electrode SP2. The shielding area of the first color emission area PXA-R by the sensing electrode SP2 measured at the fifth measurement point P5 may be determined by the entire distance between the sensing electrode SP2 and the first color emission area PXA-R in a range of an azimuth angle of 0° to an azimuth angle of 180°. Nevertheless, the distance R90 between the first color emission area PXA-R and the sensing electrode SP2 measured at an azimuth of 90° may be a major factor in determining the shielding area of the first color emission area PXA-R by the sensing electrode SP2. This is because the first color emission area PXA-R is disposed inside the first opening IS-R of the polygon when viewed in a plan view, as shown in FIG. 11A.

Referring to FIGS. 11C and 11D, on a plane, a distance G90 between the second color emission area PXA-G2 and the sensing electrode SP2 may be set to a distance at which when looking at the second color emission area PXA-G at the third measurement point P3, the shielding effect by the sensing electrode SP2 may not occur, and when looking at the first color emission area PXA-R at the fifth measurement point P5, the shielding effect by the sensing electrode SP2 may occur. The amount of light of the second color light L-G provided to the fifth measurement point P5 may be reduced due to this configuration.

As shown in FIG. 11D, when looking at the second type emission area PXA-G2 at the fifth measurement point P5, the distance G90 may be set such that about 5% to about 20% of the size of the second type emission area PXA-G2 is shielded by the sensing electrode SP2. A distance T-G between the second type emission area PXA-G2 and the sensing electrode SP2 may be 6 micrometers to 25 micrometers, and a distance G90 between the second type emission area PXA-G2 and the sensing electrode SP2 may be 20 micrometers or less.

In this example, when a distance T-R between the second type emission area PXA-G2 in the thickness direction and the sensing electrode SP2 is about 13 micrometers and a distance G90 between the second type emission area PXA-G2 and the sensing electrode SP2 is about 3 micrometers on a plane, about 10% of the size of the second type emission area PXA-G2 may be shielded by the sensing electrode SP2. Although the distance R90 of FIG. 11A and the distance G90 of FIG. 11C are different, the reason why the shielding rate of each of the first color emission area PXA-R and the second type emission area PXA-G2 by the sensing electrode SP2 is similar is that the shape and size of the first color emission area PXA-R and the second type emission area PXA-G2 are different and the shape and size of the first opening IS-R and the second type opening IS-G2 are different.

When looking at the first color emission area PXA-R and the second color emission area PXA-G at the fifth measurement point P5, the first conductive closed line pattern CCL1 and the second type closed line pattern CCL2-2 may be designed such that a shielding area (hereinafter, referred to as a first shielding area) of the first color emission area PXA-R by the sensing electrode SP2 and a shielding area of the second color emission area PXA-G by the sensing electrode SP2 (hereinafter, referred to as a second shielding area) is different. The difference between the first shielding area and the second shielding area may vary according to values of the color coordinate change amounts $\Delta u'$ and $\Delta v'$ measured at the fifth measurement point P5. Depending on the first shielding area and the second shielding area, the $\Delta v'$ value and the $\Delta u'$ value of the color coordinate change amount may vary. In the same sense, the distance R90 between the first color emission area PXA-R and the sensing electrode SP2 and the distance G90 between the second color emission area PXA-G and the sensing electrode SP2 are may be the same or different.

Referring to FIG. 11E, on a plane, the distance B90 between the third color emission area PXA-B and the sensing electrode SP2 may be set to a distance at which the shielding effect by the sensing electrode SP2 may not occur when looking at the third color emission area PXA-B at the third measurement point P3 and the fifth measurement point P5. Accordingly, the amount of light of the third color light L-B provided to the fifth measurement point P5 compared to the third measurement point P3 is not reduced. The third color emission area PXA-B does not affect the color coordinate change amounts $\Delta u'$ and $\Delta v'$ measured at the fifth measurement point P5.

The "level at which the interference of the sensing electrode of the input sensor with respect to the radiation path of the raw white image is negligible" explained with reference to FIGS. 9A and 9B means that the shielding effect by the sensing electrode SP2 did not occur in all cases when looking at each of the first color emission area PXA-R, the second color emission area PXA-G, and the third color emission area PXA-B at each of the measurement points P1 to P5 (see FIG. 8A).

A distance T-B between the third color emission area PXA-B and the sensing electrode SP2 may also be 6 micrometers to 25 micrometers, or about 6 micrometers to about 25 micrometers. It is possible to change according to the distance T-B in the thickness direction, but the distance B90 between the third color emission area PXA-B and the sensing electrode SP2 may be greater than the distance R90 of FIG. 11A and the distance G90 of FIG. 11C under the same condition.

In this example, when a distance T-B between the third color emission area PXA-B in the thickness direction and the sensing electrode SP2 is about 13 micrometers and a distance B90 between the third color emission area PXA-B and the sensing electrode SP2 is about 11 micrometers on a plane, the shielding effect of the third color emission area PXA-B by the sensing electrode SP2 may not occur. Additionally, in the measurement point having an azimuth angle of 135° and an azimuth angle of 60° with respect to the third color emission area PXA-B and the sensing electrode SP2 shown in FIG. 11E, when looking at the third color emission area PXA-B, the shielding effect of the third color emission area PXA-B by the sensing electrode SP2 did not occur.

Referring to FIGS. 11A to 11F, the first conductive closed line patterns CCL1 and the second conductive closed line patterns CCL2 do not overlap the light detection area SA on a plane. Therefore, any one of the first color light L-R, the second color light L-G, and the third color light L-B is reflected from the user's finger US_F as shown in FIG. 7A and then is provided to the first light detection element OPD1. In particular, since the first conductive closed line pattern CCL1 and the second conductive closed line pattern CCL2 are not disposed between the third color emission area PXA-B and the light detection area SA, an angle at which the third color light L-B is incident on the first light detection element OPD1 after being reflected from the user's finger US_F may be very wide. This is because an obstacle for shielding the third color light L-B is not disposed between the third color emission area PXA-B and the light detection area SA. In order to use the third color light L-B as the input sensing light, the second color filter CF-G described with reference to FIG. 7A may be changed to a blue color filter.

Figure 12:
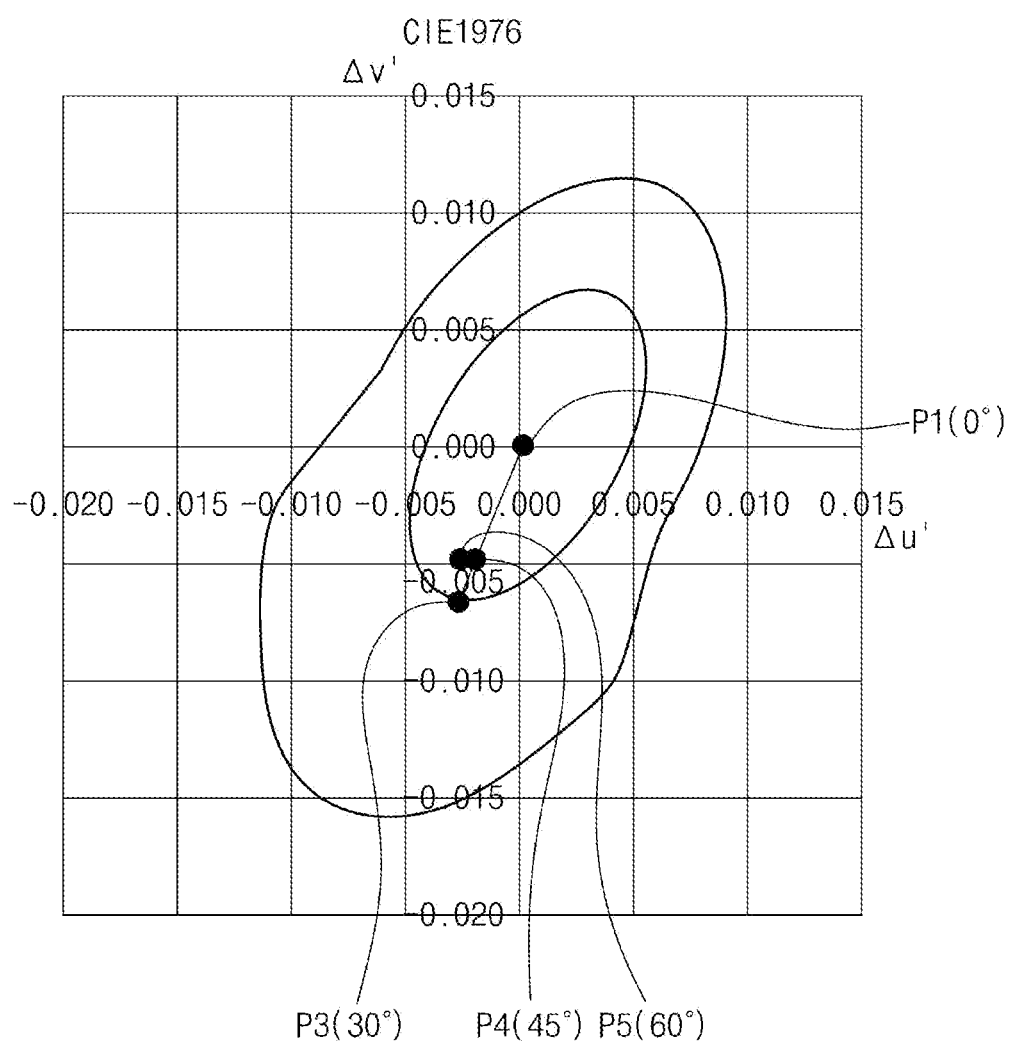
FIG. 12 is a graph illustrating a color coordinate change amount of a white image according to an embodiment of the inventive concept.

FIG. 12 shows the color coordinate change amounts $\Delta u'$ and $\Delta v'$ of the display device including the first color emission area, the second type emission area and the third color emission area PXA-R, PXA-G2, and PXA-B and the sensing electrode SP2 of FIGS. 11A to 11F. Compared to the graph of FIG. 9A, it can be seen that the $\Delta v'$ value at the fifth measurement point P5 is significantly reduced in the graph of FIG. 12. According to the graph of FIG. 12, since the white image measured at the third measurement point P3 to the fifth measurement point P5 has a similar color, the user may insensitively (or less sensitively) recognize the color coordinate change amounts $\Delta u'$ and $\Delta v'$ according to the viewing angle.

Contrary to the above, under the condition that there is no interference of the sensing electrode of the input sensor with respect to the radiation path of the raw white image, if a blue-shifted white image compared to the white image recognized at the third measurement point P3 and the fourth measurement point P4 is measured at the fifth measurement point P5, the sensing electrode SP2 may be designed such that the shielding effect (or partial shielding effect) by the sensing electrode SP2 does not occur with respect to the first color emission area PXA-R and the second color emission area PXA-G, and the shielding effect (or partial shielding effect) by the sensing electrode SP2 may occur only in the third color emission area PXA-B.

The distance between the sensing electrode SP2 and each of the first color emission area PXA-R and the second color emission area PXA-G may be changed to the distance B90 of FIG. 11F, and the distance between the sensing electrode SP2 and the third color emission area PXA-B may be changed to the distance R90 of FIG. 11A. This will be described later with reference to FIG. 17.

In addition, under the condition that there is no interference of the sensing electrode of the input sensor with respect to the radiation path of the raw white image, if a magenta-ish white image is measured at the fifth measurement point P5 compared to the white image recognized at the third measurement point P3 and the fourth measurement point P4, the sensing electrode SP2 may be designed in the manner described above such that a shielding effect (or partial shielding effect) by the sensing electrode SP2 occurs in the first color emission area PXA-R and the third color emission area PXA-B, and the shielding effect (or partial shielding effect) by the sensing electrode SP2 does not occur only in the second color emission area PXA-G. For example, in FIG. 10, positions of the second color emission area PXA-G and the third color emission area PXA-B may be interchanged.

Conversely, under the condition that there is no interference of the sensing electrode of the input sensor with respect to the radiation path of the raw white image, if a greenish white image compared to the white image recognized at the third measurement point P3 and the fourth measurement point P4 is measured at the fifth measurement point P5, the design of the sensing electrode SP2 may be changed such that the shielding effect (or partial shielding effect) by the sensing electrode SP2 does not occur with respect to the first color emission area PXA-R and the third color emission area PXA-B, and the shielding effect (or partial shielding effect) by the sensing electrode SP2 occurs only in the second color emission area PXA-G. For example, in the embodiment illustrated in FIG. 17 to be described later, the positions of the second color emission area PXA-G and the third color emission area PXA-B may be exchanged.

In addition, if a cyanish white image is measured at the fifth measurement point P5 compared to the white image recognized at the third measurement point P3 and the fourth measurement point P4, the sensing electrode SP2 may be designed such that a shielding effect (or partial shielding effect) by the sensing electrode SP2 occurs in the second color emission area PXA-G and the third color emission area PXA-B, and the shielding effect (or partial shielding effect) by the sensing electrode SP2 does not occur only in the first color emission area PXA-R. For example, in FIG. 10, positions of the first color emission area PXA-R and the third color emission area PXA-B may be interchanged.

Conversely, if a red-shifted white image compared to the white image recognized at the third measurement point P3 and the fourth measurement point P4 is measured at the fifth measurement point P5, the design of the sensing electrode SP2 may be changed such that the shielding effect (or partial shielding effect) by the sensing electrode SP2 does not occur with respect to the second color emission area PXA-G and the third color emission area PXA-B, and the shielding effect (or partial shielding effect) by the sensing electrode SP2 occurs only in the first color emission area PXA-R. For example, in the embodiment illustrated in FIG. 17 to be described later, the positions of the first color emission area PXA-R and the third color emission area PXA-B may be interchanged.

Figure 13A:
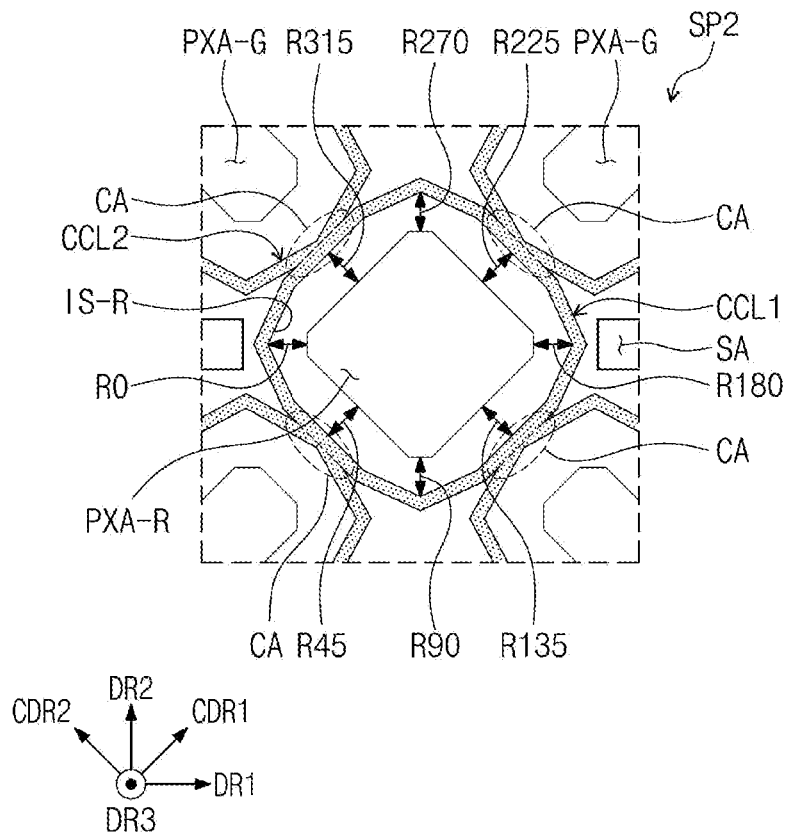
FIG. 13A is a plan view illustrating a first color emission area and a sensing electrode according to an embodiment of the inventive concept.
Figure 13B:
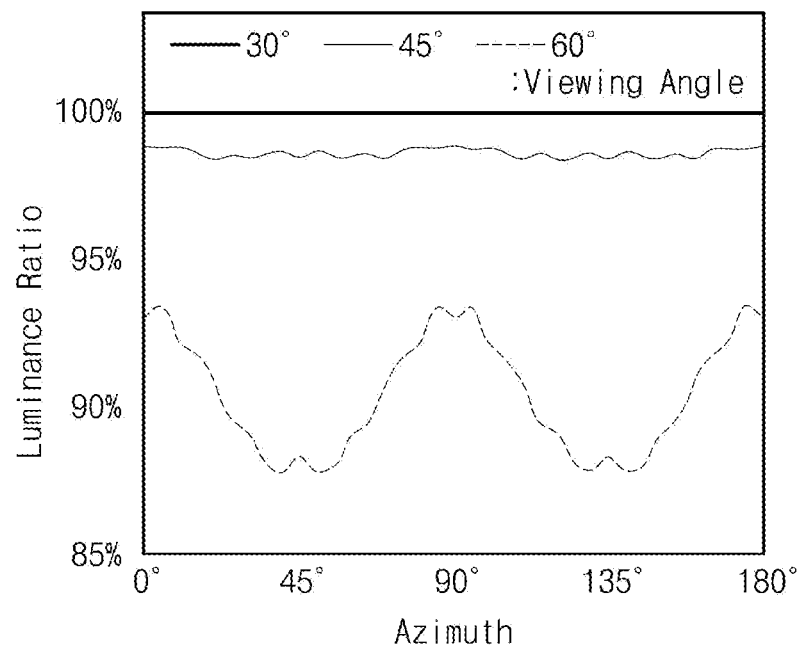
FIG. 13B is a graph illustrating a change in a luminance ratio of a first color light according to a viewing angle and an azimuth angle measured according to an embodiment of the inventive concept.
Figure 13C:
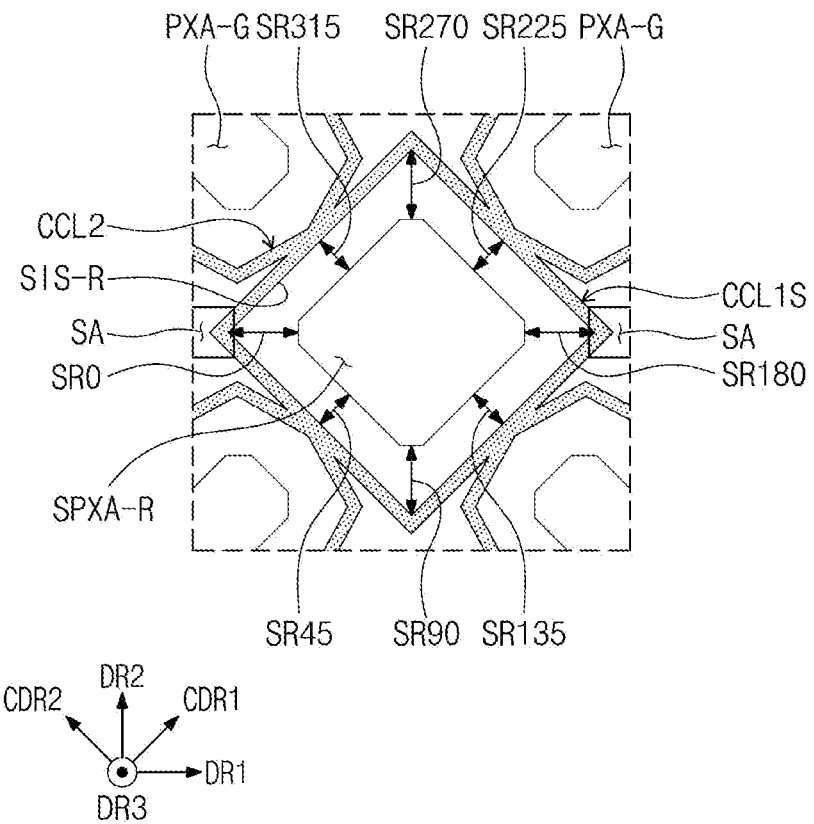
FIG. 13C is a plan view illustrating a first color emission area and a sensing electrode according to a comparative example.
Figure 13D:
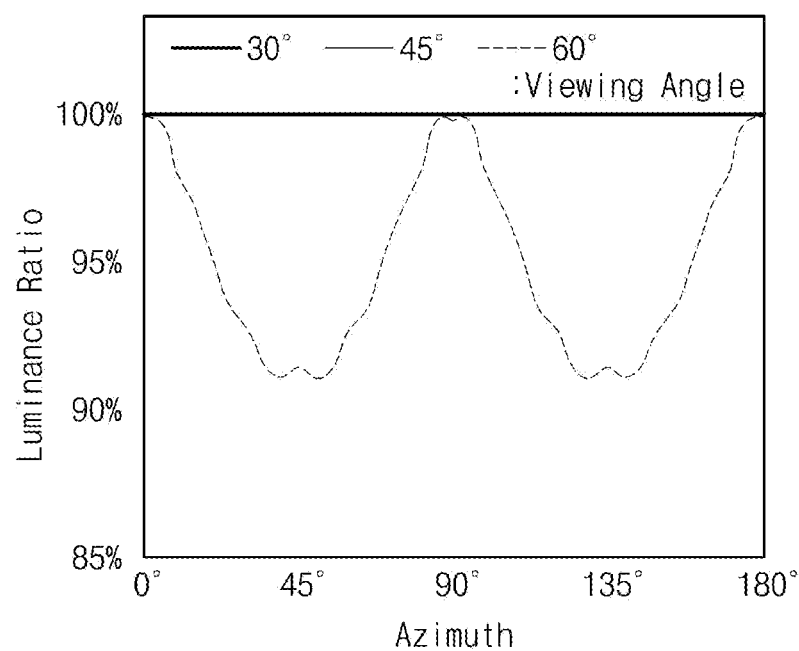
FIG. 13D is a graph illustrating a change in the luminance ratio of the first color light according to the viewing angle and the azimuth angle measured in a comparative example.
Figure 13E:
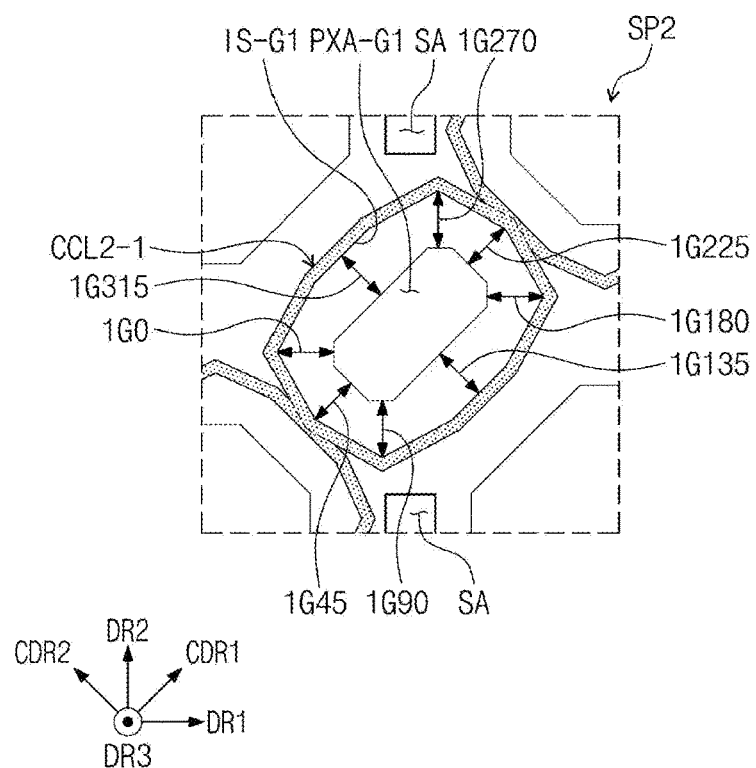
FIG. 13E is a plan view illustrating a second color emission area and a sensing electrode of a first type according to an embodiment of the inventive concept.
Figure 13F:
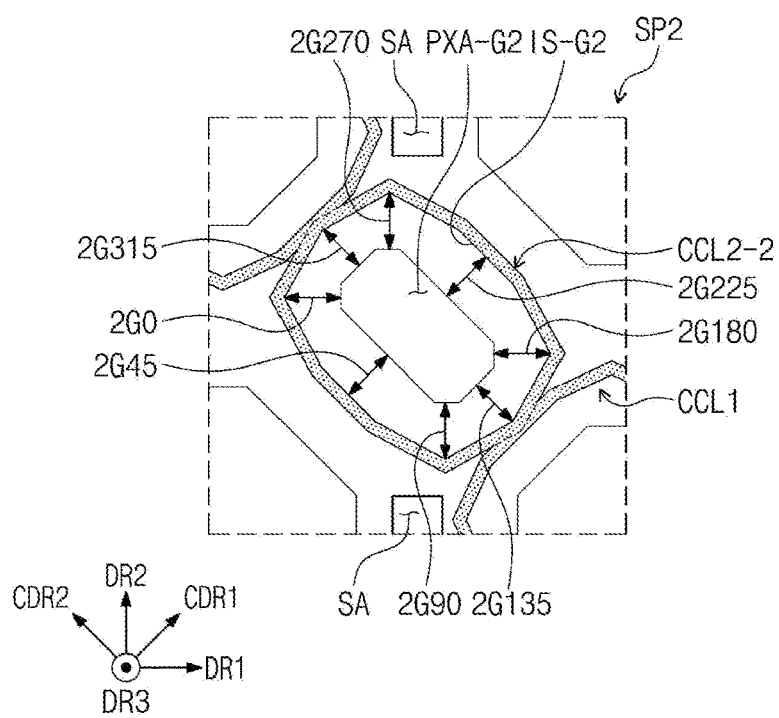
FIG. 13F is a plan view illustrating a second type second color emission area and a sensing electrode according to an embodiment of the inventive concept.

FIG. 13A is a plan view illustrating a first color emission area PXA-R and a sensing electrode SP2 according to an embodiment of the inventive concept. FIG. 13B is a graph illustrating a change in a luminance ratio of a first color light according to a viewing angle and an azimuth angle measured according to an embodiment of the inventive concept. FIG. 13C is a plan view illustrating a first color emission area and a sensing electrode according to a comparative example. FIG. 13D is a graph illustrating a change in the luminance ratio of the first color light according to the viewing angle and the azimuth angle measured in the comparative example. FIG. 13E is a plan view illustrating a first type second color emission area PXA-G1 and a sensing electrode SP2 according to an embodiment of the inventive concept. FIG. 13F is a plan view illustrating a second type second color emission area PXA-G2 and a sensing electrode SP2 according to an embodiment of the inventive concept.

Referring to FIG. 13A, distances measured at azimuth angles of 0°, 45°, 90°, 135°, 180°, 225°, 270°, and 315° on a plane between the first color emission area PXA-R and the sensing electrode SP2 may be referred to as a first distance R0, a second distance R45, a third distance R90, a fourth distance R135, a fifth distance R180, a sixth distance R225, a seventh distance R270, and an eighth distance R315, respectively.

In describing the shielding effect of the sensing electrode SP2 with reference to FIGS. 11A to 11F, description is provided based on the third distance R90, but the shielding effect of the sensing electrode SP2 described with reference to FIGS. 11A to 11F may be equally applied to points having an azimuth angle different from the third distance R90.

Each of the first distance R0 to the eighth distance R315 between the first color emission area PXA-R and the sensing electrode SP2 may be smaller than a corresponding distance among first to eighth distances between the third color emission area PXA-B and the sensing electrode SP2. Each of the first to eighth distances between the second color emission area PXA-G and the sensing electrode SP2 may be smaller than a corresponding distance among first to eighth distances between the third color emission area PXA-B and the sensing electrode SP2. At this time, it is possible to decrease the Δv' value of the color coordinate change amounts Δu' and Δv' measured at each of eight points with a viewing angle of 60° and an azimuth angle of 0°, 45°, 90°, 135°, 180°, 225°, 270°, or 315°

Referring to FIG. 13A, the first distance R0, the third distance R90, the fifth distance R180, and the seventh distance R270 may be equal to each other, and the second distance R45, the fourth distance R135, the sixth distance R225, and the eighth distance R315 may be equal to each other. The shielding effect of the sensing electrode SP2 generated at each of the four points having a viewing angle of 60° and an azimuth angle of 0°, 90°, 180°, or 270°, in other words, the shielding area of the first color emission area PXA-R by the sensing electrode SP2, may be the same. The shielding effect of the sensing electrode SP2 generated at each of the four points having a viewing angle of 60° and an azimuth angle of 45°, 135°, 225°, or 315°, in other words, the shielding area of the first color emission area PXA-R by the sensing electrode SP2, may be the same. However, the shielding area of the first color emission area PXA-R by the sensing electrode SP2 measured at a point having a viewing angle of 60° and an azimuth angle of 0° may be different from the shielding area of the first color emission area PXA-R by the sensing electrode SP2 measured at a point having a viewing angle of 60° and an azimuth angle of 45°.

In this embodiment, in order to satisfy the above-described condition, the first color emission area PXA-R and the first opening IS-R may have different shapes. The first color emission area PXA-R or the light-emitting opening PDL-OP1 (see FIG. 7A) forms a substantially N-gonal shape, and the first opening IS-R may form a substantially M-shape or may form a circle or an ellipse. N may be a natural number greater than or equal to 4, and M may be a natural number greater than N. As an example, an N-gonal shape may have four sides or more.

FIG. 13A shows an octagonal first color emission area PXA-R and a dodecagonal first opening IS-R. In other words, the first color emission area PXA-R has eight sides and the first opening IS-R have twelve sides. If M is greater than N, a deviation of the first distance R0, the second distance R45, the third distance R90, the fourth distance R135, the fifth distance R180, the sixth distance R225, the seventh distance R270, and the eighth distance R315 may be reduced.

The first distance R0, the third distance R90, the fifth distance R180, and the seventh distance R270 were obtained by measuring a separation distance on a plane between the vertices of the first opening IS-R and the sides of the first color emission area PXA-R. The second distance R45, the fourth distance R135, the sixth distance R225, and the eighth distance R315 were obtained by measuring a separation distance on a plane between the sides of the first opening IS-R and the sides of the first color emission area PXA-R.

A deviation of the first distance R0, the second distance R45, the third distance R90, the fourth distance R135, the fifth distance R180, the sixth distance R225, the seventh distance R270, and the eighth distance R315 may be less than or equal to 1.5 micrometers. In this embodiment, the first distance R0, the third distance R90, the fifth distance R180, and the seventh distance R270 may be 4 micrometers to 5 micrometers, or about 4 micrometers to about 5 micrometers, and the second distance R45, the fourth distance R135, the sixth distance R225, and the eighth distance R315 may be 5 micrometers to 6 micrometers, or about 5 micrometers to about 6 micrometers.

The first conductive closed line pattern CCL1 may define the same polygon as the first opening IS-R. FIG. 13A illustrates a first conductive closed line pattern CCL1 defining a dodecagon. In this case, the adjacent first conductive closed line pattern CCL1 and the second conductive closed line pattern CCL2 may partially overlap. For example, in an area CA (hereinafter, divided area) between the first color emission area PXA-R and the second color emission area PXA-G, the first conductive closed line pattern CCL1 and the second conductive closed line pattern CCL2 are divided and in the divided area CA, the conductive line has a larger line width compared to the other areas. In the divided area CA, the conductive line is patterned in a shape in which the first conductive closed line pattern CCL1 and the second conductive closed line pattern CCL2 overlap. Four divided areas CA are defined based on the first color emission area PXA-R. The divided areas CA are aligned in the first crossing direction CDR1 and the second crossing direction CDR2.

Referring to FIG. 13B, it may be seen that the luminance of the first color light measured at a viewing angle of 45° compared to a viewing angle of 30° is decreased, and the luminance of the first color light measured at a viewing angle of 60° compared to a viewing angle of 45° is decreased. A luminance deviation of the first color light measured at five points having a viewing angle of 60° and an azimuth angle of 0°, 45°, 90°, 135°, or 180° may be 5% or less. This is about 50% reduced compared to the comparative example to be described later.

FIG. 13C illustrates a first color emission area SPXA-R and a first opening SIS-R according to a comparative example. According to the comparative example, the first color emission area SPXA-R may substantially define a K-gonal shape, and the first opening SIS-R may substantially define an L-shape. K is a natural number greater than or equal to 4, and L may be a natural number less than or equal to K.

FIG. 13C shows an octagonal first color emission area SPXA-R and a substantially square first opening SIS-R. If L is less than K, a deviation of the first distance SR0, the second distance SR45, the third distance SR90, the fourth distance SR135, the fifth distance SR180, the sixth distance SR225, the seventh distance SR270, and the eighth distance SR315 may be relatively increased. In the comparative example, the first distance SR0, the third distance SR90, the fifth distance SR180, and the seventh distance SR270 may be 7.5 micrometers and the second distance SR45, the fourth distance SR135, the sixth distance SR225, and the eighth distance SR315 may be 5.5 micrometers.

In FIG. 13D, the graph of 30° and the graph of 45° overlap and are displayed as one graph. It can be seen that the luminance of the first color light measured at a viewing angle of 45° compared to a viewing angle of 30° is not reduced, but the luminance of the first color light measured at a viewing angle of 60° compared to a viewing angle of 45° is reduced. A luminance deviation of the first color light measured at five points having a viewing angle of 60° and an azimuth angle of 0°, 45°, 90°, 135°, or 180° may be about 10%.

In addition, the first conductive closed line pattern CCL1S may also define a substantially square shape. At this time, the first conductive closed line pattern CCL1S overlaps the light detection area SA so that a problem of shielding the second color light L-G incident on the first light detection element OPD1 (refer to FIG. 7A) may occur.

On the other hand, as described with reference to FIG. 11E, since the sensing electrode SP2 does not generate a shielding effect on the third color emission area PXA-B at a viewing angle of 60°, the luminance deviation described with reference to FIG. 13D may not occur between the third color emission area PXA-B and the sensing electrode SP2 illustrated in FIG. 11E.

FIG. 13E shows a first type emission area PXA-G1 and a first type closed line pattern CCL2-1. FIG. 13F shows a second type emission area PXA-G2 and a second type closed line pattern CCL2-2.

The first type emission area PXA-G1 and the first type opening IS-G1 may have different shapes, and the second type emission area PXA-G2 and the second type opening IS-G2 may have different shapes. Each of the first type emission area PXA-G1 and the second type emission area PXA-G2 substantially defines an I-gonal shape, and each of the first type opening IS-G1 and the second type opening IS-G2 may substantially define a J-gonal shape or may define a circle or an oval. I may be a natural number greater than or equal to 4, and J may be a natural number greater than I.

FIGS. 13E and 13F show octagonal second color emission areas PXA-G1 and PXA-G2 and decagonal second type openings IS-G1 and IS-G2. The second conductive closed line patterns CCL2-1 and CCL2-2 may define the same polygon as the second type openings IS-G1 and IS-G2.

FIG. 13E illustrates a second conductive closed line pattern CCL2-1 defining a decagon. In this case, the adjacent second conductive closed line pattern CCL2 may partially overlap the first conductive closed line pattern CCL1. The first distance 1G0, the third distance 1G90, the fifth distance 1G180, and the seventh distance 1G270 may be equal to each other, and the second distance 1G45, the fourth distance 1G135, the sixth distance 1G225, and the eighth distance 1G315 may be equal to each other. The first distance 1G0, the third distance 1G90, the fifth distance 1G180, and the seventh distance 1G270 may be set 6.5 micrometers to 7.3 micrometers, or about 6.5 micrometers to about 7.3 micrometers, and the second distance 1G45, the fourth distance 1G135, the sixth distance 1G225, and the eighth distance 1G315 may be set to 3 micrometers to 4 micrometers, or about 3 micrometers to 4 micrometers.

The first distance 1G0, the second distance 1G45, the third distance 1G90, the fifth distance 1G180, the sixth distance 1G225, and the seventh distance R270 were obtained by measuring the separation distance on a plane between the vertices of the first type opening IS-G1 and the sides of the first type emission area PXA-G1. The fourth distance 1G135 and the eighth distance 1G315 were obtained by measuring the separation distance on a plane between the sides of the first type opening IS-G1 and the sides of the first type emission area PXA-G1.

Based on the imaginary line connecting the azimuth angle of 90° and the azimuth angle of 270°, the second type emission area PXA-G2 of FIG. 13F symmetrical to the first type emission area PXA-G1 of FIG. 13E may be designed to be opposite to the design dimension between the first type emission area PXA-G1 and the sensing electrode SP2. The shielding effect of the sensing electrode SP2 on the second color emission area PXA-G may be determined as an average of the shielding effect of the sensing electrode SP2 with respect to the first type emission area PXA-G1 and the second type emission area PXA-G2.

Figure 14:
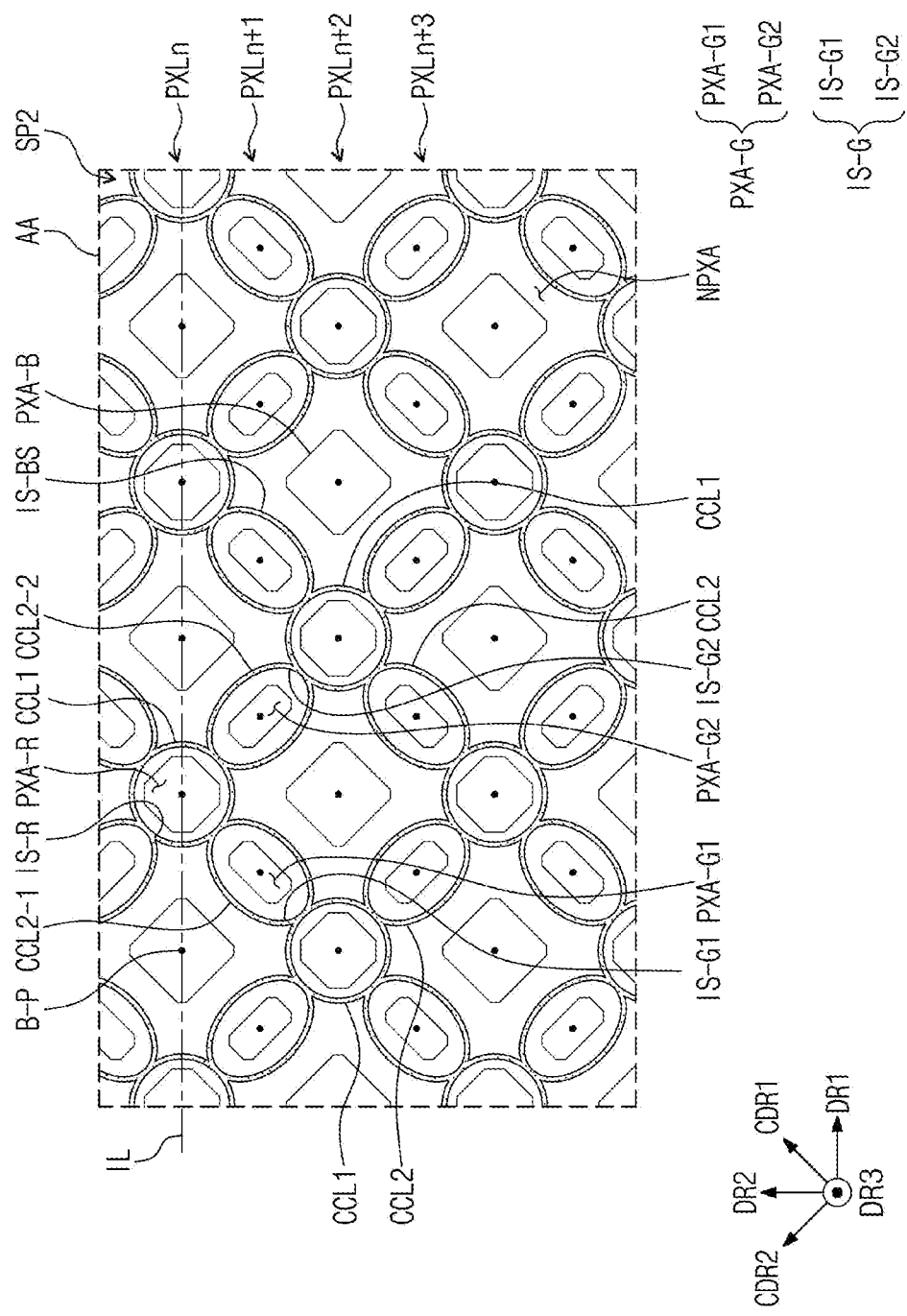
FIG. 14 is an enlarged plan view of a display device according to an embodiment of the inventive concept.
Figure 15:
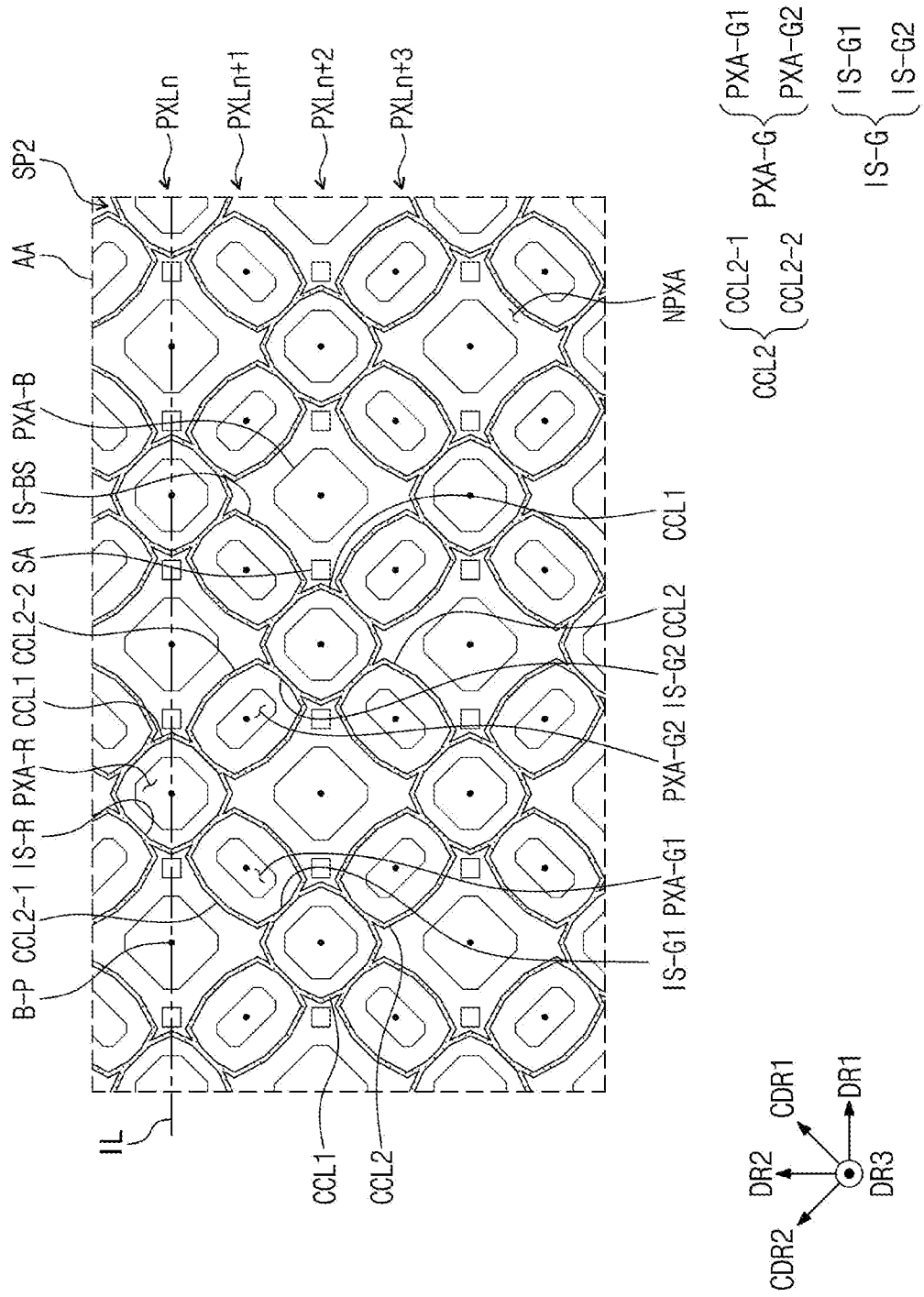
FIG. 15 is an enlarged plan view of a display device according to an embodiment of the inventive concept.
Figure 16:
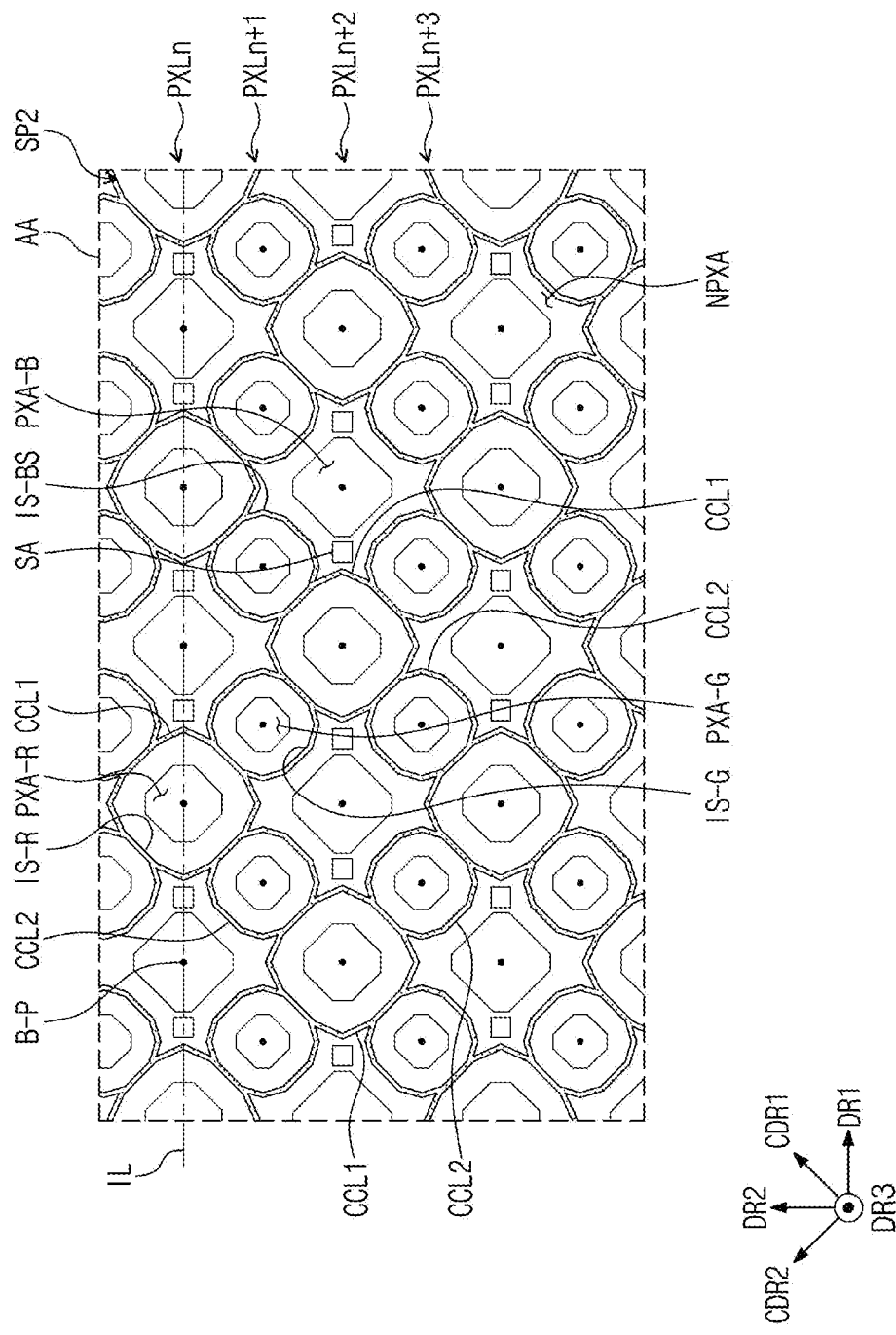
FIG. 16 is an enlarged plan view of a display device according to an embodiment of the inventive concept.
Figure 17:
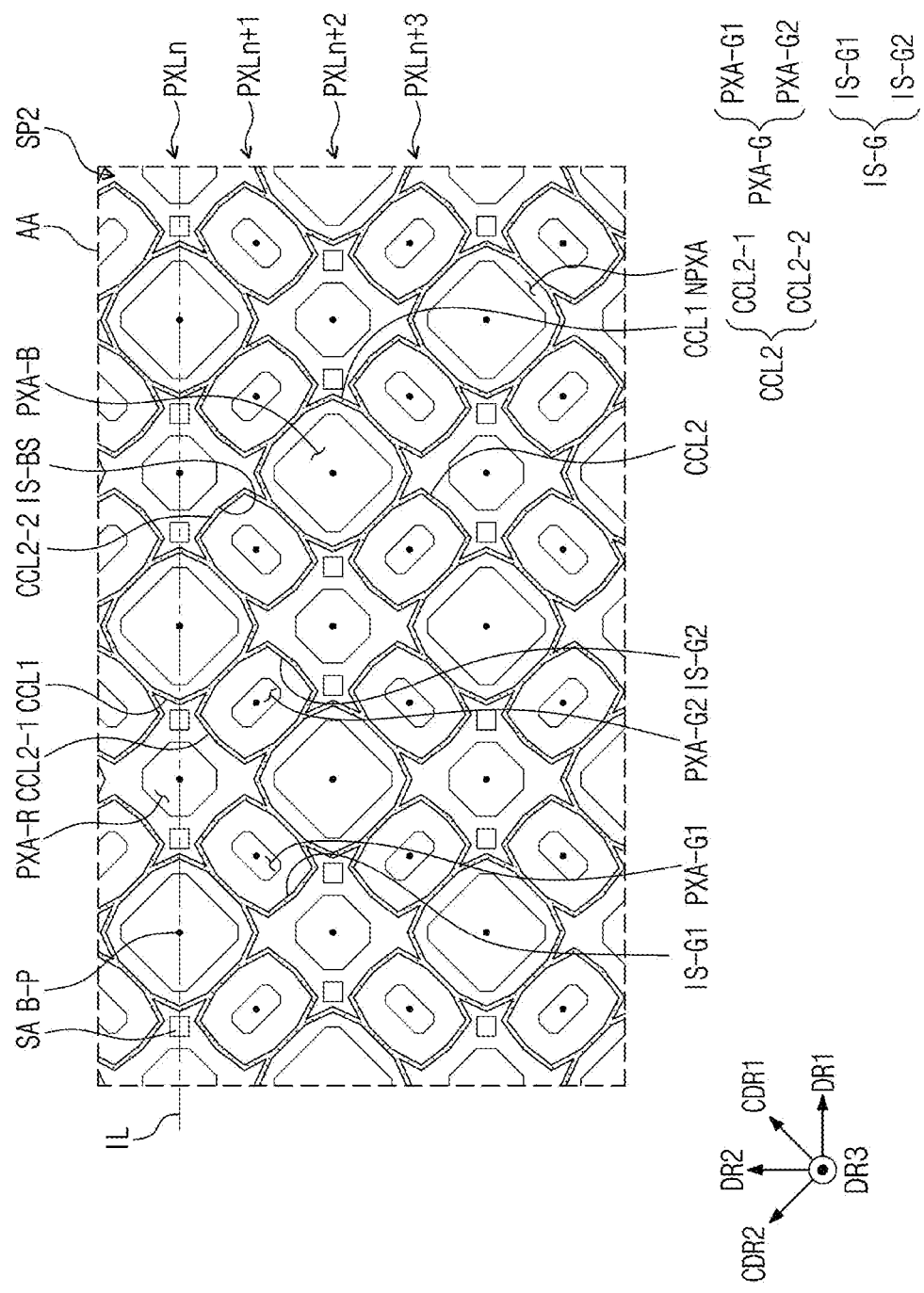
FIG. 17 is an enlarged plan view of a display device according to an embodiment of the inventive concept.

FIG. 14 is an enlarged plan view of a display device according to an embodiment of the inventive concept. FIG. 15 is an enlarged plan view of a display device according to an embodiment of the inventive concept. FIG. 16 is an enlarged plan view of a display device according to an embodiment of the inventive concept. FIG. 17 is an enlarged plan view of a display device according to an embodiment of the inventive concept. FIGS. 14 to 17 show planes corresponding to FIG. 10. Hereinafter, redundant description of the configuration described with reference to FIGS. 10 to 13F will be omitted.

Referring to FIG. 14, the first opening IS-R may have a circular shape. In addition, the second opening IS-G may have an elliptical shape. This embodiment also shows a display device designed to correct a yellowish white image. As described with reference to FIGS. 10 to 13F, each of the first distance R0 to the eighth distance R315 between the first color emission area PXA-R and the sensing electrode SP2 may be smaller than a corresponding distance among first to eighth distances between the third color emission area PXA-B and the sensing electrode SP2. Each of the first distances 1G0 and 2G0 to the eighth distances 1G315 and 2G315 between the second color emission area PXA-G and the sensing electrode SP2 may be smaller than a corresponding distance among first to eighth distances between the third color emission area PXA-B and the sensing electrode SP2.

Referring to FIG. 15, the first conductive closed line pattern CCL1 and the second conductive closed line pattern CCL2 define the same M-gonal shape. Here, M is 12. The first color emission area PXA-R may have an octagonal shape, and the first opening IS-R may have a dodecagonal shape. The second color emission area PXA-G may have an octagonal shape, and the second opening IS-G may have a dodecagonal shape.

Referring to FIG. 16, one type second color emission area PXA-G may be provided. The second color emission areas PXA-G may have the same shape. The second openings IS-G may also have the same shape. The shielding effect of the sensing electrode SP2 with respect to the second color emission areas PXA-G may be equally generated in the second color emission areas PXA-G.

This embodiment also shows a display device designed to correct a yellowish white image. Each of the first to eighth distances between the second color emission area PXA-G and the sensing electrode SP2 may be smaller than a corresponding distance among first to eighth distances between the third color emission area PXA-B and the sensing electrode SP2. The second color emission area PXA-G may substantially define an I-gonal shape, and the second opening IS-G may substantially define a J-gonal shape, or may define a circle or an oval. I may be a natural number greater than or equal to 4, and J may be a natural number greater than I.

FIG. 17 illustrates a display device capable of compensating for a blue-shifted white image when the blue-shifted white image is measured at the fifth measurement point P5. The design of the sensing electrode SP2 was changed such that the shielding effect (or partial shielding effect) by the sensing electrode SP2 does not occur with respect to the first color emission area PXA-R and the second color emission area PXA-G, and the shielding effect (or partial shielding effect) by the sensing electrode SP2 occurs only in the third color emission area PXA-B.

The distance between the sensing electrode SP2 and the first color emission area PXA-R and the distance between the sensing electrode SP2 and the second color emission area PXA-G were each designed to be the distance B90 in FIG. 11E, and the distance between the sensing electrode SP2 and the third color emission area PXA-B was designed to be the distance R90 of FIG. 11A or the distance G90 of FIG. 11C. In other words, each of the first to eighth distances between the third color emission area PXA-B and the sensing electrode SP2 may be smaller than a corresponding distance among first to eighth distances between the first color emission area PXA-R and the sensing electrode SP2. In addition, each of the first to eighth distances between the third color emission area PXA-B and the sensing electrode SP2 may be smaller than a corresponding distance among first to eighth distances between the second color emission area PXA-G and the sensing electrode SP2.

The rule described with reference to FIGS. 13A and 13B may also be applied between the sensing electrode SP2 and the third color emission area PXA-B. On the other hand, between the sensing electrode SP2 and the first color emission area PXA-R, the shielding effect by the sensing electrode SP2 does not occur for eight points of azimuth angles of 0°, 45°, 90°, 135°, 180°, 225°, 270°, and 315°. In addition, between the sensing electrode SP2 and the second color emission area PXA-G, the shielding effect by the sensing electrode SP2 does not occur for eight points of azimuth angles of 0°, 45°, 90°, 135°, 180°, 225°, 270°, and 315°.

Figure 18:
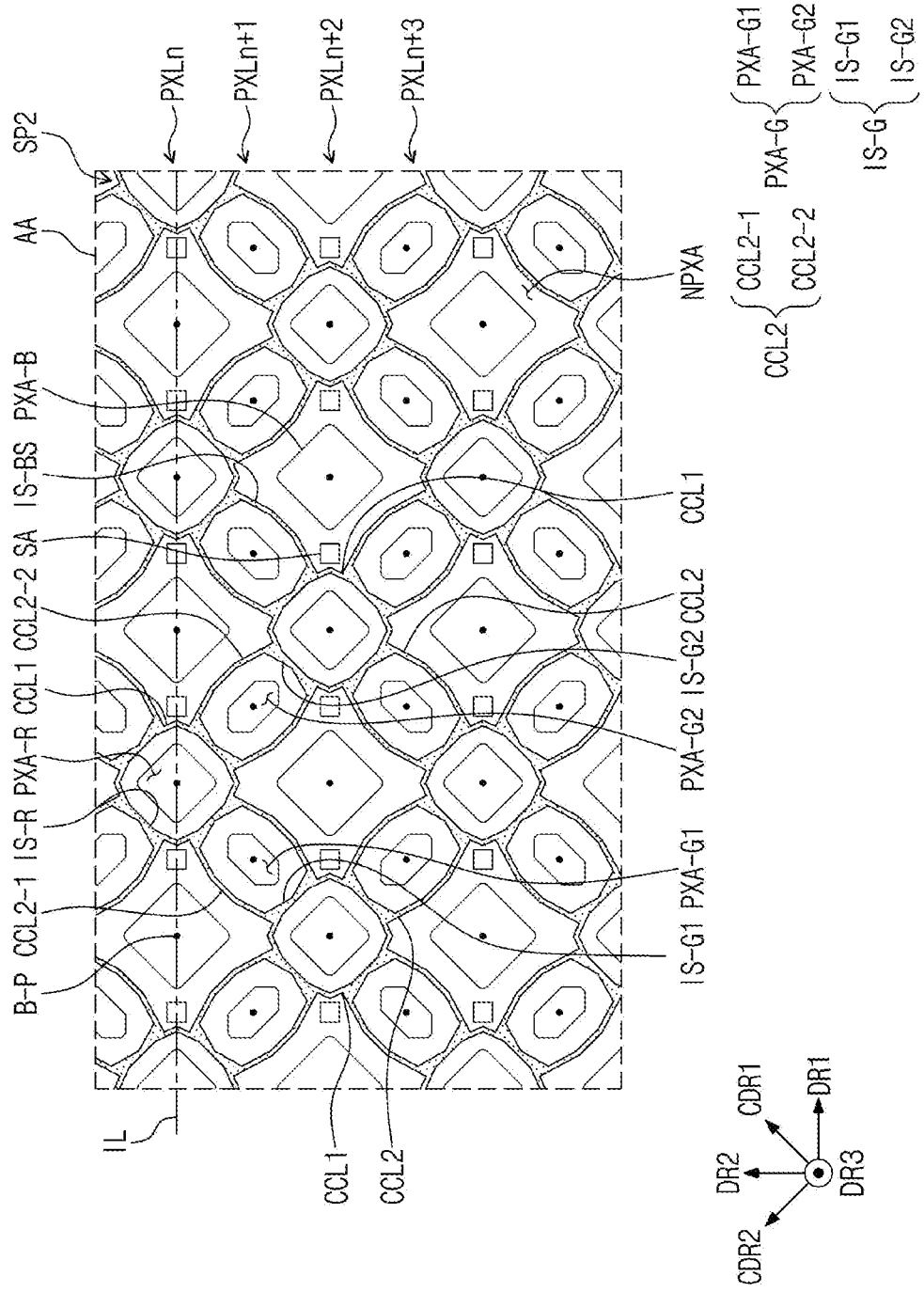
FIG. 18 is an enlarged plan view of a display device according to an embodiment of the inventive concept.
Figure 19A:
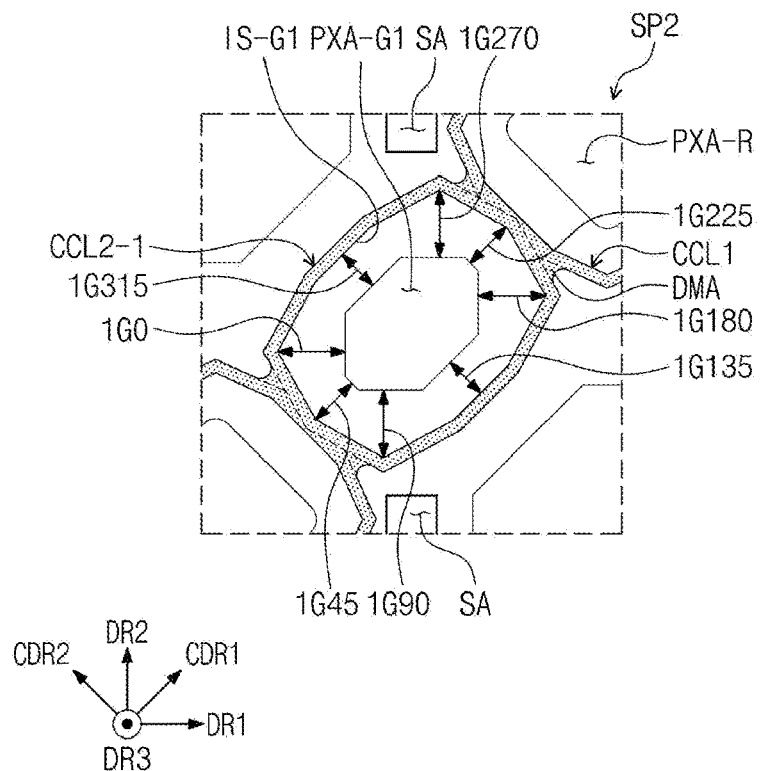
FIG. 19A is an enlarged plan view of a second color emission area and a sensing electrode of the first type shown in FIG. 18.
Figure 19B:
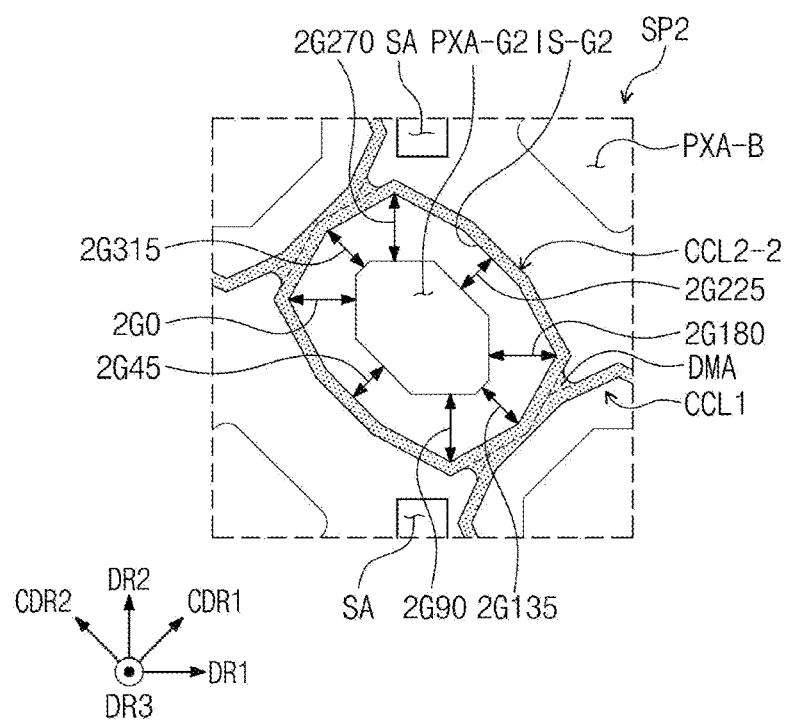
FIG. 19B is an enlarged plan view of a second color emission area and a sensing electrode of the second type shown in FIG. 18.
Figure 19C:
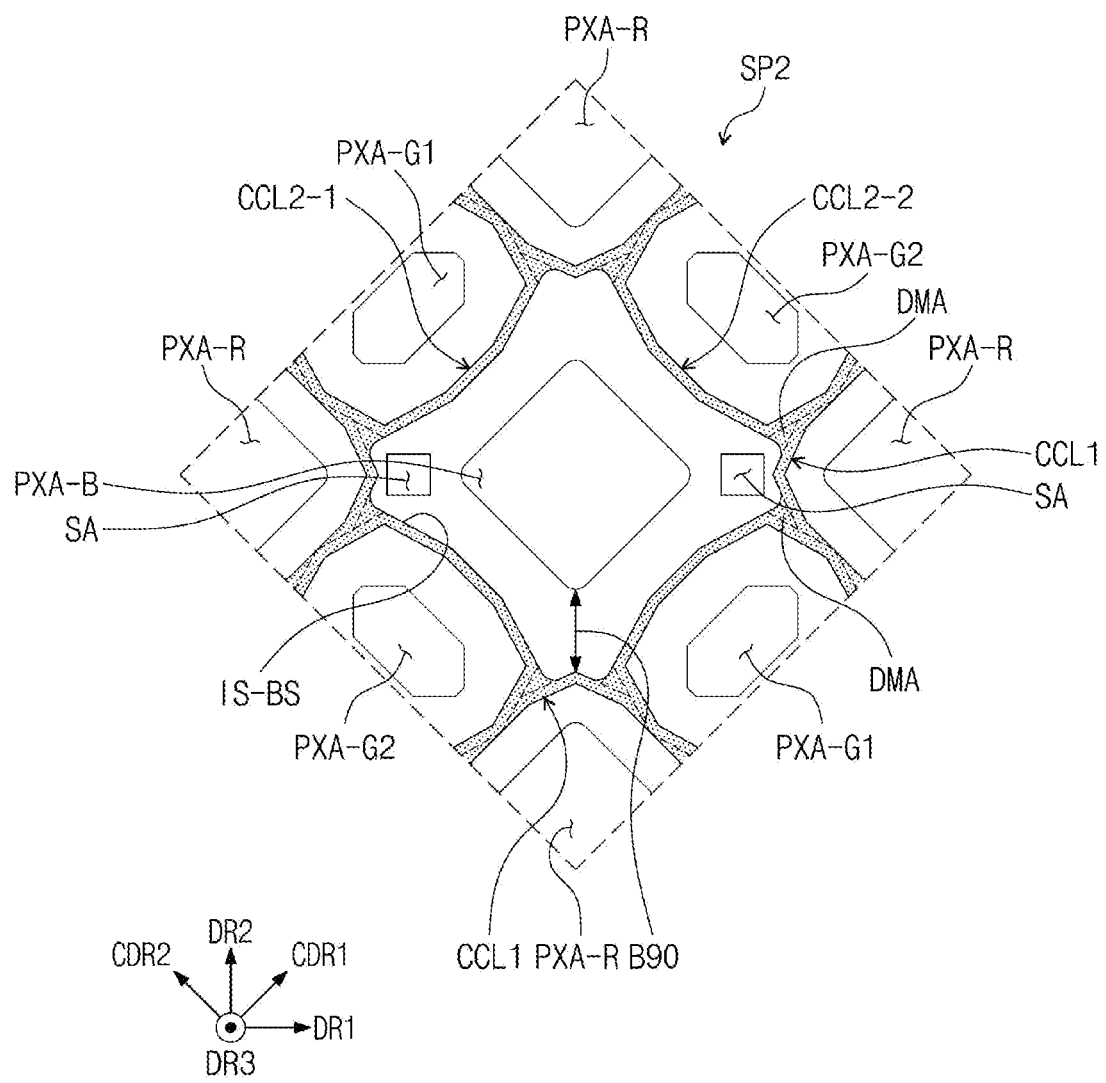
FIG. 19C is an enlarged plan view of a third color emission area and a sensing electrode shown in FIG. 18.

FIG. 18 is an enlarged plan view of a display device according to an embodiment of the inventive concept. FIG. 19A is an enlarged plan view of a second color emission area and a sensing electrode of the first type shown in FIG. 18. FIG. 19B is an enlarged plan view of a second color emission area and a sensing electrode of the second type shown in FIG. 18. FIG. 19C is an enlarged plan view of a third color emission area and a sensing electrode shown in FIG. 18. Hereinafter, redundant description of the configuration described with reference to FIGS. 10 to 17 will be omitted.

FIG. 18 illustrates first color emission areas PXA-R and third color emission areas PXA-B having a substantially rhombus shape in which curves are defined at vertices. The first type emission area PXA-G1 and the second type emission area PXA-G2 may be symmetrical with respect to the second direction DR2 and may have a substantially octagonal shape.

The first conductive closed line patterns CCL1 define a first opening IS-R to correspond to the first color emission areas PXA-R. In this embodiment, the first opening IS-R may have a dodecagonal shape. The second conductive closed line patterns CCL2 define an opening IS-G1 of the first type to correspond to the first type emission area PXA-G1, and define a second type opening IS-G2 to correspond to the second type emission area PXA-G2. The second conductive closed line patterns CCL2 define an opening IS-G1 of the first type to correspond to the first type emission area PXA-G1, and define a second type opening IS-G2 to correspond to the second type emission area PXA-G2.

Referring to FIGS. 18, 19A and 19B, among the edges defining the first type emission area PXA-G1, the length of the edges corresponding to the azimuth angles of 0° 90°, 180°, and 270° may be greater than the length of the edges corresponding to the azimuth angles of 45° and 225°. Among the edges defining the second type emission area PXA-G2, lengths of edges corresponding to azimuth angles of 0° 90°, 180°, and 270° may be greater than lengths of edges corresponding to azimuth angles of 135° and 315°.

The first distance 1G0, the third distance 1G90, the fifth distance 1G180, and the seventh distance 1G270 may be equal to each other, and the second distance 1G45, the fourth distance 1G135, the sixth distance 1G225, and the eighth distance 1G315 may be equal to each other. For example, the first distance 1G0 may be greater than the second distance 1G45. Referring to FIGS. 18 and 19B, based on the imaginary line connecting the azimuth angle of 90° and the azimuth angle of 270°, the second type emission area PXA-G2 symmetrical to the first type emission area PXA-G1 may be designed to be opposite to the design dimension between the first type emission area PXA-G1 and the sensing electrode SP2. The shielding effect of the sensing electrode SP2 on the second color emission area PXA-G may be determined as an average of the shielding effect of the sensing electrode SP2 with respect to the first type emission area PXA-G1 and the second type emission area PXA-G2.

Referring to FIGS. 18 to 19B, in the divided area CA described in FIG. 13A, the first conductive closed line pattern CCL1 and the second conductive closed line pattern CCL2 are not sharply patterned, and a dummy area DMA connecting the first conductive closed line pattern CCL1 and the second conductive closed line pattern CCL2 may exist. The dummy area DMA may be an error area formed when etching performance for a conductive pattern does not satisfy a design value.

Referring to FIG. 19C, by the first conductive closed line pattern CCL1 and the second conductive closed line pattern CCL2, a third opening IS-BS that commonly corresponds to the third color emission area PXA-B and the light detection area SA is defined. Eight dummy areas DMA may be positioned around one third color emission area PXA-B. Three dummy areas DMA may be located at points having azimuth angles of approximately 0°, 90°, 180°, and 270°.

According to the above description, a wavelength shift of a white image in which a white image is recognized differently according to a viewing angle may be reduced. As a result, the display quality of the display device is increased.

In addition, it is possible to reduce the luminance deviation of the source light generated according to the azimuth.

In addition, the sensing sensitivity of the light detection element may be secured. This is because the sensing electrode on the plane does not shield the light detection element.

Although the embodiments of the inventive concept have been described, it is understood that the inventive concept should not be limited to these embodiments but various changes and modifications may be made by one ordinary skill in the art within the spirit and scope of the inventive concept as hereinafter claimed.

What is claimed is:

1. A display device, comprising:
   a base layer;
   a pixel defining layer disposed on the base layer, wherein a first light-emitting opening, a second light-emitting opening, a third light-emitting opening, and a light-receiving opening are provided in the pixel defining layer;
   a first light emitting element including a first electrode, wherein the first light emitting element is exposed by the first light-emitting opening and a first color emission area corresponds to the first light-emitting opening;
   a second light emitting element including a second electrode, wherein the second light emitting element is exposed by the second light-emitting opening and a second color emission area corresponds to the second light-emitting opening;
   a third light emitting element including a third electrode, wherein the third light emitting element is exposed by the third light-emitting opening and a third color emission area corresponds to the third light-emitting opening;
   a light detection element including a fourth electrode, wherein the light detection element is exposed by the light-receiving opening and a light detection area corresponds to the light-receiving opening;
   a thin film encapsulation layer covering the first light emitting element, the second light emitting element, the third light emitting element, and the light detection element; and
   a sensing electrode disposed on the thin film encapsulation layer and overlapping the pixel defining layer,
   wherein a first opening corresponding to the first light-emitting opening and having a larger area than the first light-emitting opening, a second opening corresponding to the second light-emitting opening and having a larger area than the second light-emitting opening, and a third opening corresponding to each of the third light-emitting opening and the light-receiving opening are provided in the sensing electrode,
   wherein, when the first color emission area, the second color emission area, and the third color emission area are viewed at a first point having a first viewing angle with respect to a normal line of the base layer, the sensing electrode partially shields each of two emission areas among the first color emission area, the second color emission area, and the third color emission area or partially shields one of the first color emission area, the second color emission area, and the third color emission area.

2. The display device of claim 1, wherein the sensing electrode partially shields the first color emission area and the second color emission area, and
   wherein, when the first viewing angle is 60°, about 5% to about 20% of a size of the first color emission area is shielded by the sensing electrode.

3. The display device of claim 2, wherein a distance between a plane formed by an upper surface of the first electrode and a plane formed by an upper surface of the sensing electrode is 6 micrometers to 25 micrometers.

4. The display device of claim 2, wherein a size of the first color emission area shielded by the sensing electrode when the first color emission area is viewed at a second point having the same viewing angle as the first point and having a different azimuth angle is different from a size of the first color emission area shielded by the sensing electrode when the first color emission area is viewed at the first point.

5. The display device of claim 1, wherein the sensing electrode partially shields the first color emission area and the second color emission area, and
   wherein a size of the first color emission area and a size of the second color emission area shielded by the sensing electrode are different from each other.

6. The display device of claim 1, wherein the sensing electrode partially shields the first color emission area and the second color emission area, and
   wherein the first color emission area and the second color emission area have different areas and shapes on a plane.

7. The display device of claim 6, wherein a size of the first color emission area and a size of the second color emission area shielded by the sensing electrode are equal to each other.

8. The display device of claim 6, wherein a distance on a plane between the first color emission area and the sensing electrode measured at an azimuth of the first point is different from a distance on a plane between the second color emission area and the sensing electrode.

9. The display device of claim 1, wherein the sensing electrode partially shields the first color emission area and the second color emission area,
   wherein distances between each of the first color emission area and the third color emission area and the sensing electrode measured at azimuth angles of 0°, 45°, 90°, 135°, 180°, 225°, 270°, and 315° are a first distance, a second distance, a third distance, a fourth distance, a fifth distance, a sixth distance, a seventh distance, and an eighth distance, respectively, and
   wherein each of the first distance to the eighth distance between the sensing electrode and the first color emission area is smaller than a corresponding distance among the first distance and the eighth distance between the sensing electrode and the third color emission area.

10. The display device of claim 9, wherein a deviation between the first distance and the eighth distance between the sensing electrode and the first color emission area is 1.5 micrometers or less.

11. The display device of claim 1, wherein, when the first color emission area, the second color emission area, and the third color emission area are viewed at a second point having a second viewing angle smaller than the first viewing angle, the first color emission area, the second color emission area, and the third color emission area are not shielded by the sensing electrode.

12. The display device of claim 1, wherein the sensing electrode partially shields the first color emission area and the second color emission area,
  wherein the first light-emitting opening has an N-gonal shape, the first opening has an M-gonal shape or a circular or oval shape, where N is a natural number greater than or equal to 4, and M is a natural number greater than N, and
  wherein the second light-emitting opening has an I-gonal shape, and the second opening has a J-gonal shape or is a circle or oval, where I is a natural number greater than or equal to 4, and J is a natural number greater than I.

13. The display device of claim 1, wherein the sensing electrode partially shields the first color emission area and the second color emission area, and
  wherein the third opening is larger than each of the first opening and the second opening.

14. The display device of claim 1, wherein the first light emitting element further comprises a light emitting layer disposed on the first electrode and a first common electrode disposed on the light emitting layer,
  wherein the light detection element further comprises a photoelectric conversion layer disposed on the fourth electrode and a second common electrode disposed on the photoelectric conversion layer, and
  wherein the first common electrode and the second common electrode have an integral shape.

15. The display device of claim 1, wherein the sensing electrode partially shields the first color emission area, and does not shield the second color emission area and the third color emission area,
  wherein distances between each of the first color emission area and the second color emission area and the sensing electrode measured at azimuth angles of 0°, 45°, 90°, 135°, 180°, 225°, 270°, and 315° are a first distance, a second distance, a third distance, a fourth distance, a fifth distance, a sixth distance, a seventh distance, and an eighth distance, respectively, and
  wherein each of the first distance to the eighth distance between the sensing electrode and the first color emission area is smaller than a corresponding one of the first distance to the eighth distance between the sensing electrode and the second color emission area.

16. The display device of claim 15, wherein distances between the sensing electrode and the third color emission area measured at azimuth angles of 0°, 45°, 90°, 135°, 180°, 225°, 270°, and 315° are a first distance, a second distance, a third distance, a fourth distance, a fifth distance, a sixth distance, a seventh distance, and an eighth distance, respectively,
  wherein each of the first distance to the eighth distance between the sensing electrode and the first color emission area is smaller than a corresponding one of the first distance to the eighth distance between the sensing electrode and the third color emission area.

17. A display device, comprising:
  a display panel; and
  an input sensor disposed on the display panel and including a sensing electrode,
  wherein the display panel comprises:
  an n-th pixel row (where n is a natural number) including first color emission areas and third color emission areas alternately arranged in a first direction;
  an (n+1)-th pixel row including second color emission areas arranged in the first direction;
  an (n+2)-th pixel row including third color emission areas and first color emission areas alternately arranged in the first direction;
  an (n+3)-th pixel row including second color emission areas arranged in the first direction and aligned with the second color emission areas of the (n+1)-th pixel row in a second direction crossing the first direction; and
  light detection elements disposed in at least one pixel row among the n-th pixel row to the (n+3)-th pixel row, each of the light detection elements being disposed between adjacent emission areas of the at least one pixel row,
  wherein the first color emission areas of the n-th pixel row and the third color emission areas of the (n+2)-th pixel row are aligned in the second direction, and the first color emission areas and the third color emission areas of the n-th pixel row are not aligned with the second color emission areas of the (n+1)-th pixel row in the second direction,
  wherein the sensing electrode comprises:
  first conductive closed line patterns corresponding to the first color emission areas of the n-th pixel row and the (n+2)-th pixel row; and
  second conductive closed line patterns corresponding to the second color emission areas of the (n+1)-th pixel row and the (n+3)-th pixel row,
  wherein the first conductive closed line patterns and the second conductive closed line patterns are alternately arranged in each of a first crossing direction and a second crossing direction crossing the first crossing direction, and the first crossing direction crosses the first direction and the second direction, wherein distances between each of the first color emission areas, the second color emission areas, and the third color emission areas and the sensing electrode measured at azimuth angles of 0°, 45°, 90°, 135°, 180°, 225°, 270°, and 315° are a first distance, a second distance, a third distance, a fourth distance, a fifth distance, a sixth distance, a seventh distance, and an eighth distance, respectively,
  wherein each of the first to eighth distances between the first color emission area and the sensing electrode is smaller than a corresponding one of the first to eighth distances between the third color emission area and the sensing electrode.

18. The display device of claim 17, wherein an adjacent first conductive closed line pattern and second conductive closed line pattern among the first conductive closed line patterns and the second conductive closed line patterns partially overlap each other.

19. The display device of claim 18, wherein an overlapping portion of the adjacent first conductive closed line pattern and second conductive closed line pattern is located in the first crossing direction or the second crossing direction.

20. The display device of claim 17, wherein a deviation between the first distance and the eighth distance between the sensing electrode and the first color emission area is 1.5 micrometers or less.

21. The display device of claim 17, wherein each of the first color emission areas has an N-gonal shape, and each of the first conductive closed line patterns has an M-gonal shape or a circular shape or an oval shape, where N is a natural number equal to or greater than 4, and M is a natural number greater than N.

22. The display device of claim 21, wherein each of the first to eighth distances between the second color emission area and the sensing electrode is smaller than a corresponding one of the first to eighth distances between the third color emission area and the sensing electrode, wherein each of the second color emission areas has an I-gonal shape, each of the second conductive closed line patterns has a J-gonal shape or is a circle or an ellipse, where I is a natural number equal to or greater than 4, and J is a natural number greater than I.

23. The display device of claim 17, wherein each of the first to eighth distances between the second color emission area and the sensing electrode is smaller than a corresponding one of the first to eighth distances between the third color emission area and the sensing electrode.

24. The display device of claim 17, wherein the second color emission area comprises a first type emission area and a second type emission area that are symmetric with respect to a virtual axis situated between an azimuth of 90° and an azimuth of 270°.

25. The display device of claim 17, wherein line widths of the first conductive closed line patterns are 3 micrometers to 5 micrometers, and line widths of the second conductive closed line patterns are 3 micrometers to 5 micrometers.

26. The display device of claim 25, wherein the line widths of the first conductive closed line patterns and the line widths of the second conductive closed line patterns are substantially the same.

27. The display device of claim 17, wherein each of the light detection elements comprises a first electrode, a photoelectric conversion layer disposed on the first electrode, and a second electrode disposed on the photoelectric conversion layer, wherein the first conductive closed line patterns and the second conductive closed line patterns do not overlap the first electrode of the light detection elements on a plane.

28. The display device of claim 17, wherein the light detection elements are disposed between adjacent first and third color emission areas of each of the n-th pixel row and the n+2th pixel row.

29. A display device, comprising:

a display panel; and an input sensor disposed on the display panel and including a sensing electrode, wherein the display panel comprises:

an n-th pixel row (where n is a natural number) including first color emission areas and third color emission areas alternately arranged in a first direction;

an (n+1)-th pixel row including second color emission areas arranged in the first direction;

an (n+2)-th pixel row including third color emission areas and first color emission areas alternately arranged in the first direction;

an (n+3)-th pixel row including second color emission areas arranged in the first direction and aligned with the second color emission areas of the (n+1)-th pixel row in a second direction crossing the first direction; and light detection elements disposed in at least one pixel row among the n-th pixel row to the (n+3)-th pixel row, each of the light detection elements being disposed between adjacent emission areas of the at least one pixel row, wherein the sensing electrode comprises:

first conductive closed line patterns corresponding to the first color emission areas of the n-th pixel row and the (n+2)-th pixel row; and second conductive closed line patterns corresponding to the second color emission areas of the (n+1)-th pixel row and the (n+3)-th pixel row, wherein the first conductive closed line patterns and the second conductive closed line patterns are alternately disposed in a first crossing direction crossing the first direction and the second direction and are alternately arranged in a second crossing direction crossing the first crossing direction, wherein distances between each of the first color emission areas, the second color emission areas, and the third color emission areas and the sensing electrode measured at azimuth angles of 0°, 45°, 90°, 135°, 180°, 225°, 270°, and 315° are a first distance, a second distance, a third distance, a fourth distance, a fifth distance, a sixth distance, a seventh distance, and an eighth distance, respectively, wherein each of the first to eighth distances between the third color emission area and the sensing electrode is smaller than a corresponding distance among the first to eighth distances between the first color emission area and the sensing electrode and a corresponding distance among the first to eighth distances between the second color emission area and the sensing electrode.

30. The display device of claim 29, wherein an adjacent first conductive closed line pattern and second conductive closed line pattern among the first conductive closed line patterns and the second conductive closed line patterns partially overlap each other.

31. The display device of claim 30, wherein an overlapping portion of the adjacent first conductive closed line pattern and second conductive closed line pattern is located in the first crossing direction or the second crossing direction.

32. The display device of claim 29, wherein a deviation between the first distance and the eighth distance between the sensing electrode and the third color emission area is 1.5 micrometers or less.

* * * * *